US012682510B2

(12) United States Patent
Choi et al.

(10) Patent No.: US 12,682,510 B2
(45) Date of Patent: Jul. 14, 2026

(54) WEARABLE DEVICE FOR CONTROLLING DISPLAYING OF VISUAL OBJECT CORRESPONDING TO EXTERNAL OBJECT AND METHOD THEREOF

(71) Applicant: SAMSUNG ELECTRONICS CO., LTD., Suwon-si (KR)

(72) Inventors: Yoonjung Choi, Suwon-si (KR); Jiyoung Kang, Suwon-si (KR); Chaekyung Lee, Suwon-si (KR); Seungyong Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 177 days.

(21) Appl. No.: 18/542,103

(22) Filed: Dec. 15, 2023

(65) Prior Publication Data

US 2024/0177367 A1      May 30, 2024

Related U.S. Application Data

(63) Continuation of application No. PCT/KR2023/019284, filed on Nov. 27, 2023.

(30) Foreign Application Priority Data

Nov. 27, 2022   (KR) ........................ 10-2022-0161034
Dec. 14, 2022   (KR) ........................ 10-2022-0175134

(51) Int. Cl.
 *G06T 11/00*         (2026.01)
 *G06F 1/16*          (2006.01)
 (Continued)

(52) U.S. Cl.
 CPC .............. *G06T 11/00* (2013.01); *G06F 1/163* (2013.01); *G06F 3/013* (2013.01); *G06T 7/70* (2017.01);
 (Continued)

(58) Field of Classification Search
 CPC ....................................................... G06T 11/00
 See application file for complete search history.

(56) References Cited

U.S. PATENT DOCUMENTS 9,329,678 B2    5/2016  Krauss et al.
9,900,498 B2    2/2018  Kim et al.
                (Continued)

FOREIGN PATENT DOCUMENTS

JP          7176792 B1    11/2022
KR      20110066298 A      6/2011
                (Continued)

OTHER PUBLICATIONS

International Search Report and Written Opinion corresponding to Application No. PCT/KR2023/019284 filed on Nov. 27, 2022; Issue Date Mar. 14, 2024.

*Primary Examiner* — Shivang I Patel
(74) *Attorney, Agent, or Firm* — CANTOR COLBURN LLP

(57) ABSTRACT

According to an embodiment, a processor of a wearable device may identify a first visual object among a plurality of visual objects in a first image frame displayed through the display. The processor may identify, based on identifying the first visual object, a second visual object associated with the first visual object. The processor may obtain, after the second visual object is identified, a second image frame via the camera. The processor may modify at least a portion of the second image frame in which at least one of other visual objects of the plurality of visual objects different from the first visual object and the second visual object is removed. The processor may display, via the display, the second image frame including the modified portion.

20 Claims, 24 Drawing Sheets

(51) Int. Cl.

| | |
|---|---|
| *G06F 3/01* | (2006.01) |
| *G06T 7/70* | (2017.01) |
| *G06V 10/764* | (2022.01) |
| *G10L 25/51* | (2013.01) |
| *H04R 1/02* | (2006.01) |

(52) U.S. Cl.

CPC ............ *G06V 10/764* (2022.01); *G10L 25/51* (2013.01); *H04R 1/028* (2013.01); *G06T 2207/30196* (2013.01); *H04R 2499/15* (2013.01)

(56) References Cited

U.S. PATENT DOCUMENTS

| | | | |
|---|---|---|---|
| 10,013,805 | B2 | 7/2018 | Barzuza et al. |
| 10,365,882 | B2 | 7/2019 | Shin et al. |
| 10,976,805 | B2 | 4/2021 | Pilot |
| 11,107,224 | B2 | 8/2021 | Cho et al. |
| 11,150,777 | B2 | 10/2021 | Kaehler et al. |
| 11,176,753 | B1 | 11/2021 | Chakravarthi et al. |
| 11,178,376 | B1 | 11/2021 | Tichenor et al. |
| 11,802,951 | B2 | 10/2023 | Cho et al. |
| 2014/0362111 | A1 | 12/2014 | Kim |
| 2019/0011703 | A1* | 1/2019 | Robaina ................. G06F 3/011 |
| 2023/0230334 | A1 | 7/2023 | Ko et al. |
| 2024/0104864 | A1* | 3/2024 | Mulliken ............. G06T 19/006 |

FOREIGN PATENT DOCUMENTS

| | | | |
|---|---|---|---|
| KR | 101665229 | B1 | 10/2016 |
| KR | 20190100111 | A | 8/2019 |
| KR | 102098058 | B1 | 4/2020 |
| KR | 20200065930 | A | 6/2020 |
| KR | 102184272 | B1 | 11/2020 |
| KR | 20210000872 | A | 1/2021 |
| KR | 20220040884 | A | 3/2022 |
| WO | 2022103420 | A1 | 5/2022 |

* cited by examiner

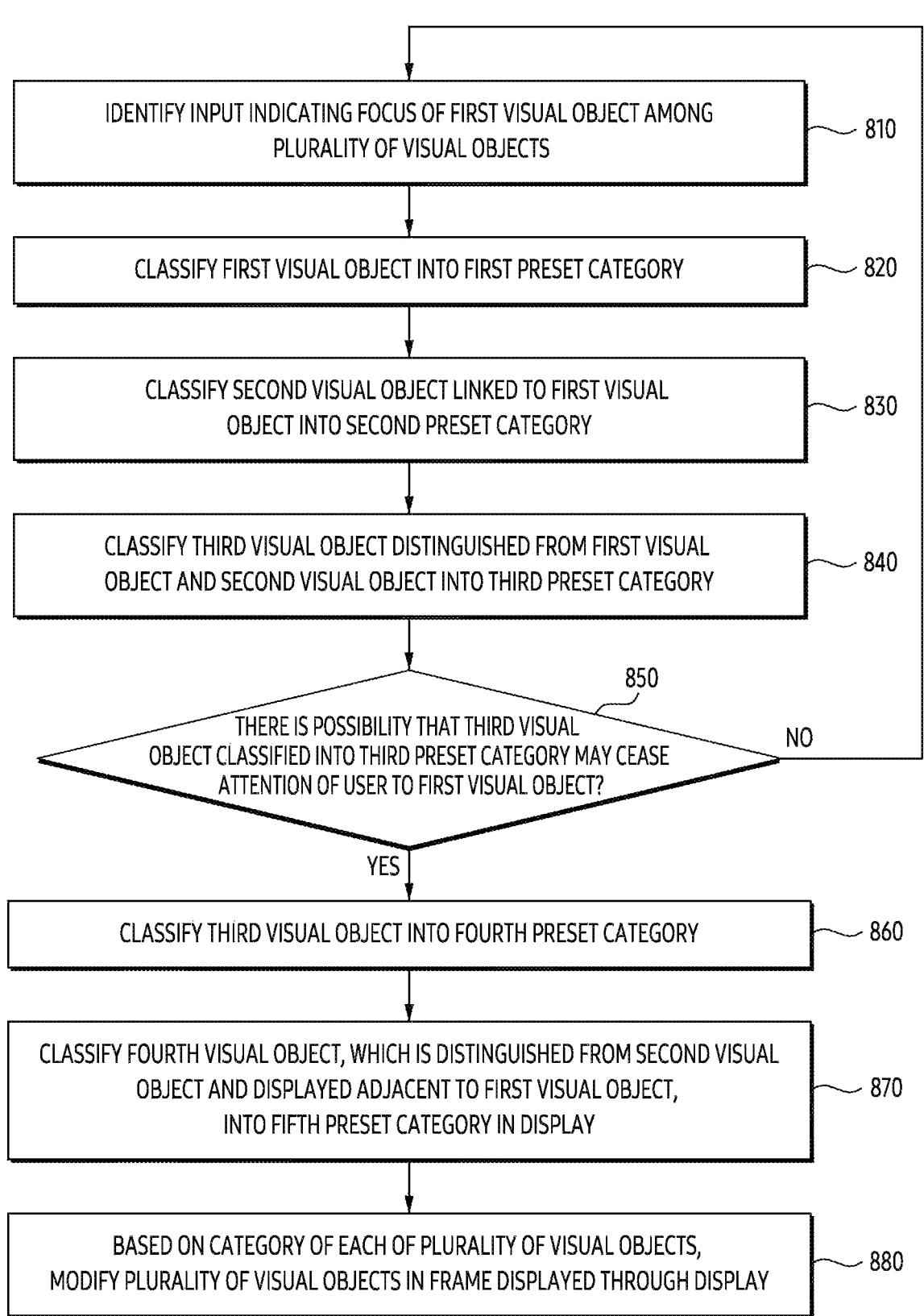

IDENTIFY INPUT INDICATING FOCUS OF FIRST VISUAL OBJECT AMONG PLURALITY OF VISUAL OBJECTS ～ 810

CLASSIFY FIRST VISUAL OBJECT INTO FIRST PRESET CATEGORY ～ 820

CLASSIFY SECOND VISUAL OBJECT LINKED TO FIRST VISUAL OBJECT INTO SECOND PRESET CATEGORY ～ 830

CLASSIFY THIRD VISUAL OBJECT DISTINGUISHED FROM FIRST VISUAL OBJECT AND SECOND VISUAL OBJECT INTO THIRD PRESET CATEGORY ～ 840

850

THERE IS POSSIBILITY THAT THIRD VISUAL OBJECT CLASSIFIED INTO THIRD PRESET CATEGORY MAY CEASE ATTENTION OF USER TO FIRST VISUAL OBJECT?        NO

YES

CLASSIFY THIRD VISUAL OBJECT INTO FOURTH PRESET CATEGORY ～ 860

CLASSIFY FOURTH VISUAL OBJECT, WHICH IS DISTINGUISHED FROM SECOND VISUAL OBJECT AND DISPLAYED ADJACENT TO FIRST VISUAL OBJECT, INTO FIFTH PRESET CATEGORY IN DISPLAY ～ 870

BASED ON CATEGORY OF EACH OF PLURALITY OF VISUAL OBJECTS, MODIFY PLURALITY OF VISUAL OBJECTS IN FRAME DISPLAYED THROUGH DISPLAY ～ 880

FIG. 8

IDENTIFY MOTION ASSOCIATED WITH PLURALITY OF VISUAL OBJECTS, BY USING CAMERA AND/OR SENSOR    ~1150

EVENT ASSOCIATED WITH VISUAL OBJECT CLASSIFIED INTO FOURTH PRESET CATEGORY HAS OCCURRED?    1160

NO

YES

BY DISPLAYING VISUAL OBJECT CLASSIFIED INTO FOURTH PRESET CATEGORY IN FRAME, NOTIFY OCCURRENCE OF EVENT ASSOCIATED WITH VISUAL OBJECT    ~1170

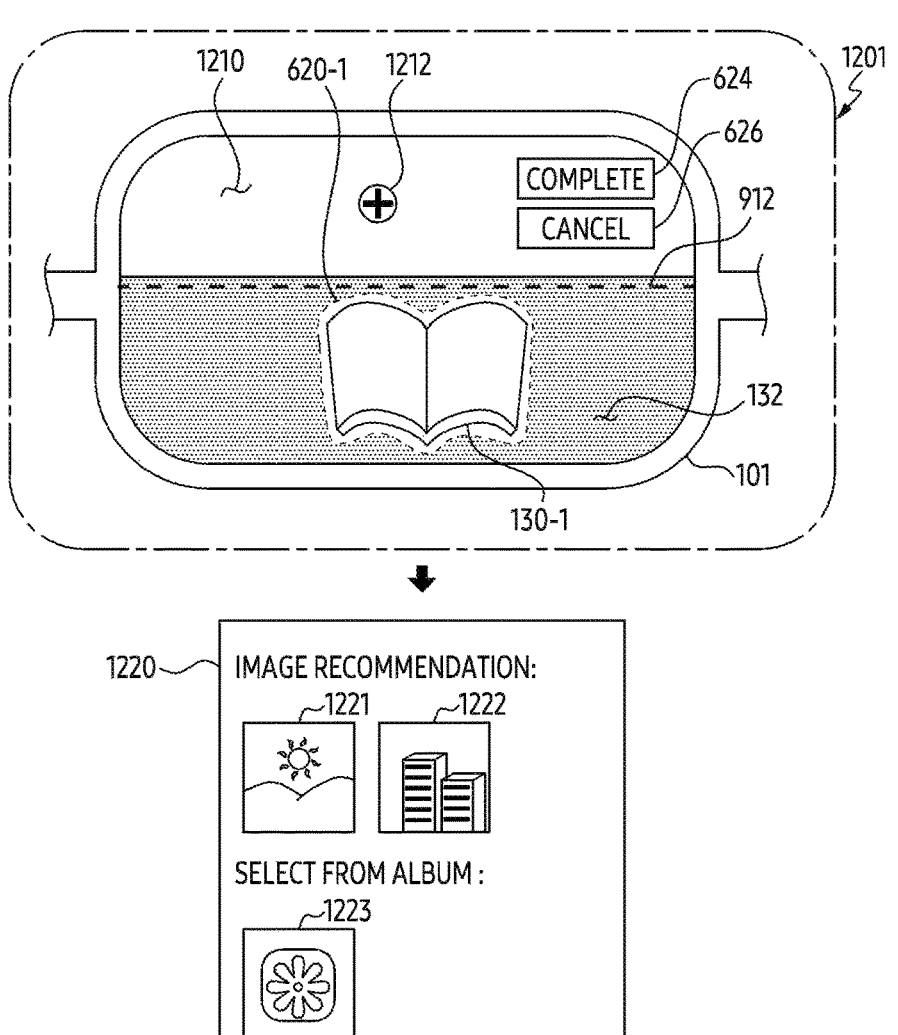
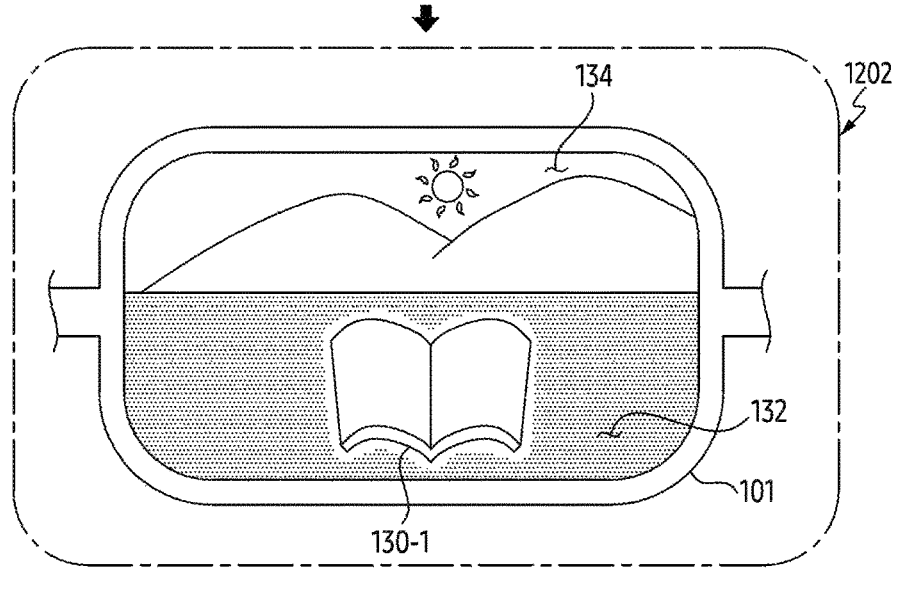
FIG. 12A

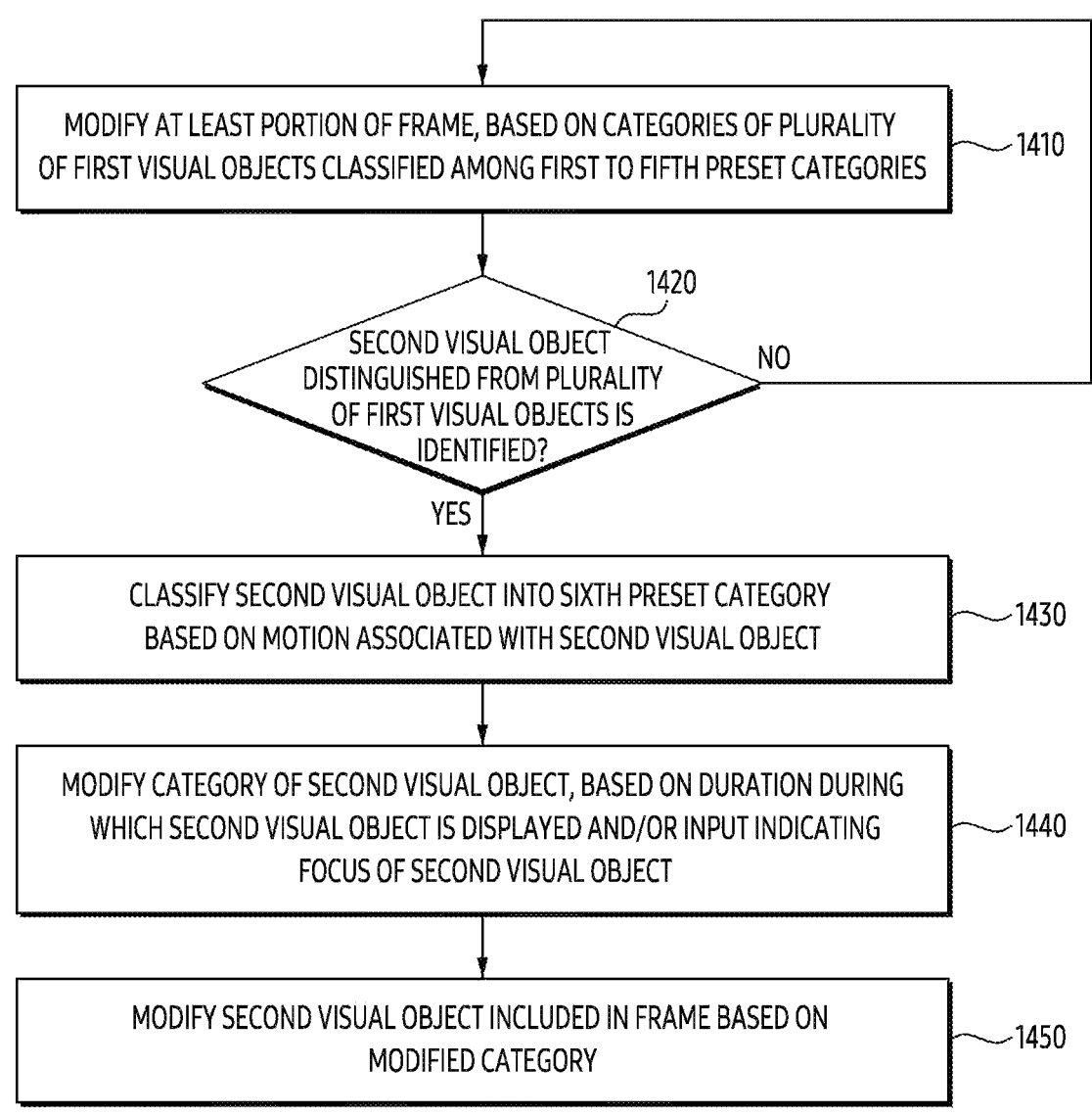

MODIFY AT LEAST PORTION OF FRAME, BASED ON CATEGORIES OF PLURALITY OF FIRST VISUAL OBJECTS CLASSIFIED AMONG FIRST TO FIFTH PRESET CATEGORIES ~1410

1420
SECOND VISUAL OBJECT DISTINGUISHED FROM PLURALITY OF FIRST VISUAL OBJECTS IS IDENTIFIED? — NO

YES

CLASSIFY SECOND VISUAL OBJECT INTO SIXTH PRESET CATEGORY BASED ON MOTION ASSOCIATED WITH SECOND VISUAL OBJECT ~1430

MODIFY CATEGORY OF SECOND VISUAL OBJECT, BASED ON DURATION DURING WHICH SECOND VISUAL OBJECT IS DISPLAYED AND/OR INPUT INDICATING FOCUS OF SECOND VISUAL OBJECT ~1440

MODIFY SECOND VISUAL OBJECT INCLUDED IN FRAME BASED ON MODIFIED CATEGORY ~1450

FIG. 14

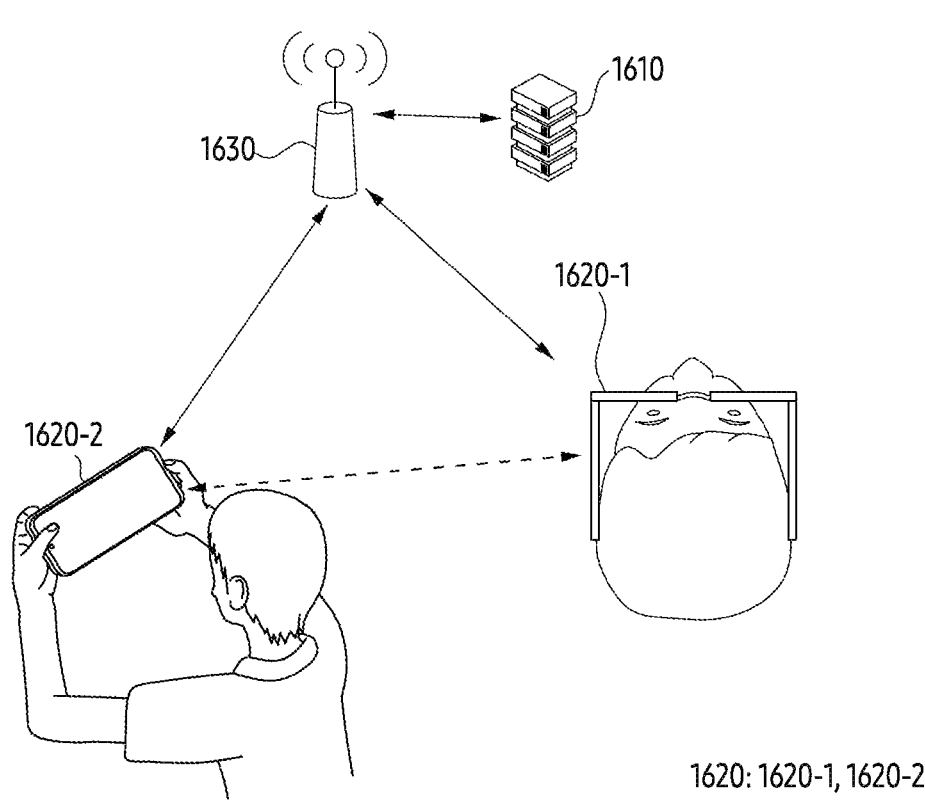
FIG. 16

WEARABLE DEVICE FOR CONTROLLING DISPLAYING OF VISUAL OBJECT CORRESPONDING TO EXTERNAL OBJECT AND METHOD THEREOF

CROSS-REFERENCE TO RELATED APPLICATION(S)

This application is a continuation of PCT International Application No. PCT/KR2023/019284, which was filed on Nov. 27, 2023, and claims priority to Korean Patent Application No. 10-2022-0175134, filed on Dec. 14, 2022, in the Korean Intellectual Property Office, and claims priority to Korean Patent Application No. 10-2022-0161034, filed on Nov. 27, 2022, in the Korean Intellectual Property Office, the disclosure of which are incorporated by reference herein their entirety.

TECHNICAL FIELD

The present disclosure relates to a wearable device for controlling displaying of a visual object corresponding to an external object and a method thereof.

BACKGROUND ART

In order to provide an enhanced user experience, an electronic device that provides an augmented reality (AR) service that display information generated by a computer in association with an external object in the real-world are being developed. The electronic device may be a wearable device that may be worn by a user. For example, the electronic device may be AR glasses and/or a head-mounted device (HMD).

SUMMARY

According to an embodiment, the wearable device may comprise a camera, a display, a processor and memory storing instructions. The instructions may, when executed by the processor, cause the wearable device to display, via the display, a first image frame obtained by the camera. The instructions may, when executed by the processor, cause the wearable device to identify a first visual object among a plurality of visual objects in the first image frame. The instructions may, when executed by the processor, cause the wearable device to, based on identifying the first visual object among the plurality of visual objects in a first image frame obtained by the camera, identify a second visual object associated with the first visual object. The instructions may, when executed by the processor, cause the wearable device to, after the second visual object is identified, obtain a second image frame via the camera. The instructions may, when executed by the processor, cause the wearable device to modify at least a portion of the second image frame in which at least one of other visual objects of the plurality of visual objects different from the first visual object and the second visual object is removed. The instructions may, when executed by the processor, cause the wearable device to display, via the display, the second image frame including the modified portion.

According to an embodiment, a method of a wearable device may comprise displaying, via a display of the wearable device, a first image frame obtained by a camera of the wearable device. The method may comprise identifying a first visual object among a plurality of visual objects in the first image frame. The method may comprise, based on identifying the first visual object among the plurality of visual objects in a first image frame obtained by the camera, identifying a second visual object associated with the first visual object. The method may comprise, after the second visual object is identified, obtaining a second image frame via the camera. The method may comprise modifying at least a portion of the second image frame in which at least one of other visual objects of the plurality of visual objects different from the first visual object and the second visual object is removed. The method may comprise displaying, via the display, the second image frame including the modified portion.

According to an embodiment, a wearable device may comprise a camera, a display, and a processor. The processor may be configured to identify, based on an input indicating to focus on a first visual object among a plurality of visual objects in a frame obtained by the camera, a second visual object linked to the first visual object. The processor may be configured to modify at least portion of the frame in which other visual objects different from the first visual object and the second visual object are included. The processor may be configured to display the frame including the modified portion in the display.

According to an embodiment, a method of a wearable device, may comprise identifying, based on an input indicating to focus on a first visual object among a plurality of visual objects in a frame obtained by a camera of the wearable device, a second visual object linked to the first visual object. The method may comprise modifying at least portion of the frame in which other visual objects different from the first visual object and the second visual object are included. The method may comprise displaying the frame including the modified portion in a display of the wearable device.

According to an embodiment, a wearable device may comprise a camera, a display, and a processor. The processor may be configured to identify, by using the camera of the wearable device, a plurality of visual objects included in a field-of-view (FoV) of a user wearing the wearable device. The processor may be configured to classify, based on a position relationship between the plurality of visual objects and a first visual object that is focused by the user, the plurality of visual objects into a plurality of preset categories distinguished by displaying condition. The processor may be configured to display, in the FoV, a third visual object occluding a second visual object classified to a second preset category different from a first preset category to which the first visual object is classified, by using the display of the wearable device. The processor may be configured to adjust, displaying of the third visual object based on displaying condition corresponding to the second preset category to which the second visual object is classified.

According to an embodiment, a method of a wearable device may comprise identifying, by using a camera of the wearable device, a plurality of visual objects included in a field-of-view (FoV) of a user wearing the wearable device. The method may comprise classifying, based on a position relationship between the plurality of visual objects and a first visual object that is focused by the user, the plurality of visual objects into a plurality of preset categories distinguished by displaying condition. The method may comprise displaying, in the FoV, a third visual object occluding a second visual object classified to a second preset category different from a first preset category to which the first visual object is classified, by using the display of the wearable device. The method may comprise adjusting, displaying of the third visual object based on displaying condition corresponding to the second preset category to which the second visual object is classified.

DESCRIPTION OF THE DRAWINGS

FIG. 8 illustrates an example of a flowchart for a wearable device according to an embodiment.

FIGS. 12A to 12B illustrate an example of an operation in which a wearable device displays another visual object in a portion distinguished from a visual object focused by a user according to an embodiment.

FIG. 14 illustrates an example of a flowchart for a wearable device according to an embodiment.

FIG. 16 is an exemplary diagram of a network environment associated with a metaverse service.

DETAILED DESCRIPTION

Figure 1:
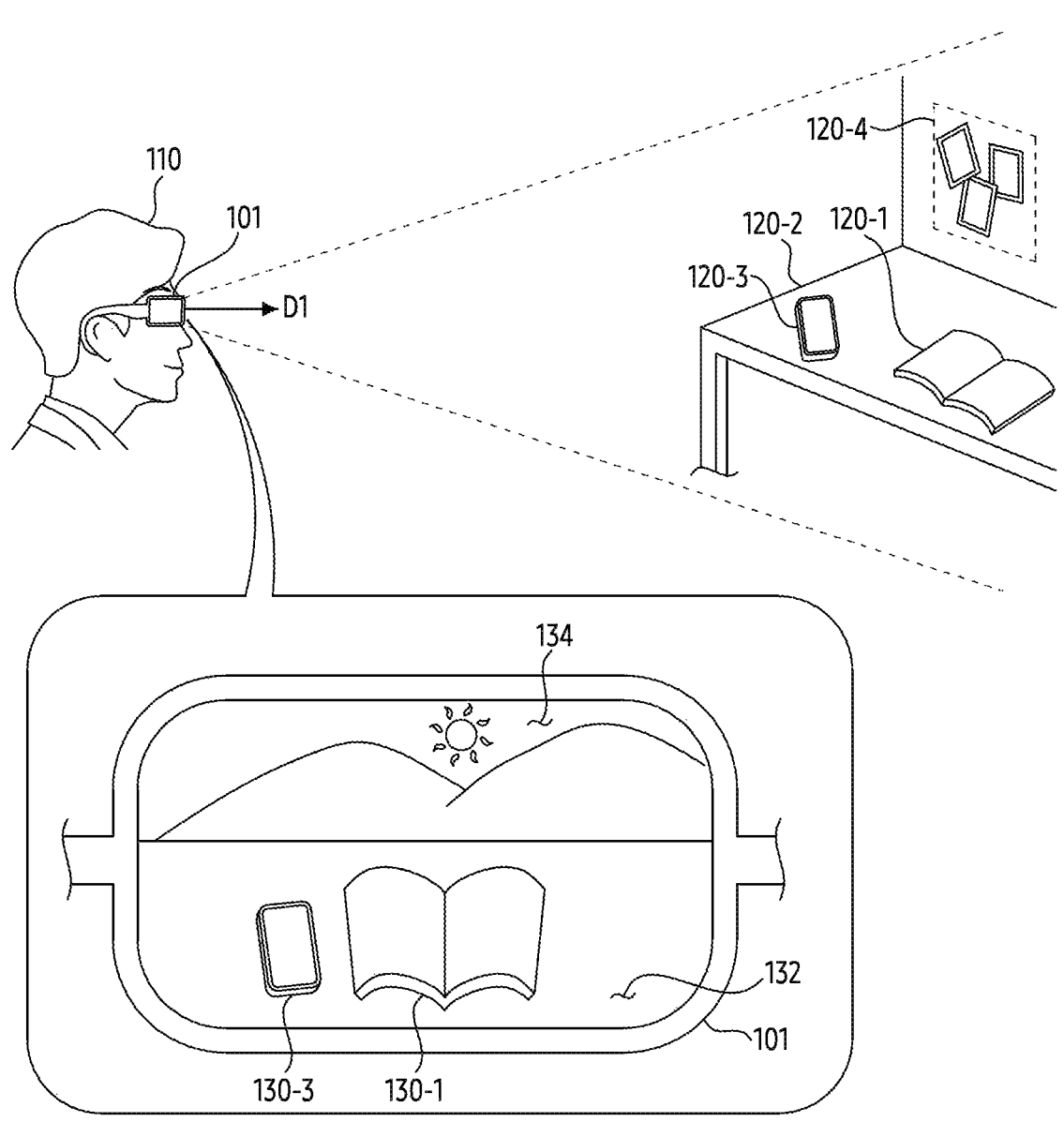
FIG. 1 illustrates an example of an operation in which a wearable device recognizes a plurality of visual objects according to an embodiment.

Hereinafter, various embodiments of the present document will be described with reference to the accompanying drawings.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 illustrates an example of an operation in which a wearable device 101 recognizes a plurality of visual objects according to an embodiment. In an embodiment of FIG. 1, the wearable device 101 may include a head-mounted display (HMD) that is wearable on a head of a user 110. Although the appearance of the wearable device 101 having a form of glasses is illustrated, the embodiment is not limited thereto. An example of the structure of the wearable device 101 that is wearable on the head of the user 110 will be described with reference to FIGS. 3A to 3B and/or 4A to 4B. One or more pieces of hardware included in the wearable device 101 will be exemplarily described with reference to FIG. 2.

According to an embodiment, the wearable device 101 may execute a function associated with video see-through or visual see-through (VST) and/or virtual reality (VR). Referring to FIG. 1, the wearable device 101 may include a housing that covers the eyes of the user 110, in a state in which the user 110 is wearing the wearable device 101. The wearable device 101 may include a display disposed on a first surface facing the eyes in the above state. The wearable device 101 may include a camera disposed on a second surface opposite to the first surface. By using the camera, the wearable device 101 may obtain frames including ambient light. The wearable device 101 may make the user 110 recognize the ambient light through the display, by outputting the frames in the display disposed on the first surface. A display area of the display disposed on the first surface may be formed by one or more pixels included in the display. The wearable device 101 may make the user 110 recognize a virtual object together with a real object recognized by the ambient light, by synthesizing the virtual object in the frames outputted through the display.

According to an embodiment, the wearable device 101 may execute a function associated with augmented reality (AR) and/or mixed reality (MR). In an embodiment of FIG. 1, in the state in which the user 110 is wearing the wearable device 101, the wearable device 101 may include at least one lens disposed adjacent to the eyes of the user 110. The wearable device 101 may combine light emitted from the display of the wearable device 101 with the ambient light passing through the lens. The display area of the display may be formed in the lens through which the ambient light passes. Since the wearable device 101 combines the ambient light and the light emitted from the display, the user 110 may view an image in which the real object recognized by the ambient light and the virtual object formed by the light emitted from the display are mixed.

According to an embodiment, the wearable device 101 may display the virtual object together with the real object included in the display area. In the state in which the user 110 is wearing the wearable device 101, the user 110 may view the image in which the real object and the virtual object are mixed through the display area. Referring to FIG. 1, an exemplary case in which a direction D1 of the head of the user 110 wearing the wearable device 101 faces a first external object 120-1 to a fourth external object 120-4 is illustrated. In the above case, the wearable device 101 may obtain frames in which the first external object 120-1 to the fourth external object 120-4 are captured, by using a camera facing a front direction (e.g., the direction D1) of the user 110 wearing the wearable device 101. The wearable device 101 may recognize the first external object 120-1 to the fourth external object 120-4 in the frames. The wearable device 101 recognizing the external object may include an operation of segmenting a visual object representing the external object in the frames. The wearable device 101 recognizing the external object may include an operation of identifying a position and/or size of the visual object representing the external object in the frames. The wearable device 101 recognizing the external object may include an operation of identifying a type of the external object based on the visual object. In the exemplary case of FIG. 1, the wearable device 101 may identify that a first visual object corresponding to the first external object 120-1 in the frame represents a book, a second visual object corresponding to the second external object 120-2 represents a desk on which the book is disposed, a third visual object corresponding to the third external object 120-3 represents a mobile phone, and a fourth visual object corresponding to the fourth external object 120-4 represents a plurality of photos attached to a wall surface.

According to an embodiment, the wearable device 101 may display frames obtained from the camera facing the front direction of the user 110 on the display of the wearable device 101. The frames may include a plurality of visual objects representing each of the first external object 120-1 to the fourth external object 120-4. Since the wearable device 101 sequentially displays the frames in a time domain, the user 110 may view at least one of the first external object 120-1 to the fourth external object 120-4. According to an embodiment, the wearable device 101 may individually modify whether the visual objects corresponding to each of the first external object 120-1 to the fourth external object 120-4 are visible to the user 110, by at least partially modifying the frames. For example, the wearable device 101 may individually adjust the visibility of the visual objects corresponding to the first external object 120-1 to the fourth external object 120-4, in the AR and/or the MR shown to the user 110 wearing the wearable device 101.

In an embodiment, the wearable device 101 including a display covering both eyes of the user 110 wearing the wearable device 101 may obtain the frames from a camera disposed along a direction of the second surface opposite to the first surface on which the display is disposed. Referring to FIG. 1, an exemplary state in which the wearable device

101 displays the frames in which at least one portion is modified to the user 110 is illustrated. The wearable device 101 may identify an input indicating the focus of at least one of a plurality of external objects. In the case that the user 110 directly interacts with the external object, it may be determined that the external object is focused. For example, the wearable device 101 may identify the external object that directly interacts with the user 110 based on a motion (e.g., a motion of the head, eyes, and/or hand of the user) of the user 110.

In the exemplary case of FIG. 1, it is assumed that the wearable device 101 receives an input for selecting a first visual object 130-1. In one or more embodiments, it is assumed that the wearable device 101 identifies the first visual object 130-1 selected or focused by the user 110. In an embodiment, it is assumed that the wearable device 101 receives an input indicating the focus of the first visual object 130-1. Based on the input, the wearable device 101 may occlude or remove visual objects different from the first visual object 130-1, in the frames. For example, the wearable device 101 may selectively display the first visual object 130-1 representing the first external object 120-1 among the plurality of visual objects. The wearable device 101 may remove other visual objects different from the first visual object 130-1 focused by the user 110 in the field of view of the user 110. The wearable device 101 may help the user 110 concentrate on the first external object 120-1, by removing the other visual objects. According to an embodiment, an operation in which the wearable device 101 modifies the frames in order to help the user 110 concentrate on the first visual object 130-1 will be described with reference to FIG. 5. According to an embodiment, an operation in which the wearable device 101 receives an input indicating the focus of a specific visual object, such as the first visual object 130-1, will be described with reference to FIGS. 6A to 6B and FIGS. 7 to 8.

According to an embodiment, the wearable device 101 may classify the other visual objects in the display area of the wearable device 101 based on the first visual object 130-1 focused by user 110. Referring to FIG. 1, the wearable device 101 may classify the visual objects corresponding to each of the first external object 120-1 to the fourth external object 120-4 into one of preset categories. The preset categories may be classified by a condition (hereinafter referred to as displaying condition) for displaying the visual object representing the external object in the frame. For example, the wearable device 101 may classify the first visual object 130-1 into a first preset category, which is a category for classifying the visual object focused by the user 110, based on an input indicating the focus of the first visual object 130-1.

According to an embodiment, the wearable device 101 may classify the second visual object representing the second external object 120-2 (e.g., a table, desk, etc.) in contact with the first external object 120-1 into a second preset category. The wearable device 101 may classify the second visual object corresponding to the second external object 120-2 into the second preset category, based on identifying the first external object 120-1 corresponding to the first visual object 130-1 and the second external object 120-2 disposed in a threshold distance. The threshold distance can a predetermined distance between external objects, and the distance separating the first external object 120-1 and the second external object 120-2 can be within the threshold distance. The wearable device 101 may classify the second visual object corresponding to the second external object 120-2 in contact with the first external object 120-1 into the second preset category. For example, the wearable device 101 may display an image 132 for enhancing the visibility of the first visual object 130-1 on the second visual object classified into the second preset category in the display area. The embodiment is not limited thereto, and the wearable device 101 may maintain displaying the second visual object classified into the second preset category. The image 132 may be displayed superimposed on a portion where the second external object 120-2 is visible in the display area. An operation in which the wearable device 101 displays the image 132 based on the second visual object classified into the second preset category will be described with reference to FIG. 9.

According to an embodiment, the wearable device 101 may classify the other external object different from the first visual object 130-1 and the second visual object, among the plurality of visual objects, into the other category different from the first preset category and the second preset category. The other category may include a category for at least temporarily ceasing displaying the visual object representing the external object in the field of view of the user 110. For example, the wearable device 101 may classify the third visual object 130-3 corresponding to the third external object 120-3 including a speaker (e.g., a device) into a fourth preset category for conditionally allowing the display of the visual object. An operation in which the wearable device 101 displays the third visual object 120-3 corresponding to the third external object 120-3 based on a state (e.g., a state of the third external object 120-3 associated with sound) of the third external object 130-3 will be described with reference to FIGS. 10A to 10B and FIGS. 11A to 11B.

For example, the wearable device 101 may classify the fourth visual object corresponding to the fourth external object 120-4 into a third preset category for ceasing the display of the visual object. The wearable device 101 may classify a background (e.g., a visual object corresponding to the wall surface to which the fourth external object 120-4 is attached) in the frame that is different from the above-described external objects into a fifth preset category. An operation in which the wearable device 101 displays a visual object for occluding the external object classified into the third preset category and/or the fifth preset category, such as an image 134 will be described with reference to FIGS. 12A to 12B. The wearable device 101 may additionally identify another external object (e.g., an object approaching the user 110) different from the plurality of external objects, in a state of hiding another visual object distinguished from the first visual object 130-1, in the frame. Based on additionally identifying the other external object, the wearable device 101 may display the visual object representing the other external object to the user 110. According to an embodiment, an example of an operation in which the wearable device 101 performs based on identifying the other external object will be described with reference to FIGS. 13 and 14.

As described above, according to an embodiment, the wearable device 101 may limit displaying another visual object representing another external object different from the first external object 120-1 while maintaining displaying the first visual object 130-1 representing the first external object 120-1 focused by the user 110. The wearable device 101 may improve the visibility of the first external object 120-1 that directly interacts with the user 110 by limiting displaying the other visual object. For example, the wearable device 101 may limit that another external object distinguished from the first external object 120-1 is visible to the user 110, in order to help the action of the user 110 concentrating on the first external object 120-1 for reading, as in the exemplary case of FIG. 1. According to an embodiment, an operation performed by the wearable device 101 in order to help the action of the user 110 in another case different from the case of FIG. 1 will be described with reference to FIGS. 15A to 15C.

Hereinafter, one or more pieces of hardware included in the wearable device 101 according to an embodiment will be described with reference to FIG. 2.

Figure 2:
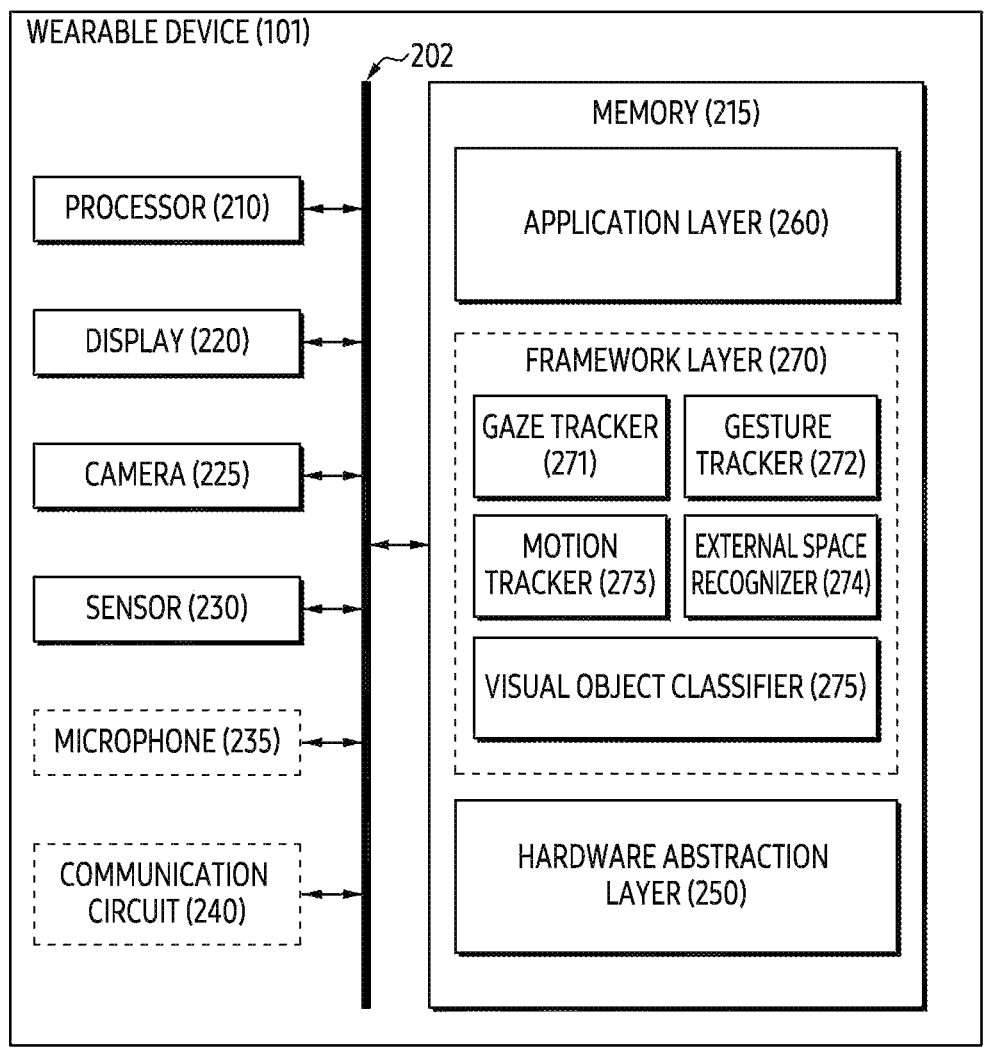
FIG. 2 illustrates an example of a block diagram of a wearable device according to an embodiment.

FIG. 2 illustrates an example of a block diagram of a wearable device 101 according to an embodiment. The wearable device 101 of FIG. 2 may include the wearable device 101 of FIG. 1.

According to an embodiment, the wearable device 101 may include at least one of a processor 210, a memory 215, a display 220, a camera 225, a sensor 230, a microphone 235, or a communication circuit 240. The processor 210, the memory 215, the display 220, the camera 225, the sensor 230, the microphone 235, and the communication circuit 240 may be electronically and/or operably coupled with each other by an electronical component such as a communication bus 202. Hereinafter, that the hardware operably coupled with each other may mean that a direct connection or an indirect connection between hardware is established by wire or wirelessly so that a second hardware is controlled by a first hardware among the hardware. Although illustrated based on different blocks, the embodiment is not limited thereto, and a portion (e.g., at least a portion of the processor 210, the memory 215, and the communication circuit 240) of the hardware of FIG. 2 may be included in a single integrated circuit such as a system on a chip (SoC). The type and/or number of hardware included in the wearable device 101 is not limited to that illustrated in FIG. 2. For example, the wearable device 101 may include only a portion of the hardware components illustrated in FIG. 2.

In an embodiment, the processor 210 of the wearable device 101 may include hardware for processing data based on one or more instructions. The hardware component for processing data may include, for example, an arithmetic and logic unit (ALU), a floating point unit (FPU), a field programmable gate array (FPGA), a central processing unit (CPU), and/or application processor (AP). The processor 210 may have a structure of a single-core processor or may have a structure of a multi-core processor such as a dual core, a quad core, or a hexa core.

In an embodiment, the memory 215 of the wearable device 101 may include a hardware component for storing data and/or instructions inputted and/or outputted to the processor 210 of the wearable device 101. The memory 215 may include, for example, volatile memory such as random-access memory (RAM), and/or non-volatile memory such as read-only memory (ROM). The volatile memory may include, for example, at least one of dynamic RAM (DRAM), static RAM (SRAM), Cache RAM, and pseudo SRAM (PSRAM). The non-volatile memory may include, for example, at least one of a programmable ROM (PROM), an erasable PROM (EPROM), an electrically erasable PROM (EEPROM), a flash memory, a hard disk, a compact disk, solid state drive (SSD) and an embedded multi media card (eMMC).

In an embodiment, the display 220 of the wearable device 101 may output visualized information (e.g., a visual object and/or a screen illustrated in FIGS. 1, 6A to 6B, 9, 10A to 10B, 12A to 12B, 13, 15A to 15C) to a user (e.g., a user 110 of FIG. 1). For example, the display 220 may output the visualized information to the user, by being controlled by the processor 210 including a circuit such as a graphic processing unit (GPU). The display 220 may include a flat panel display (FPD) and/or electronic paper. The FPD may include a liquid crystal display (LCD), a plasma display panel (PDP), and/or one or more light emitting diodes (LEDs). The LED may include an organic LED (OLED). The display 220 of FIG. 2 may include at least one display 350, which will be described later with reference to FIGS. 3A to 3B and/or FIGS. 4A to 4B.

In an embodiment, the camera 225 of the wearable device 101 may include one or more light sensors (e.g., a charged coupled device (CCD) sensor and a complementary metal oxide semiconductor (CMOS) sensor) that generate an electrical signal indicating the color and/or brightness of light. A plurality of light sensors included in the camera 225 may be disposed in a form of a two (2) dimensional array. The camera 225 may generate 2 dimensional frame data corresponding to the light reaching the light sensors of the 2 dimensional array, by obtaining the electrical signal of each of the plurality of light sensors substantially simultaneously. For example, photo data captured using the camera 225 may mean a 2 dimensional frame data obtained from the camera 225. For example, video data captured using the camera 225 may mean a sequence of a plurality of 2 dimensional frame data obtained from the camera 225 according to a frame rate. The camera 225 is disposed toward a direction in which the camera 225 receives light, and may further include a flash light for outputting light toward the direction. Although the camera 225 is illustrated based on a single block, the number of cameras 225 included in the wearable device 101 is not limited to the embodiment. Like one or more cameras 340, which will be described later with reference to FIGS. 3A to 3B and/or FIGS. 4A to 4B, the wearable device 101 may include one or more cameras.

According to an embodiment, the sensor 230 of the wearable device 101 may generate electrical information that may be processed by the processor 210 and/or the memory 215 of the wearable device 101 from non-electronic information associated with the wearable device 101. The information may be referred to as sensor data. The sensor 230 may include a global positioning system (GPS) sensor, an image sensor, an illuminance sensor, and/or a time-of-flight (ToF) sensor for detecting a geographic location of the wearable device 101, and an inertial measurement unit (IMU) for detecting a physical motion of the wearable device 101. For example, the wearable device 101 may identify a direction (e.g., a direction D1 of FIG. 1) of the wearable device 101 by using the sensor 230 including the IMU.

According to an embodiment, the wearable device 101 may include the microphone 235 that outputs an electrical signal indicating vibration of the atmosphere. For example, the wearable device 101 may output an audio signal including a speech of the user, by using the microphone 235. The speech of the user included in the audio signal may be converted into information in a format recognizable by the processor 210 of the wearable device 101, based on a voice recognition model and/or a natural language understanding model. For example, the wearable device 101 may execute one or more functions among a plurality of functions that may be provided by the wearable device 101, by recognizing the speech of the user.

In an embodiment, the communication circuit 240 of the wearable device 101 may include a hardware component for supporting transmission and/or reception of an electrical signal between the wearable device 101 and an external electronic device. The communication circuit 240 may include, for example, at least one of a modem (MODEM), an antenna, and an optic/electronic (O/E) converter. The communication circuit 240 may support transmission and/or reception of the electrical signal based on various types of protocols such as ethernet, local area network (LAN), wide area network (WAN), wireless fidelity (WiFi), Bluetooth, bluetooth low energy (BLE), ZigBee, long term evolution (LTE), 5G new radio (NR) and/or 6G.

Although not illustrated, according to an embodiment, the wearable device 101 may include an output means for outputting information in a form other than a visualized form. For example, the wearable device 101 may include a speaker for outputting an acoustic signal. For example, the wearable device 101 may include a motor for providing haptic feedback based on vibration.

Referring to an embodiment of FIG. 2, in the memory 215 of the wearable device 101, one or more instructions (or commands) indicating a calculation and/or operation to be performed on data by the processor 210 of the wearable device 101 may be stored. A set of one or more instructions may be referred to as program, firmware, operating system, process, routine, sub-routine and/or application. Hereinafter, that an application is installed in an electronic device (e.g., the wearable device 101) may mean that the one or more instructions provided in a form of an application are stored in the memory 215, and the one or more applications are stored in an format (e.g., a file having an extension preset by an operating system of the wearable device 101) executable by a processor of the electronic device.

Referring to FIG. 2, programs installed in the wearable device 101 may be classified into any one layer among different layers including an application layer 260, a framework layer 270 and/or a hardware abstraction layer (HAL) 250, based on a target. For example, in the hardware abstraction layer (HAL) 250, programs (e.g., drivers) designed to target the hardware (e.g., the display 220, the camera 225, the sensor 230, and/or the communication circuit 240) of the wearable device 101 may be classified. For example, in the framework layer 270, programs (e.g., a gaze tracker 271, a gesture tracker 272, a motion tracker 273, an external space recognizer 274 and/or a visual object classifier 275) designed to target at least one of the hardware abstraction layer (HAL) 250 and/or the application layer 260 may be classified. The programs classified into the framework layer 270 may provide an application programming interface (API) executable based on another program.

Referring to FIG. 2, in the application layer 260, a program designed to target a user (e.g., the user 110 of FIG. 1) who controls the wearable device 101 may be classified. For example, the program classified into the application layer 260 may include an application for browsing an image and/or a video stored in the memory 215 of the wearable device 101, such as a gallery application. The embodiment is not limited thereto. For example, the program classified into the application layer 260 may cause execution of a function supported by the programs classified into the framework layer 270, by calling the API.

Referring to FIG. 2, the wearable device 101 may process information associated with the gaze of the user wearing the wearable device 101 based on execution of the gaze tracker 271 in the framework layer 270. For example, the wearable device 101 may obtain an image including the eyes of the user from the camera 225. Based on the position and/or direction of the pupil included in the image, the wearable device 101 may identify the direction of the gaze of the user.

Referring to FIG. 2, the wearable device 101 may identify a motion of a preset body part including the hand based on execution of the gesture tracker 272 in the framework layer 270. For example, the wearable device 101 may obtain frames including the preset body part from the camera 225. Based on the motion and/or posture of the preset body part indicated by the frames, the wearable device 101 may identify a gesture performed by the preset body part.

Referring to FIG. 2, the wearable device 101 may identify a motion of the wearable device 101 based on execution of the motion tracker 273 in the framework layer 270. In a state in which the wearable device 101 is worn by the user, the motion of the wearable device 101 may be associated with a motion of the head of the user. For example, the wearable device 101 may identify a direction of the wearable device 101 that substantially coincides with a direction of the head, like the direction D1 of FIG. 1. The wearable device 101 may identify the motion of the wearable device 101 based on sensor data of the sensor 230 including the IMU.

Referring to FIG. 2, the wearable device 101 may obtain information on an external space in which the wearable device 101 is included or adjacent to the wearable device 101, based on execution of the external space recognizer 274 in the framework layer 270. The wearable device 101 may obtain the information, by using the camera 225 and/or the sensor 230. Referring to FIG. 2, in a state in which the external space recognizer 274 is executed, the wearable device 101 may identify a virtual space mapped to the external space based on the information obtained by the external space recognizer 274. Based on the execution of the external space recognizer 274, the wearable device 101 may identify the position and/or direction of the wearable device 101 in the external space. For example, based on the execution of the external space recognizer 274 and/or motion tracker 273, the wearable device 101 may perform simultaneous localization and mapping (SLAM) for recognizing the external space and the position of the wearable device 101 in the external space.

Referring to FIG. 2, the wearable device 101 may recognize at least one external object (e.g., a first external object 120-1 to a fourth external object 120-4 of FIG. 1) adjacent to the wearable device 101 based on execution of the visual object classifier 275 in the framework layer 270. The wearable device 101 may extract a visual object representing the external object in the frames, by performing object recognition (or image analysis engine) on frames outputted from the camera 225. The object recognition may be performed based on an application for subject recognition, referred to as the image analysis engine. Based on the extracted visual object, the wearable device 101 may identify an external object corresponding to the visual object.

According to an embodiment, the wearable device 101 may classify a plurality of visual objects (e.g., different portions of a frame representing external objects) based on a motion of the user wearing the wearable device 101, in the state in which the visual object classifier 275 is executed. The wearable device 101 may identify at least one visual object focused by the user, based on at least one of the information indicating the gaze of the user tracked by the gaze tracker 271, a gesture of the user identified by the gesture tracker 272, and/or the direction of the wearable device 101 detected by the motion tracker 273. For example, the wearable device 101 may detect at least one visual object that the user is concentrating on. Among the plurality of visual objects, based on a first visual object focused by the user, the wearable device 101 may classify the plurality of visual objects. The wearable device 101 classifying the plurality of visual objects may include an operation of classifying each of the plurality of visual objects into at least one of a plurality of preset categories included in Table 1.

TABLE 1

| Category | Classification Criteria |
|---|---|
| First preset category | The visual object focused by the user wearing the wearable device 101 |
| Second preset category | The visual object classified into the first preset category and/or a visual object linked to (or contacted with) the user wearing the wearable device 101 |
| Third preset category | A visual object to be removed in MR displayed to the user |
| Fourth preset category | Among the visual objects removed in the MR, a visual object to be displayed temporarily depending on the status |
| Fifth preset category (or background of the first preset category) | A visual object or area seen as a background of the visual object classified into the first preset category |
| Sixth preset category | A visual object corresponding to an external object entering into an external space visible to the user wearing the wearable device 101 |

According to an embodiment, the wearable device 101 may classify one or more visual objects in frames obtained from the camera 225 into any one of the preset categories in the Table 1, based on the execution of the visual object classifier 275. The one or more visual objects may represent one or more external objects included in the external space visible to the user wearing the wearable device 101. For example, the wearable device 101 may classify a visual object on which the user gazes for greater than a preset duration into the first preset category. An input for classifying a specific visual object into the first preset category is not limited to the above example. For example, the wearable device 101 may classify the visual object into the first preset category based on a speech including a name of the visual object. For example, the wearable device 101 may classify the visual object into the first preset category based on identifying a body part (e.g., a fingertip) superimposed on the visual object. For example, the wearable device 101 may classify the visual object into the first preset category based on the position and/or size of the visual object included in the frame. For example, the wearable device 101 may classify a visual object disposed in the center of the frame and/or a visual object greater than a preset size into the first preset category. The wearable device 101 may classify the group of visual objects into the first preset category, when the user has the same type and gaze at the visual objects that superimposes each other (or includes the visual objects). The wearable device 101 may recommend classifying one visual object into the first preset category or may recommend classifying another visual object linked to the visual object focused by the user into the first preset category, based on the history of the visual object (e.g., the visual object that the user gazes at) focused by the user. The history may include a time, frequency, number of times, and/or a duration in which the visual object is classified into the first preset category. In one or more embodiments, the history of visual objects classified into the first preset category (or any of the categories) can be stored in the wearable device 101 and/or stored in a computer system/device coupled and accessible to the wearable device 101.

According to an embodiment, the wearable device 101 may classify the second visual object shown adjacent to the first visual object or in contact with the first visual object into the second preset category, based on classifying the first visual object into the first preset category. The wearable device 101 may identify the second visual object that is in contact with the first visual object by exceeding a preset area, based on a position relationship between the first visual object and another visual object. The wearable device 101 may classify the second visual object into the second preset category. The wearable device 101 may obtain the position relationship and/or the area in contact with the first visual object and the second visual object by controlling the sensor 230 (e.g., a depth sensor including a ToF sensor). For example, the wearable device 101 may classify the second visual object supporting the first visual object into the second preset category. For example, the wearable device 101 may classify the second visual object associated with the position and/or movement of the first visual object into the second preset category. In one or more embodiments, the wearable device 101 may classify the second visual object into the second preset category based on, for example, the second external object 120-2 corresponding to second visual object being within the threshold distance of the first external object 120-1 corresponding to the first visual object.

According to an embodiment, the wearable device 101 may classify a visual object different from a visual object classified into any one of the first preset category and the second preset category into any one category among the third preset category to fifth preset category. For example, the wearable device 101 may classify a visual object on which the user gazes for less than a preset duration into the third preset category. For example, the wearable device 101 may classify a visual object different from the first visual object into the third preset category, based on the relevance with the first visual object classified into the first preset category. The wearable device 101 may obtain a degree of similarity between the visual objects, by comparing the types of visual objects included in the frame of the camera 225. The degree of similarity may be stored in a database in which the degree of similarity between types is previously set. The wearable device 101 may identify degrees of similarity between the visual objects (e.g., degrees of similarity between the first visual object and other visual objects of the first preset category) from the database by using the types of visual objects. The database may include a knowledge graph, which is a set of digital values representing interconnections between the types. The wearable device 101 may classify another visual object having a degree of similarity lower than a threshold degree of similarity with respect to the first visual object among the degrees of similarity into the third preset category. For example, the visual object whose relevance is lower than the preset relevance may be classified into the third preset category. The relevance may indicate a probability that a motion linked to the first visual object is performed. In one or more embodiments, the relevance may indicate a probability that a motion linked to the first visual object is performed in relation to the visual object. In one or more embodiments, the more likely (in the database) the motion of the first visual object is performed in relation to the visual object, the higher the relevance. Conversely, the less likely (in the database) the motion of the first visual object is performed in relation to the visual object, the lower the relevance according to one or more embodiments.

For example, the wearable device 101 may classify another visual object representing another external object having a probability (or a probability of occurrence of an event ceasing the motion) of ceasing the motion of the user with respect to the visual object classified into the first preset category into the fourth preset category. The motion of the user with respect to the visual object classified into the first preset category may include a movement of a body part (e.g., hand) of the user directly in contact with the visual object or a movement of the body part for touching the visual object. The motion of the user with respect to the visual object classified into the first preset category may include a movement of the user gazing at the visual object. For example, the wearable device 101 may classify a visual object representing an external object including the speaker (e.g., a device), such as an alarm clock and/or a mobile phone, into the fourth preset category. For example, the wearable device 101 may classify a visual object corresponding to an external object, which may interfere with the concentration of the user with respect to the visual object classified into the first preset category by a modification of a state (e.g., toppling of a cup), such as a cup with water, into the fourth preset category. The wearable device 101 may include an artificial neural network for object recognition, such as a convolutional neural network (CNN) and/or a backbone neural network, in order to classify a specific visual object into the fourth preset category.

For example, the wearable device 101 may classify another visual object that is a background of the visual object classified into the first preset category into the fifth designated category. The wearable device 101 may classify a visual object which is another portion distinguished from a portion that the visual object classified into the first preset category and the second preset category is visible, or a visual object shown in the other portion, into the fifth preset category.

For example, the wearable device 101 may classify a visual object added in a frame after the specific frame after the timing at which the user classifies the visual objects in the specific frame into the sixth preset category. The wearable device 101 may classify a visual object representing the external object based on the motion of the external object entering into the external space after the timing, the sound generated from the external object, and/or the distance between the external object and the wearable device 101, into the sixth preset category.

According to an embodiment, the wearable device 101 may modify the visibility of each of the one or more visual objects based on a result of classifying the one or more visual objects based on the execution of the visual object classifier 275. For example, the wearable device 101 may occlude or remove a visual object classified into the third preset category in the frame, by at least partially modifying a frame obtained from the camera 225. The wearable device 101 may maintain the visibility of the visual object by modifying another portion distinguished from a portion of a frame in which the visual object classified into the first preset category is displayed. The wearable device 101 may reduce the visibility of another visual object (e.g., not in the first present category) that interferes with the immersion of the user with respect to the visual objects classified into the first preset category based on modifying the other portion in the frame.

As described above, according to an embodiment, in a state of displaying the frame in which a plurality of visual objects are captured, the wearable device 101 may adjust the visibility of each of the plurality of visual objects based on each category (e.g., any one of the preset categories of Table 1) of the plurality of visual objects. For example, the wearable device 101 may determine the category of the plurality of external objects based on a degree (e.g., time the user gazed and/or distance spaced apart from the user) of being focused by the user. For example, the wearable device 101 may obtain information generated by classifying the plurality of visual objects based on the preset categories, based on the execution of the visual object classifier 275. The categories of the visual objects may be classified into the preset categories of the Table 1, based on the displaying condition of the visual objects representing the visual objects. The wearable device 101 may reduce the visibility of other visual objects that are distinguished from a specific external object focused on by the user or may occlude the other visual objects.

Hereinafter, an example of a form factor of the wearable device 101 according to an embodiment will be described by using FIGS. 3A to 3B and/or FIGS. 4A to 4B.

Figure 3A:
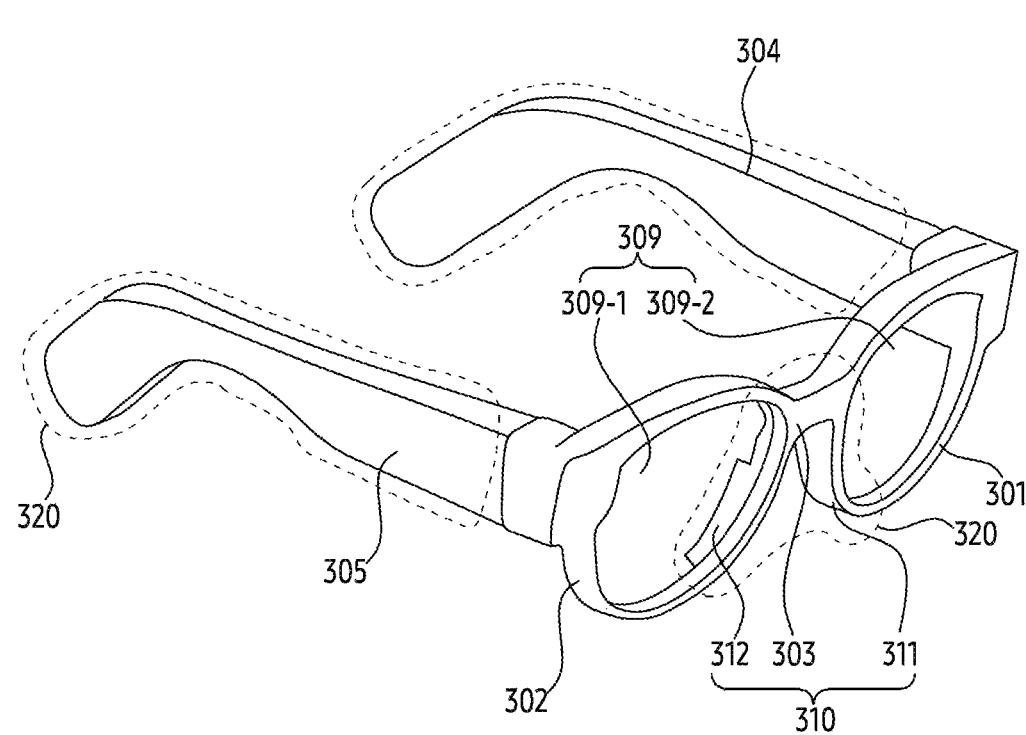
FIG. 3A illustrates an example of a perspective view of a wearable device according to an embodiment.

FIG. 3A illustrates an example of a perspective view of a wearable device 300 according to an embodiment. FIG. 3B illustrates an example of one or more hardware (or pieces of hardware) disposed in a wearable device 300 according to an embodiment. The wearable device 300 of FIGS. 3A to 3B may include the wearable device 101 of FIGS. 1A to 1B and/or FIG. 2. As shown in FIG. 3A, according to an embodiment, the wearable device 300 may include at least one display 350 and a frame supporting the at least one display 350.

According to an embodiment, the wearable device 300 may be wearable on a portion of the user's body. The wearable device 300 may provide augmented reality (AR), virtual reality (VR), or mixed reality (MR) combining the augmented reality and the virtual reality to a user wearing the wearable device 300. For example, the wearable device 300 may output a virtual reality image to a user through the at least one display 350 in response to a user's preset gesture obtained through a motion recognition camera 340-2 of FIG. 3B.

According to an embodiment, the at least one display 350 in the wearable device 300 may provide visual information to a user. The at least one display 350 may include the display 220 of FIG. 2. For example, the at least one display 350 may include a transparent or translucent lens 309 (e.g., a lens 309-1 corresponding to user's right eye and a lens 309-2 corresponding to user's left eye). The at least one display 350 may include a first display 350-1 and/or a second display 350-2 spaced apart from the first display 350-1. For example, the first display 350-1 and the second display 350-2 may be disposed at positions corresponding to the user's left and right eyes, respectively.

Figure 3B:
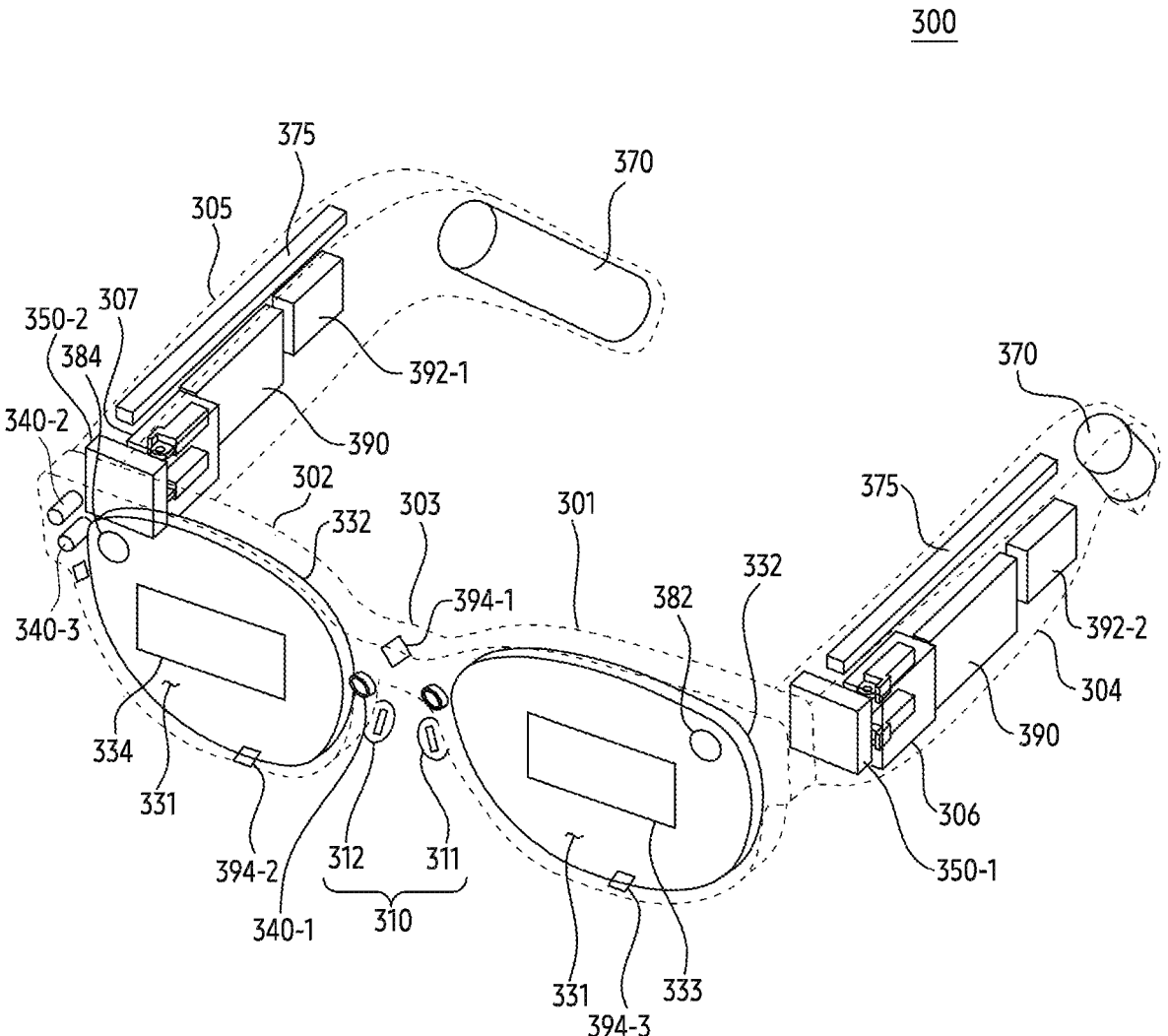
FIG. 3B illustrates an example of one or more hardware disposed in a wearable device according to an embodiment.

Referring to FIG. 3B, the at least one display 350 may provide another visual information, which is distinct from the visual information, together with the visual information included in the ambient light passing through the lens, to a user wearing the wearable device 300, by forming a displaying area on the lens. The lens may be formed based on at least one of a fresnel lens, a pancake lens, or a multi-channel lens. For example, the displaying area formed by the at least one display 350 may be formed on the second surface 332 among the first surface 331 and the second surface 332 of the lens. When the user wears the wearable device 300, the ambient light may be transmitted to the user by being incident on the first surface 331 and being penetrated through the second surface 332. For another example, the at least one display 350 may display the virtual reality image to be combined with a real screen transmitted through the ambient light. The virtual reality image output-ted from the at least one display 350 may be transmitted to the user's eyes through the one or more hardware (e.g., optical devices 382 and 384, and/or at least one waveguides 333 and 334)) included in the wearable device 300.

According to an embodiment, the wearable device 300 may include the waveguides 333 and 334 that diffract light transmitted from the at least one display 350 having been relayed by the optical devices 382 and 384 and transmits it to the user. The waveguides 333 and 334 may be formed based on at least one of glass, plastic, or polymer. A nano pattern may be formed on at least a portion of the outside or inside of the waveguides 333 and 334. The nano pattern may be formed based on a grating structure having a polygonal or curved shape. Light incident to one end of the waveguides 333 and 334 may be propagated to the other end of the waveguides 333 and 334 by the nano pattern. The wave-guides 333 and 334 may include at least one of at least one diffraction element (e.g., a diffractive optical element (DOE), a holographic optical element (HOE)), and a reflec-tion element (e.g., a reflection mirror). For example, the waveguides 333 and 334 may be disposed in the wearable device 300 to guide a screen displayed by the at least one display 350 to the user's eyes. For example, the screen may be transmitted to the user's eyes based on total internal reflection (TIR) generated in the waveguides 333 and 334.

According to an embodiment, the wearable device 300 may analyze an object included in a real image collected through a photographing camera 340-1, combine a virtual object corresponding to an object that became a subject of augmented reality provision among the analyzed object, and display them on the at least one display 350. The virtual object may include at least one of text and images for various information associated with the object included in the real image. The wearable device 300 may analyze the object based on a multi-camera such as a stereo camera. For the object analysis, the wearable device 300 may execute time-of-flight (ToF) and/or simultaneous localization and mapping (SLAM) supported by the multi-camera. The user wearing the wearable device 300 may watch an image displayed on the at least one display 350.

According to an embodiment, the frame may be config-ured with a physical structure in which the wearable device 300 may be worn on the user's body. According to an embodiment, the frame may be configured so that when the user wears the wearable device 300, the first display 350-1 and the second display 350-2 may be positioned correspond-ing to the user's left and right eyes. The frame may support the at least one display 350. For example, the frame may support the first display 350-1 and the second display 350-2 to be positioned at positions corresponding to the user's left and right eyes.

Referring to FIG. 3A, according to an embodiment, the frame may include an area 320 at least partially in contact with the portion of the user's body in case that the user wears the wearable device 300. For example, the area 320 in contact with the portion of the user's body of the frame may include an area contacting a portion of the user's nose, a portion of the user's ear, and a portion of the side of the user's face that the wearable device 300 contacts. According to an embodiment, the frame may include a nose pad 310 that contacts the portion of the user's body. When the wearable device 300 is worn by the user, the nose pad 310 may be contacted on the portion of the user's nose. The frame may include a first temple 304 and a second temple 305 that is contacted on another portion of the user's body that is distinct from the (nose) portion of the user's body.

For example, the frame may include a first rim 301 surrounding at least a portion of the first display 350-1, a second rim 302 surrounding at least a portion of the second display 350-2, a bridge 303 disposed between the first rim 301 and the second rim 302, a first pad 311 disposed along a portion of the edge of the first rim 301 from one end of the bridge 303, a second pad 312 disposed along a portion of the edge of the second rim 302 from the other end of the bridge 303, the first temple 304 extending from the first rim 301 and fixed to a portion of the wearer's ear, and the second temple 305 extending from the second rim 302 and fixed to a portion of the ear opposite to the ear. The first pad 311 and the second pad 312 may be in contact with the portion of the user's nose, and the first temple 304 and the second temple 305 may be in contact with a portion of the user's face and the portion of the user's ear. The temples 304 and 305 may be rotatably connected to the rim through hinge units 306 and 307 of FIG. 3B. The first temple 304 may be rotatably connected with respect to the first rim 301 through the first hinge unit 306 disposed between the first rim 301 and the first temple 304. The second temple 305 may be rotatably connected with respect to the second rim 302 through the second hinge unit 307 disposed between the second rim 302 and the second temple 305. According to an embodiment, the wearable device 300 may identify an external object (e.g., a user's fingertip) touching the frame and/or a gesture performed by the external object by using a touch sensor, a grip sensor, and/or a proximity sensor formed on at least a portion of the surface of the frame.

According to an embodiment, the wearable device 300 may include hardware (e.g., hardware described above based on the block diagram of FIG. 2) that performs various functions. For example, the hardware may include a battery module 370, an antenna module 375, the optical devices 382 and 384, speakers 392-1 and 392-2, microphones 394-1, 394-2, and 394-3, a light emitting module (not illustrated), and/or a printed circuit board 390. Various hardware may be disposed in the frame.

According to an embodiment, the microphone 394-1, 394-2, and 394-3 of the wearable device 300 may obtain a sound signal, by being disposed on at least a portion of the frame. The first microphone 394-1 disposed on the nose pad 310, the second microphone 394-2 disposed on the second rim 302, and the third microphone 394-3 disposed on the first rim 301 are illustrated in FIG. 3B, but the number and disposition of the microphone 394 are not limited to an embodiment of FIG. 3B. In case that the number of the microphone 394 included in the wearable device 300 is two or more, the wearable device 300 may identify the direction of the sound signal by using a plurality of microphones disposed on different portions of the frame.

According to an embodiment, the optical devices 382 and 384 may transmit the virtual object transmitted from the at least one display 350 to the waveguides 333 and 334. For example, the optical devices 382 and 384 may be a projector. The optical devices 382 and 384 may be disposed adjacent to the at least one display 350 or may be included in the at least one display 350 as portion of the at least one display 350. The first optical device 382 may correspond to the first display 350-1, and the second optical device 384 may correspond to the second display 350-2. The first optical device 382 may transmit the light outputted from the first display 350-1 to the first waveguide 333, and the second optical device 384 may transmit light outputted from the second display 350-2 to the second waveguide 334.

In an embodiment, a camera 340 may include an eye tracking camera (ET CAM) 340-1, the motion recognition camera 340-2, and/or the photographing camera 340-3. The photographing camera 340-3, the eye tracking camera 340-1, and the motion recognition camera 340-2 may be disposed at different positions on the frame and may perform different functions. The photographing camera 340-3, the eye tracking camera 340-1, and the motion recognition camera 340-2 may be an example of the camera 225 of FIG. 2. The eye tracking camera 340-1 may output data indicating the gaze of the user wearing the wearable device 300. For example, the wearable device 300 may detect the gaze from an image including the user's pupil obtained through the eye tracking camera 340-1. An example in which the eye tracking camera 340-1 is disposed toward the user's right eye is illustrated in FIG. 3B, but the embodiment is not limited thereto, and the eye tracking camera 340-1 may be disposed alone toward the user's left eye or may be disposed toward two eyes.

In an embodiment, the photographing camera 340-3 may photograph a real image or background to be matched with a virtual image in order to implement the augmented reality or mixed reality content. The photographing camera may photograph an image of a specific object existing at a position viewed by the user and may provide the image to the at least one display 350. The at least one display 350 may display one image in which a virtual image provided through the optical devices 382 and 384 is overlapped with information on the real image or background including an image of the specific object obtained by using the photographing camera. In an embodiment, the photographing camera may be disposed on the bridge 303 disposed between the first rim 301 and the second rim 302.

In an embodiment, the eye tracking camera 340-1 may implement a more realistic augmented reality by matching the user's gaze with the visual information provided on the at least one display 350 by tracking the gaze of the user wearing the wearable device 300. For example, when the user looks at the front, the wearable device 300 may naturally display environment information associated with the user's front on the at least one display 350 at the position where the user is positioned. The eye tracking camera 340-1 may be configured to capture an image of the user's pupil in order to determine the user's gaze. For example, the eye tracking camera 340-1 may receive gaze detection light reflected from the user's pupil and may track the user's gaze based on the position and movement of the received gaze detection light. In an embodiment, the eye tracking camera 340-1 may be disposed at a position corresponding to the user's left and right eyes. For example, the eye tracking camera 340-1 may be disposed in the first rim 301 and/or the second rim 302 to face the direction in which the user wearing the wearable device 300 is positioned.

In an embodiment, the motion recognition camera 340-2 may provide a specific event to the screen provided on the at least one display 350 by recognizing the movement of the whole or portion of the user's body, such as the user's torso, hand, or face. The motion recognition camera 340-2 may obtain a signal corresponding to the gesture by recognizing the user's gesture, and may provide a display corresponding to the signal to the at least one display 350. The processor may identify a signal corresponding to the operation and may perform a preset function based on the identification. In an embodiment, the motion recognition camera 340-2 may be disposed on the first rim 301 and/or the second rim 302.

In an embodiment, the camera 340 included in the wearable device 300 is not limited to the above-described eye tracking camera 340-1 and the motion recognition camera 340-2. For example, the wearable device 300 may identify an external object included in the FoV by using the photographing camera 340-3 disposed toward the user's FoV. The wearable device 300 identifying the external object may be performed based on a sensor for identifying a distance between the wearable device 300 and the external object, such as a depth sensor and/or a time of flight (ToF) sensor. The camera 340 disposed toward the FoV may support an autofocus function and/or an optical image stabilization (OIS) function. For example, the wearable device 300 may include the camera 340 (e.g., a face tracking (FT) camera)

disposed toward the face in order to obtain an image including the face of the user wearing the wearable device 300.

Although not illustrated, the wearable device 300 according to an embodiment may further include a light source (e.g., LED) that emits light toward a subject (e.g., user's eyes, face, and/or an external object in the FoV) photographed by using the camera 340. The light source may include an LED having an infrared wavelength. The light source may be disposed on at least one of the frame, and the hinge units 306 and 307.

According to an embodiment, the battery module 370 may supply power to electronic components of the wearable device 300. In an embodiment, the battery module 370 may be disposed in the first temple 304 and/or the second temple 305. For example, the battery module 370 may be a plurality of battery modules 370. The plurality of battery modules 370, respectively, may be disposed on each of the first temple 304 and the second temple 305. In an embodiment, the battery module 370 may be disposed at an end of the first temple 304 and/or the second temple 305.

In an embodiment, the antenna module 375 may transmit the signal or power to the outside of the wearable device 300 or may receive the signal or power from the outside. The antenna module 375 may be electronically and/or operably connected to a communication circuit (e.g., the communication circuit 235 of FIG. 2) of the wearable device 300. In an embodiment, the antenna module 375 may be disposed in the first temple 304 and/or the second temple 305. For example, the antenna module 375 may be disposed close to one surface of the first temple 304 and/or the second temple 305.

In an embodiment, the speakers 392-1 and 392-2 may output a sound signal to the outside of the wearable device 300. A sound output module may be referred to as a speaker. In an embodiment, the speakers 392-1 and 392-2 may be disposed in the first temple 304 and/or the second temple 305 in order to be disposed adjacent to the ear of the user wearing the wearable device 300. For example, the wearable device 300 may include the second speaker 392-2 disposed adjacent to the user's left ear by being disposed in the first temple 304, and the first speaker 392-1 disposed adjacent to the user's right ear by being disposed in the second temple 305.

In an embodiment, the light emitting module (not illustrated) may include at least one light emitting element. The light emitting module may emit light of a color corresponding to a specific state or may emit light through an operation corresponding to the specific state in order to visually provide information on a specific state of the wearable device 300 to the user. For example, in a case that the wearable device 300 needs charging, it may repeatedly emit red light at a preset timing. In an embodiment, the light emitting module may be disposed on the first rim 301 and/or the second rim 302.

Referring to FIG. 3B, according to an embodiment, the wearable device 300 may include the printed circuit board (PCB) 390. The PCB 390 may be included in at least one of the first temple 304 or the second temple 305. The PCB 390 may include an interposer disposed between at least two sub PCBs. On the PCB 390, one or more hardware (e.g., hardware illustrated by the blocks described above with reference to FIG. 2) included in the wearable device 300 may be disposed. The wearable device 300 may include a flexible PCB (FPCB) for interconnecting the hardware.

According to an embodiment, the wearable device 300 may include at least one of a gyro sensor, a gravity sensor, and/or an acceleration sensor for detecting the posture of the wearable device 300 and/or the posture of a body part (e.g., a head) of the user wearing the wearable device 300. Each of the gravity sensor and the acceleration sensor may measure gravity acceleration, and/or acceleration based on preset 3-dimensional axes (e.g., x-axis, y-axis, and z-axis) perpendicular to each other. The gyro sensor may measure angular velocity of each of preset 3-dimensional axes (e.g., x-axis, y-axis, and z-axis). At least one of the gravity sensor, the acceleration sensor, and the gyro sensor may be referred to as an inertial measurement unit (IMU). According to an embodiment, the wearable device 300 may identify the user's motion and/or gesture performed to execute or stop a specific function of the wearable device 300 based on the IMU.

Figure 4A:
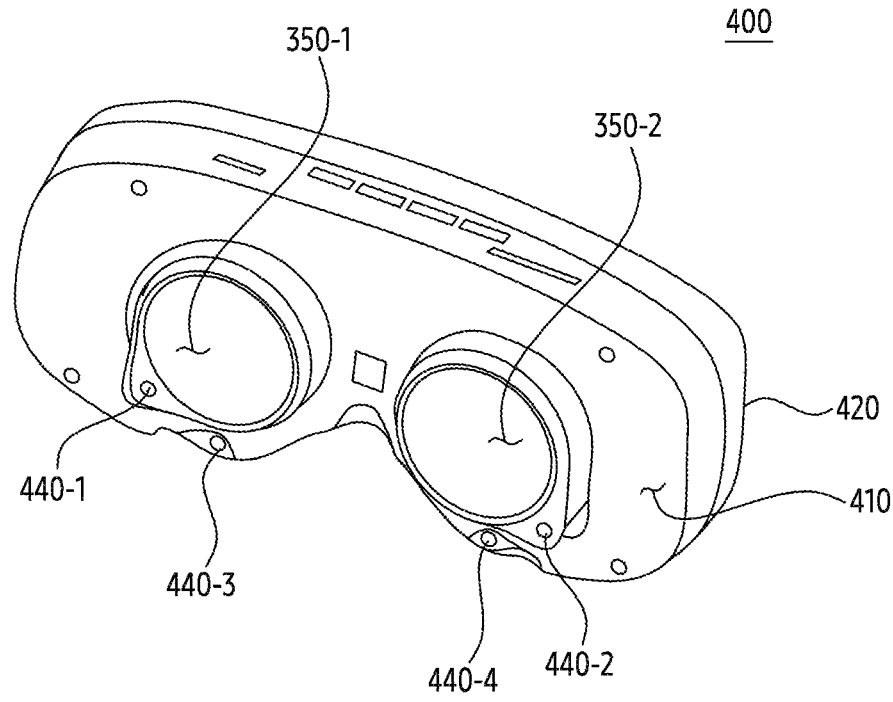
FIGS. 4A to 4B illustrate an example of the appearance of a wearable device according to an embodiment.
Figure 4B:
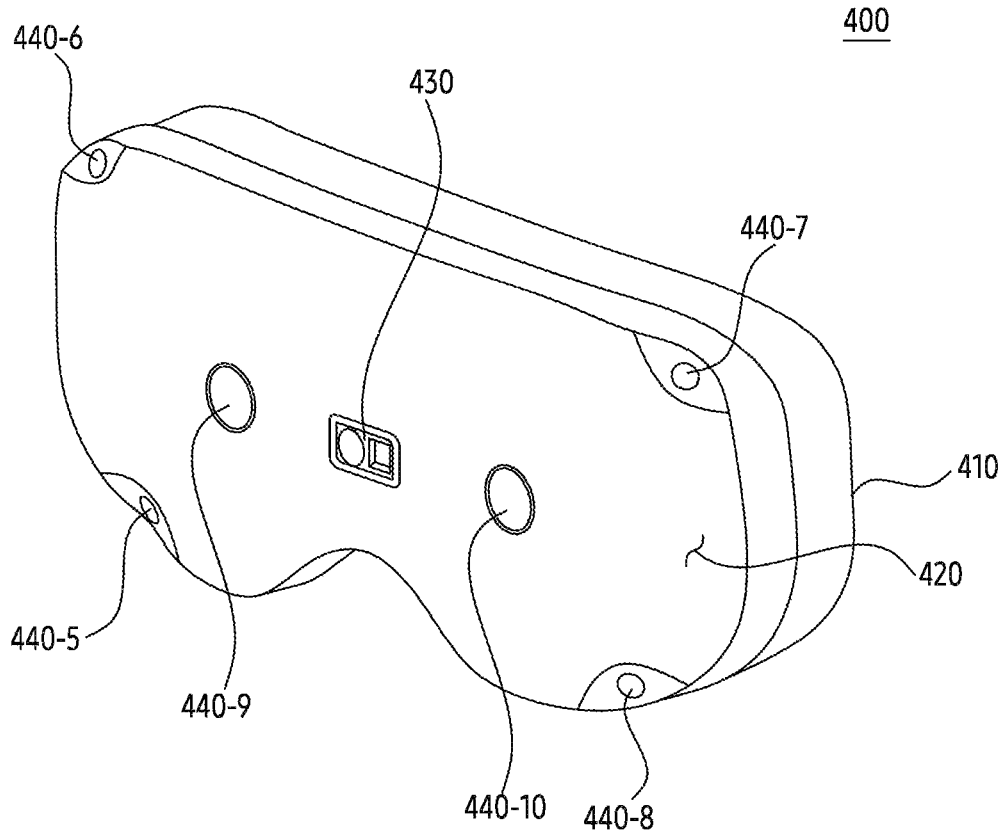

FIGS. 4A to 4B illustrate an example of the appearance of a wearable device 400 according to an embodiment. The wearable device 400 of FIGS. 4A to 4B may include the wearable device 101 of FIGS. 1A to 1B and/or FIG. 2. According to an embodiment, an example of an appearance of a first surface 410 of the housing of the wearable device 400 may be illustrated in FIG. 4A, and an example of an appearance of a second surface 420 opposite to the first surface 410 may be illustrated in FIG. 4B.

Referring to FIG. 4A, according to an embodiment, the first surface 410 of the wearable device 400 may have an attachable shape on the user's body part (e.g., the user's face). Although not illustrated, the wearable device 400 may further include a strap for being fixed on the user's body part, and/or one or more temples (e.g., a first temple 304 and/or a second temple 305 of FIGS. 3A to 3B). A first display 350-1 for outputting an image to the left eye among the user's two eyes and a second display 350-2 for outputting an image to the right eye among the user's two eyes may be disposed on the first surface 410. The wearable device 400 may be formed on the first surface 410 and may further include rubber or silicon packing for preventing interference by light (e.g., ambient light) different from the light emitted from the first display 350-1 and the second display 350-2.

According to an embodiment, the wearable device 400 may include cameras 440-1 and 440-2 for photographing and/or tracking two eyes of the user adjacent to each of the first display 350-1 and the second display 350-2. The cameras 440-1 and 440-2 may be referred to as ET cameras. According to an embodiment, the wearable device 400 may include cameras 440-3 and 440-4 for photographing and/or recognizing the user's face. The cameras 440-3 and 440-4 may be referred to as FT cameras.

Referring to FIG. 4B, a camera (e.g., cameras 440-5, 440-6, 440-7, 440-8, 440-9, and 440-10), and/or a sensor (e.g., a depth sensor 430) for obtaining information associated with the external environment of the wearable device 400 may be disposed on the second surface 420 opposite to the first surface 410 of FIG. 4A. For example, the cameras 440-5, 440-6, 440-7, 440-8, 440-9, and 440-10 may be disposed on the second surface 420 in order to recognize an external object different from the wearable device 400. For example, by using cameras 440-9, and 440-10, the wearable device 400 may obtain an image and/or video to be transmitted to each of the user's two eyes. The camera 440-9 may be disposed on the second surface 420 of the wearable device 400 to obtain an image to be displayed through the second display 350-2 corresponding to the right eye among the two eyes. The camera 440-10 may be disposed on the second surface 420 of the wearable device 400 to obtain an image to be displayed through the first display 350-1 corresponding to the left eye among the two eyes.

According to an embodiment, the wearable device 400 may include the depth sensor 430 disposed on the second surface 420 in order to identify a distance between the wearable device 400 and the external object. By using the depth sensor 430, the wearable device 400 may obtain spatial information (e.g., a depth map) about at least a portion of the FoV of the user wearing the wearable device 400.

Although not illustrated, a microphone for obtaining sound outputted from the external object may be disposed on the second surface 420 of the wearable device 400. The number of microphones may be one or more depending on embodiments.

As described above, according to an embodiment, the wearable device 400 may have a form factor for being worn on a head of a user. The wearable device 400 may provide a user experience based on augmented reality and/or mixed reality, in the state of being worn on the head. By using cameras 440-5, 440-6, 440-7, 440-8, 440-9, and 440-10 for tracking an external space and an external object (e.g., a first external object 120-1 to a fourth external object 120-4 of FIG. 1) in the external space, the wearable device 400 may obtain a frame with respect to the external space and may recognize a plurality of visual objects in the frame. Based on execution of a visual object classifier 275 of FIG. 2, the wearable device 400 may classify the plurality of visual objects into any one of a plurality of preset categories distinguished by displaying condition. The wearable device 400 may modify the visibility of the plurality of visual objects based on a preset category (e.g., preset categories of Table 1) matched to each of the plurality of visual objects in a first display 350-1 and a second display 350-2. For example, the wearable device 400 may reduce the visibility of another visual object different from the first visual object or may remove the other visual object while maintaining the visibility of the first visual object focused on by the user.

Hereinafter, an example of an operation in which the wearable device (e.g., the wearable device 101 of FIGS. 1 and 2) including the wearable device 300 of FIGS. 3A to 3B and/or the wearable device 400 of FIGS. 4A to 4B adjusts the visibility of each of the plurality of visual objects in the AR and/or the MR will be described with reference to FIG. 5.

Figure 5:
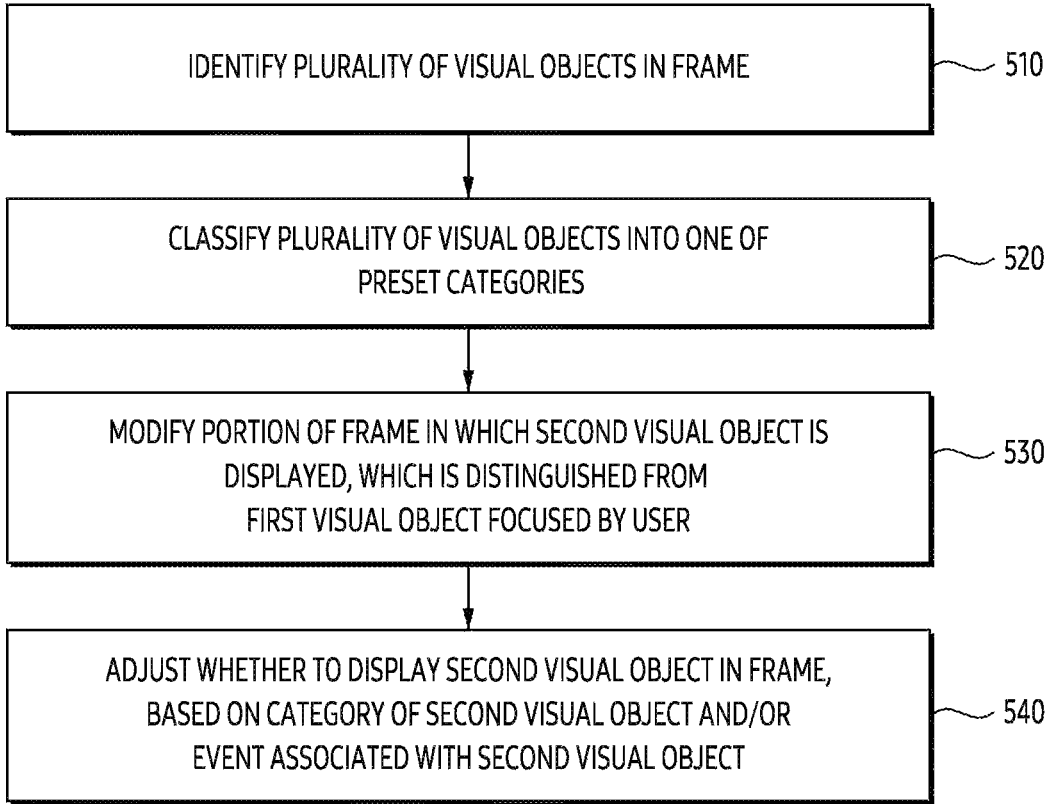
FIG. 5 illustrates an example of a flowchart for a wearable device according to an embodiment.

FIG. 5 illustrates an example of a flowchart for a wearable device according to an embodiment. A wearable device 101 of FIGS. 1 to 2 may include the wearable device of FIG. 5. The operation of the wearable device described with reference to FIG. 5 may be performed by the wearable device 101 and/or a processor 210 of FIG. 2.

Referring to FIG. 5, in operation 510, according to an embodiment, the wearable device may identify a plurality of visual objects in the frame. The wearable device may identify a plurality of external objects (e.g., a first external object 120-1 to a fourth external object 120-4 of FIG. 1) included in the FoV of a user (e.g., a user 110 of FIG. 1) wearing the wearable device, by using a camera (e.g., a camera 225 of FIG. 2). The wearable device may identify the plurality of visual objects, based on execution of a visual object classifier 275 of FIG. 2.

Referring to FIG. 5, in operation 520, according to an embodiment, the wearable device may classify the plurality of visual objects identified based on operation 510 into a plurality of preset categories. The wearable device may determine a category of each of the plurality of visual objects, based on the plurality of preset categories of Table 1. The wearable device may classify the plurality of visual objects into the plurality of preset categories distinguished by displaying condition, based on a position relationship between the plurality of visual objects and/or a first visual object focused by the user of the wearable device. For example, the wearable device may classify the first visual object focused by the user into a first preset category among the plurality of preset categories. For example, the wearable device may classify a second visual object in contact with the first visual object into a second preset category among the plurality of preset categories. For example, the wearable device may classify another visual object distinguished from the first visual object and the second visual object into at least one of a third preset category for limiting the display of the visual object, a fourth preset category for conditionally displaying the visual object, or a fifth preset category for occluding the visual object with a specific visual object such as an image.

Referring to FIG. 5, in operation 530, according to an embodiment, the wearable device may modify a portion of a frame in which the second visual object is displayed, which is distinguished from the first visual object focused by the user. For example, the wearable device may display the other visual object that occludes another visual object classified into another category distinguished from the first preset category into which the first visual object is classified. For example, the wearable device may display an image (e.g., images 132 and 134 of FIG. 1) occluding the visual object classified into the other category distinguished from the first preset category in the FoV, by using a display (e.g., a display 220 of FIG. 2). Since the other visual object occluding the visual object classified into the other category is displayed, the wearable device may maintain displaying the first visual object representing the first external object in the FoV.

Referring to FIG. 5, in operation 540, according to an embodiment, the wearable device may adjust whether to display the second visual object in the frame, based on a category of the second visual object and/or an event associated with the second visual object. For example, the wearable device may adjust the display of the second visual object based on a displaying condition corresponding to a category in which the second visual object is classified. For example, the wearable device may remove the visual object classified into the fourth preset category of the Table 1 in the FoV formed by the display of the wearable device based on the displaying condition matched to the fourth preset category. In the case of identifying a sound generated from another external object by using a microphone (e.g., a microphone 235 of FIG. 2), the wearable device may resume displaying the visual object with respect to the other external object based on an intensity of the sound. For example, when the intensity of the sound increases, the wearable device may resume displaying the visual object with respect to the other external object according to one or more embodiments. When the intensity of the sound decreases, the wearable device may discontinue displaying the visual object with respect to the other external object according to one or more embodiments. The wearable device may cease displaying the visual object for occluding (or covering) the other external object based on the possibility of collision between the other external object and the user. An operation in which the wearable device adjusts the display of the visual object based on the displaying condition will be described with reference to FIGS. 10A to 10B.

As described above, according to an embodiment, the wearable device may classify visual objects corresponding to each of external objects in an external space visible by the user into a plurality of preset categories. While displaying a frame in which the external objects are captured, the wearable device may modify visual objects representing each of the external objects in the frame based on the preset category in which each of the external objects is classified. In order to maintain the immersion of the user with respect to the first external object, the wearable device may remove a visual object representing another external object different from the first external object from the frame or may display another visual object superimposed on the visual object.

Hereinafter, an example of an operation in which the wearable device according to an embodiment identifies an input indicating the focus of the visual object based on a motion of the user will be described with reference to FIGS. 6A to 6B.

Figure 6A:
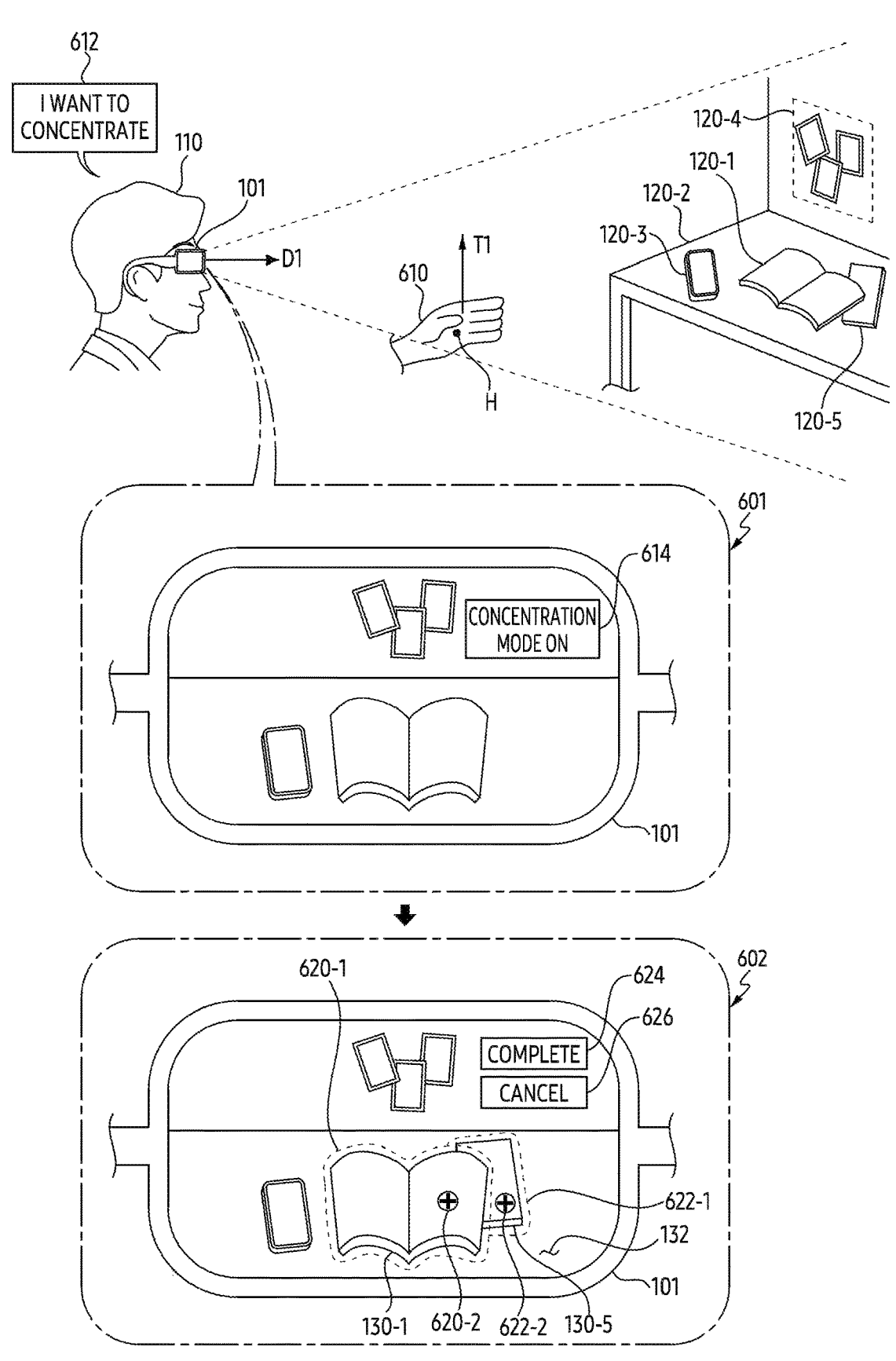
FIGS. 6A to 6B illustrate an example of an operation in which a wearable device identifies an input indicating the focus of at least one visual object according to an embodiment.
Figure 6B:
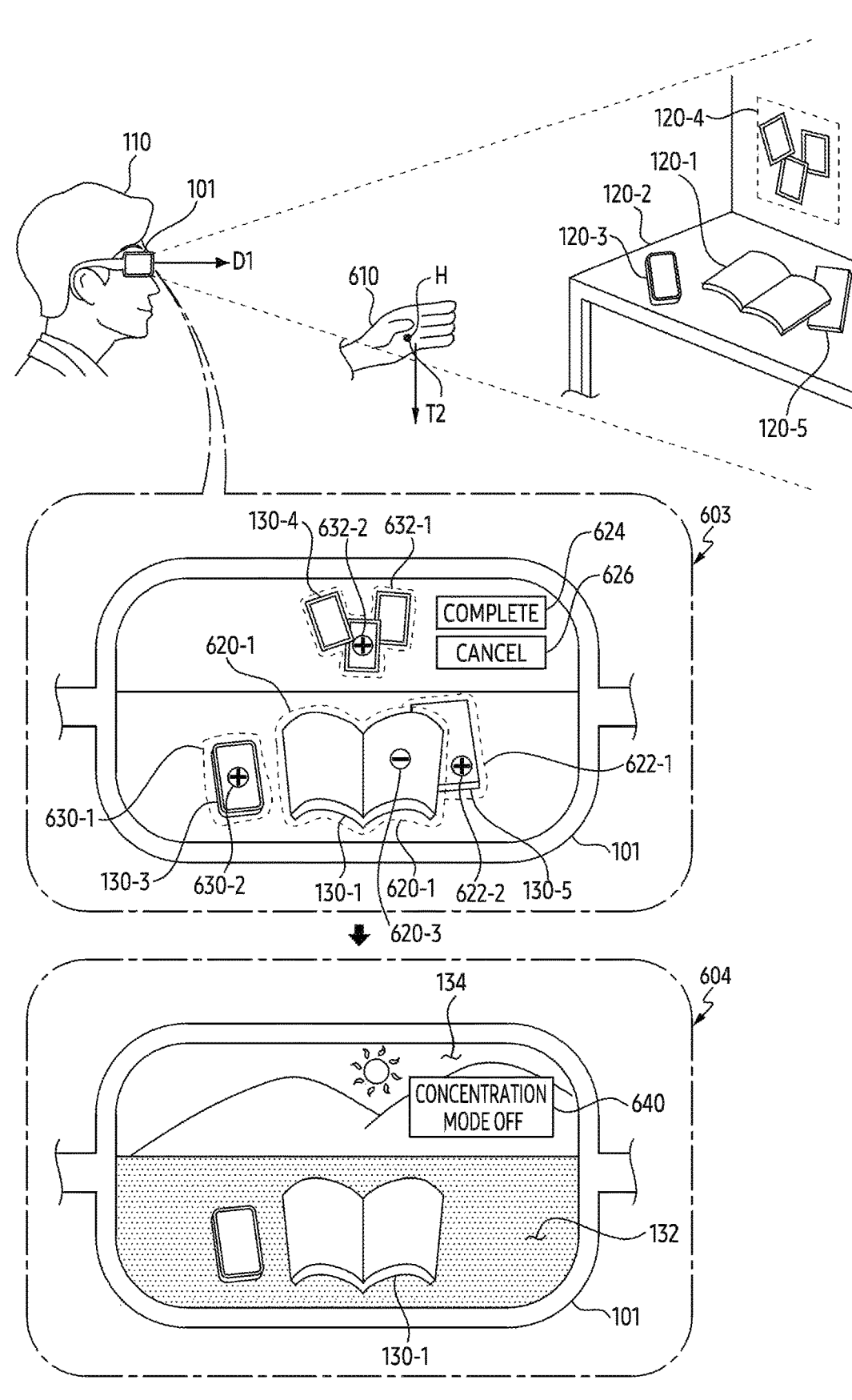

FIGS. 6A to 6B illustrate an example of an operation in which a wearable device 101 identifies an input indicating the focus of at least one visual object according to an embodiment. The wearable device 101 of FIGS. 1 to 2 may include the wearable device 101 of FIGS. 6A to 6B.

Referring to FIGS. 6A to 6B, according to an embodiment, different states 601, 602, 603, and 604 in which the wearable device 101 provides a user experience based on AR and/or MR are illustrated. In a state worn by a user 110, the wearable device 101 may identify one or more external objects (e.g., a first external object 120-1 to a fifth external object 120-5) disposed in front of the user 110. The wearable device 101 may obtain information on one or more external objects by using a camera (e.g., a camera 225 of FIG. 2) and/or a sensor (e.g., a sensor 230 of FIG. 2). The information may include at least one of an image and/or a depth map in which the one or more external objects are captured.

According to an embodiment, the wearable device 101 may display visual objects representing one or more external objects in the FoV of the user 110 wearing the wearable device 101 based on the AR, the MR, and/or VST. In the state 601 of FIG. 6A, the wearable device 101 may display a frame in which visual objects corresponding to each of the first external object 120-1 to the fifth external object 120-5 are captured in the FoV. In the state 601, the wearable device 101 may identify an input for adjusting the visibility of at least one of the visual objects in the frame. For example, the wearable device 101 may identify an input for concentrating on at least one of the plurality of visual objects.

For example, the wearable device 101 may identify the input for concentrating on at least one of the plurality of visual objects, based on a motion of a preset body part (e.g., a hand 610). In the state 601 of FIG. 6A, the wearable device 101 may identify a position H of the hand 610, by using a camera (e.g., a camera 225 of FIG. 2). The wearable device 101 may identify the input, based on identifying the position H of the hand 610 moving along a trajectory T1. The trajectory T1 of the hand 610 may represent a vertical upward swipe gesture. Referring to FIG. 6A, the trajectory T1 of the hand 610 moving along a direction opposite to a direction of gravity acceleration is illustrated as an example. In response to the input, the wearable device 101 may switch from the state 601 to the state 602 for receiving an input indicating the focus of at least one of the plurality of visual objects.

For example, the wearable device 101 may identify the input for concentrating on at least one of the plurality of visual objects, based on a visual object 614 included in the display area. The wearable device 101 may display the visual object 614 having a form of a button including a preset text (e.g., "concentration mode ON"). The wearable device 101 may identify a gesture for selecting the visual object 614 based on the body part (e.g., head, eyes, and/or the hand 610) of the user 110 facing the visual object 614. The wearable device 101 that identified the gesture may switch from the state 601 to the state 602 of FIG. 6A.

For example, the wearable device 101 may identify the input for concentrating on at least one of the plurality of visual objects, based on an audio signal of a microphone (e.g., a microphone 235 of FIG. 2). The wearable device 101 may perform speech-to-text (STT) on the audio signal. The wearable device 101 may identify the input including a speech 612 (e.g., "I want to concentrate") including a preset natural language from the audio signal. Based on receiving the audio signal including the speech 612, the wearable device 101 may switch from the state 601 to the state 602 for receiving the input indicating the focus of at least one of the plurality of visual objects.

For example, the wearable device 101 may identify the input for concentrating on at least one of the plurality of visual objects based on a gesture of pressing a preset button exposed to the outside through the housing of the wearable device 101. The wearable device 101 may switch from the state 601 to the state 602 of FIG. 6A, based on a gesture of pressing the preset button for greater than a preset duration. For example, the wearable device 101 may identify the input for concentrating on at least one of the plurality of visual objects based on a gesture of touching the housing. The wearable device 101 switches from the state 601 to the state 602 of FIG. 6A, in response to a tapping gesture on a preset portion (e.g., a template of the wearable device 101 having a form of glasses) of the housing.

Referring to FIG. 6A, in the state 602, according to an embodiment, the wearable device 101 may identify an input indicating a focus on at least one of visual objects included in the display area. For example, based on identifying that a direction of the gaze of the user is directed toward the first external object 120-1, the wearable device 101 may display a closed curve 620-1 and/or an icon 620-2 for emphasizing a first visual object 130-1 representing the first external object 120-1 in the display area. The closed curve 620-1 may be referred to as a contour. The wearable device 101 may display the closed curve 620-1 having a preset color such as blue. The wearable device 101 may emphasize a portion in the display area in which the first visual object 130-1 is visible, by using the closed curve 620-1 surrounding the first visual object 130-1 visible through the display area. The wearable device 101 may display the icon 620-2 including a plus sign in order to receive an input indicating the focus of the first visual object 130-1. The wearable device 101 may identify the input indicating the focus of the first visual object 130-1 based on a gesture of selecting the icon 620-2.

According to an embodiment, the wearable device 101 displaying the closed curve 620-1 and/the icon 620-2 may be performed by another information different from information indicating the direction of the gaze of the user. For example, the wearable device 101 may recommend focus on first visual object 130-1, based on the position and/or the current time of the wearable device 101. In order to recommend the focus on the first visual object 130-1, the wearable device 101 may display the closed curve 620-1 and/or the icon 620-2. The wearable device 101 may track the history of the visual object focused by the user 110 according to position and/or time. The wearable device 101 may recommend the user 110 to concentrate on the specific visual object, based on the visual object focused on by the user 110 at the current position and/or the visual object focused by the user 110 at the current time for a past date (e.g., the same time in the past).

For example, in the case that the wearable device 101 identifies the first visual object 130-1 focused by the user 110, the wearable device 101 may identify a fifth visual object 130-5 similar to the first visual object 130-1, based on the type (e.g., a book) of the first visual object 130-1. In the state 602 of FIG. 6A, the wearable device 101 may display a closed curve 622-1 surrounding the fifth visual object 130-5, and an icon 622-2 for receiving an input indicating the focus of the fifth visual object 130-5, in a portion where the fifth visual object 130-5 similar to the first external object 120-1 is visible, while displaying the closed curve 620-1 and the icon 620-2.

In the state 602 of FIG. 6A, the wearable device 101 may display visual objects 624 and 626 for switching to another state distinguished (or different) from the state 602 in the display area. The wearable device 101 may display the visual object 624 having the form of the button for completion of selection of the visual object based on the state 602. The visual object 624 may include a preset text (e.g., "complete") for guiding completion of selection of the external object. The wearable device 101 may display the visual object 626 for switching to another state (e.g., the state 601) before switching to the state 602. The wearable device 101 may display the visual object 626 having the form of the button including a preset text (e.g., "cancel") for guiding the return to another state before the state 602.

In the state 602 of FIG. 6A, the wearable device 101 may identify an input indicating the focus of a specific external object based on the visual object in the display area, including the icons 620-2 and 622-2. For example, the user 110 directly interacting with the first external object 120-1, such as a book, may select the icon 620-2 superimposed on the first visual object 130-1 representing the first external object 120-1, in the state 602. The embodiment is not limited thereto, and the user 110 may gaze at the first visual object 130-1 for greater than the preset duration or may perform a gesture pointing at the first external object 120-1 with a finger. The wearable device 101 identifying the gaze of the user 110 who gazes at the first visual object 130-1 for greater than the preset duration or the gesture pointing at the first external object 120-1 with the finger may identify the input indicating the focus of the first visual object 130-1 based on the gaze and/or the gesture.

In the state 602 of FIG. 6A, it is assumed that the wearable device 101 identifies the gesture of selecting the icon 620-2. In the above assumption, the wearable device 101 may switch from the state 602 of FIG. 6A to the state 603 of FIG. 6B. In the state 603 of FIG. 6B, in order to emphasize the first visual object 130-1 corresponding to the gesture, the wearable device 101 may modify the color of the closed curve 620-1 surrounding the first visual object 130-1 from a first preset color (e.g., blue) to a second preset color (e.g., yellow) for emphasizing the first visual object 130-1. The wearable device 101 may display an icon 620-3 for releasing focus on the first visual object 130-1 representing the first external object 120-1. An embodiment in which the wearable device 101 displays the icon 620-3 including a minus sign superimposed on the first visual object 130-1 is illustrated, but the embodiment is not limited thereto. Based on a gesture of selecting the icon 620-3, the wearable device 101 may switch from the state 603 to a state (e.g., the state 602) before receiving the input indicating the focus of the first visual object 130-1.

According to an embodiment, the wearable device 101 may display a visual object for identifying an input indicating the focus of visual objects representing another external object distinguished (or different) from the first external object 120-1, based on the input indicating the focus of the first external object 120-1 matching the icon 620-2 (in FIG. 6A). The other external object may include an object (e.g., an object contacted in excess of a preset ratio and/or area) that is in contact with the first external object 120-1 selected by the input, such as the fifth external object 120-5.

Referring to FIG. 6B, in the state 603, the wearable device 101 may display the closed curve 622-1 surrounding the fifth visual object 130-5 representing the fifth external object and the icon 622-2 for receiving an input indicating the focus of the fifth external object, together with the closed curve 620-1 having a color indicating the focus of the first visual object 130-1.

Referring to FIG. 6B, in the state 603, based on the direction of the body part (e.g., the head, the eyes, and/or the hand 610) of the user 110, the wearable device 101 may identify an external object adjacent to or superimposed on the direction. The wearable device 101 may display a visual object for selecting the external object as an external object focused by the user. For example, based on identifying that the direction of the gaze of the user 110 is approaching a third visual object 130-3 representing a third external object, the wearable device 101 may display a closed curve 630-1 surrounding the third visual object 130-3 and/or an icon 630-2 for the third visual object 130-3, in the display area. In response to a gesture of selecting the icon 630-2, the wearable device 101 may identify an input indicating the focus of the third visual object 130-3. Similarly, in case that a direction of the hand of the user 110 is approaching toward a fourth external object, which is a group of a plurality of photos attached to the wall surface, the wearable device 101 may display a closed curve 632-1 and/or an icon 632-2 for emphasizing a fourth visual object 130-4 representing the fourth external object.

In the state 603 of FIG. 6B, according to an embodiment, the wearable device 101 may identify an input for switching to the MR for concentrating on at least one external object (e.g., the first external object that appears to be surrounded by the closed curve 620-1 having a preset color) selected in the state 603. For example, the wearable device 101 may identify a gesture of selecting the visual object 624 as an input indicating the display of a screen for immersion in the visual object selected by the user 110. The wearable device 101 may switch to a state in which another visual object different from at least one visual object selected by another input is occluded or removed (e.g., the state 604), based on identifying the preset speech (e.g., "You have completed your selection") received through the microphone in the state 603. The embodiment is not limited to this, and the wearable device 101 may switch from the state 603 to the state 604 of displaying the screen for immersion of at least one visual object selected in the state 603, based on the motion of the body part.

For example, the wearable device 101 may identify the input based on identifying the position H of the hand 610 moving along a trajectory T2. The trajectory T2 of the hand 610 may represent a vertical downward swipe gesture. For example, the wearable device 101 may identify the trajectory T2 of the hand 610 moving along the direction of the gravity acceleration by using the camera and/or the sensor. Based on the vertical downward swipe gesture represented by the hand 610, the wearable device 101 may switch from the state 603 to the state 604.

Referring to FIG. 6B, according to an embodiment, the exemplary state 604 in which the wearable device 101 forms the screen for immersion of the first visual object 130-1 representing the first external object selected in the state 603 is illustrated. In the state 604, the wearable device 101 may maintain the display of the first visual object 130-1 and at the same time may display a frame in which another visual object representing another external object distinguished from the first external object matched to the first visual object 130-1 is modified. For example, in the state 604, the wearable device 101 may display an image 132 in a portion of the frame in which the second external object supporting the first visual object 130-1 representing the first external object is represented. The image 132 may be displayed in association with the second visual object representing the second external object. For example, in the state 604, the wearable device 101 may remove the third visual object 130-3 representing the third external object, which was represented through the display area. The third visual object 130-3 may be removed by displaying the image 132 covering the third visual object 130-3. For example, in the state 604, the wearable device 101 may display an image 134 linked to an external object (e.g., a wall surface to which the fourth external object is attached) shown as a background in the FoV. The image 134 may substantially limit the fourth visual object 130-4 from being displayed in the FoV, by being superimposed on the fourth visual object 130-4 representing the fourth external object.

According to an embodiment, the wearable device 101 may display a visual object 640 for switching to another state distinguished from the state 604 while providing a user experience for immersing in the first visual object 130-1, in the state 604. Based on the state 604, the wearable device 101 may display the visual object 640 having the form of the button for at least temporarily ceasing displaying the images 132 and 134. Although a button having a preset text (e.g., "concentration mode OFF") is illustrated as an example of the visual object 640, the embodiment is not limited thereto.

As described above, according to an embodiment, the wearable device 101 may identify the input indicating the focus of the first visual object 130-1 based on the speech and/or motion of the user 110 wearing the wearable device 101. Based on the input, as in the state 604, the wearable device 101 may display a screen for immersing in the first visual object 130-1 representing the first external object 120-1 in the FoV. The wearable device 101 may obtain the screen displayed in the FoV in the state 604 by changing and/or synthesizing the frame obtained from the camera, in order to at least temporarily cease displaying another visual object different from the first visual object 130-1 representing the first external object 120-1. Based on the screen, the wearable device 101 may provide the user 110 with the MR for immersing in the first visual object 130-1.

According to an embodiment, the wearable device 101 may segment at least one visual object from information on the external space in order to identify an input indicating a focus of the specific visual object. Hereinafter, an example of an operation in which the wearable device 101 segments the visual object according to an embodiment will be described with reference to FIG. 7.

Figure 7:
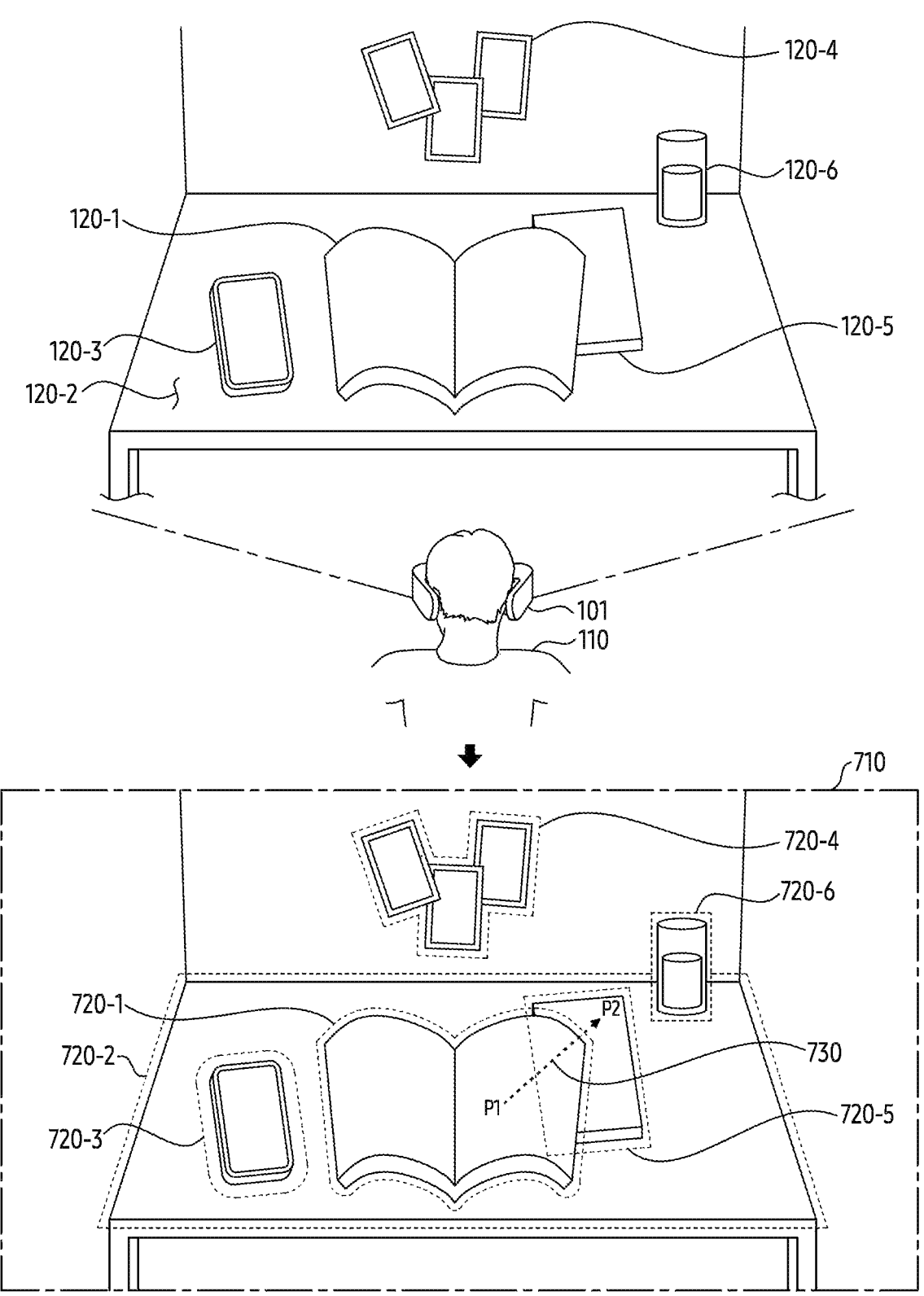
FIG. 7 illustrates an example of an operation in which a wearable device classifies a plurality of visual objects into one of a plurality of preset categories, according to an embodiment.

FIG. 7 illustrates an example of an operation in which a wearable device 101 classifies a plurality of visual objects into one of a plurality of preset categories, according to an embodiment. The wearable device 101 of FIGS. 1 and 2 may include the wearable device 101 of FIG. 7. An operation of the wearable device 101 described with reference to FIG. 7 may be performed by the wearable device 101 of FIG. 2 and/or a processor 210.

According to an embodiment, the wearable device 101 may obtain a frame 710 for an external space by using a camera (e.g., a camera 225 of FIG. 2). Referring to FIG. 7, the camera may be disposed toward one direction (e.g., in a state in which a user 110 is wearing the wearable device 101, in front of the user 110) of the wearable device 101. The wearable device 101 may obtain the frame 710 for the external space visible to the user 110 wearing the wearable device 101 by using the camera. For example, the wearable device 101 may obtain the frame 710 for the external space including a first external object 120-1 to a sixth external object 120-6. The embodiment is not limited to this, and for example, the wearable device may obtain information on the external space by using a camera and/or a sensor (e.g., a sensor 230 of FIG. 2). The information may include depth information (e.g., a depth map and/or a depth image) on the external space including the wearable device 101.

Referring to FIG. 7, the wearable device 101 that has obtained information on the external space may identify a plurality of external objects (e.g., the first external object 120-1 to the sixth external object 120-6) included in the external space based on the information. The wearable device 101 may identify a visual object corresponding to the plurality of external objects based on the distribution of colors and/or the distribution of outlines of the object in the frame 710. The wearable device 101 may identify the plurality of visual objects by performing object recognition on the frame 710 based on the artificial neural network. The wearable device 101 may identify the plurality of external objects spaced apart from the wearable device 101 based on different distances based on the depth distribution indicated by the depth image.

For example, the wearable device 101 may identify an area in which each of the plurality of external objects is captured in the frame 710. Referring to FIG. 7, the wearable device 101 may identify a first area 720-1 in which the first external object 120-1 is captured in the frame 710. The wearable device 101 may identify a second area 720-2 in which a second external object 120-2 in contact with the first external object 120-1 is captured in the frame 710. The wearable device 101 may identify a third area 720-3 in which a third external object 120-3 including a speaker is captured in the frame 710. The wearable device 101 may identify a fourth area 720-4 in which a fourth external object 120-4 which is a group of one or more photos partially superimposed with each other is captured in the frame 710. The wearable device 101 may identify a fifth area 720-5 in which a fifth external object 120-5 which is the same type as the first external object 120-1 and superimposed on the first external object 120-1 is captured, in the frame 710. The wearable device 101 may identify a sixth area 720-6 in which a sixth external object 120-6 is captured in the frame 710.

According to an embodiment, the wearable device 101 may group visual objects for external objects based on a position relationship between external objects and/or a gesture of a user. For example, as in the fourth area 720-4 of FIG. 7, in case that the visual objects representing the photos are in contact with each other in excess of the preset ratio (e.g., 50%), the wearable device 101 may recognize the photos as one group based on one area. For example, the wearable device 101 may group the first visual object 720-1 and the fifth visual object 720-5 into one group, based on a gesture dragged to a second point P2 in the fifth visual object 720-5 representing the fifth external object 120-5, along a path 730 from a first point P1 in the first visual object 720-1 representing the first external object 120-1 in the frame 710. For example, the wearable device 101 may display a closed curve surrounding all of the first visual object 720-1 and the fifth visual object 720-5 based on the gesture.

As described above with reference to the states 602 and 603 of FIGS. 6A to 6B, according to an embodiment, the wearable device 101 may display closed curves in which each of the plurality of external objects represents a plurality of areas captured in the frame 710, in a state of displaying the frame 710 to the user 110. For example, the closed curve (e.g., a closed curve 620-1 of FIGS. 6A and 6B) representing the first area 720-1 in which the first external object 120-1 is captured may be displayed superimposed on an outline of the first area 720-1 in the frame 710. In response to an input indicating the focus of the first external object 120-1, the wearable device 101 may modify the color of the closed curve displayed superimposed on the outline of the first area 720-1. Based on the modification of the color, the wearable device 101 may visualize that the first visual object 130-1 was selected by the input.

According to an embodiment, the wearable device 101 may visualize a category including the plurality of visual objects, based on another visual object (e.g., the closed curve and/or icon) linked to a plurality of areas in which the plurality of external objects are captured, in the state of classifying visual objects corresponding to the plurality of external objects included in the frame 710. For example, the wearable device 101 may display a closed curve of a straight line having a first preset color (e.g., yellow) in an area in which an external object classified into a first preset category is captured. For example, the wearable device 101 may display a closed curve of a dashed line that surrounds the area in which the external object is captured and has the first preset color, in the area in which an external object classified into a second preset category is captured. For example, the wearable device 101 may display a closed curve of a straight line surrounding the area and having a second preset color (e.g., blue), in the area in which the external object classified into the third preset category is captured. For example, the wearable device 101 may display a closed curve of a dashed line surrounding the area and having the second preset color in which an external object classified into a fourth preset category is captured. The wearable device 101 may display a first preset number (e.g., two) of dots in the area in which an external object classified into the fourth preset category is captured. For example, the wearable device 101 may display a closed curve of a dashed line having a third preset color (e.g., black) in an area in which an external object classified into a fifth preset category is captured. For example, the wearable device 101 may display a closed curve of a dashed line having the second preset color in an area in which an external object classified into a sixth preset category is captured. The wearable device 101 may display a second preset number (e.g., one) of dots in the area in which the external object classified into the sixth preset category is captured.

As described above, according to an embodiment, the wearable device 101 may obtain a frame 710 that at least partially is superimposed on the FoV of the user 110 in order to provide a user experience based on AR, MR, and/or VST. The wearable device 101 may recognize a plurality of visual objects captured in the frame 710. Based on the recognition of the plurality of visual objects, the wearable device 101 may identify an input indicating the focus of a specific visual object. Based on the recognition of the plurality of visual objects, the wearable device 101 may provide a user experience for immersing in the specific visual object associated with the input. For example, the wearable device 101 may classify the plurality of visual objects based on the plurality of preset categories of Table 1 based on identifying the specific external object. Based on a result of classifying the plurality of external objects based on the plurality of preset categories, the wearable device 101 may change at least a portion of the frame 710.

Hereinafter, with reference to FIG. 8, an example of an operation performed by the wearable device 101 based on the input indicating the focus of the external object described above with reference to FIGS. 6A to 6B and/or FIG. 7 will be described.

FIG. 8 illustrates an example of a flowchart for a wearable device according to an embodiment. The wearable device 101 of FIGS. 1 to 2 may include the wearable device utilized for FIG. 8. The operation of the wearable device described with reference to FIG. 8 may be performed by the wearable device 101 and/or a processor 210 of FIG. 2.

Referring to FIG. 8, in operation 810, according to an embodiment, the wearable device may identify an input indicating the focus of a first visual object among a plurality of visual objects. According to an embodiment, the wearable device may identify the input based on a motion and/or speech of the user wearing the wearable device as described above with reference to FIGS. 6A to 6B. For example, the wearable device may identify the input indicating the focus of the first visual object based on a direction of the gaze of the user in states 602 and 603 of FIGS. 6A to 6B.

Referring to FIG. 8, in operation 820, according to an embodiment, the wearable device may classify the first visual object into a first preset category. Before the operation 820, the wearable device may recognize a plurality of external objects adjacent to the wearable device based on the operation described above with reference to FIG. 7. The wearable device classifies the first visual object corresponding to the input of the operation 810 into the first preset category for maintaining the display of the first visual object, among a plurality of preset categories classified by the displaying condition. The first preset category may include the first preset category of Table 1. Based on the input of the operation 810, the wearable device that identifies the first visual object classified into the first preset category may classify the plurality of visual objects into different categories based on the area and/or distance in contact with a first external object corresponding to the first visual object.

Referring to FIG. 8, in operation 830, according to an embodiment, the wearable device may classify a second visual object in contact with the first visual object into a second preset category. For example, the second preset category may be set to classify visual objects that are allowed to display and/or map visual objects to improve the visibility of the first visual object classified into the first preset category. The second preset category may include the second preset category of Table 1. The wearable device may identify the second external object in contact with or supporting the first external object corresponding to the first visual object based on a position relationship between the plurality of external objects. An operation of the wearable device modifying a portion of a frame in which the second visual object classified into the second preset category is captured based on operation 830 will be described with reference to FIG. 9.

Referring to FIG. 8, in operation 840, according to an embodiment, the wearable device may classify a third visual object distinguished from the first visual object and the second visual object into a third preset category. The third preset category may be set to reduce or remove the visibility of the visual object. The third preset category may include the third preset category of Table 1.

Referring to FIG. 8, in operation 850, according to an embodiment, the wearable device may identify whether there is a possibility that the third visual object classified into the third preset category may cease (e.g., take away or obstruct) the attention (or motion) of the user to the first visual object. For example, the wearable device may obtain the possibility for the third visual object based on object recognition. The wearable device may identify whether the third visual object, such as a mobile phone, draws the attention of the user for the first visual object based on a speaker. The wearable device may identify whether the third visual object, such as a water cup, a plate, and/or a flower-pot, is toppled over or destroyed by the motion of the user. In one or more embodiments, once the third visual object is classified in the third preset category, the wearable device can have criteria for determining that probability that the third visual object is likely to take away, distract, disrupts, etc., the attention (or motion) of the user to the first visual object. In one or more embodiments, the wearable device can have a database of criteria, rules-based logic, etc., to determine that probability that the that the third visual object is likely to take away, distract, disrupts, etc., the attention (or motion) of the user to the first visual object.

Referring to FIG. 8, in a state in which there is probability that the third visual object classified into the third preset category ceases (e.g., takes away or obstructs) the attention of the user for the first visual object (850—Yes), based on operation 860, the wearable device may classify the third visual object into a fourth preset category. The fourth preset category may have the displaying condition for resuming display of the third visual object classified into the fourth preset category. The fourth preset category may correspond to the fourth preset category in the Table 1. Based on the operation 860 of the wearable device, an operation of modifying a portion of the frame in which the visual object classified into the fourth preset category is captured will be described with reference to FIGS. 10A to 10B and/or FIGS. 11A to 11B. In a state in which there is no probability that the third visual object classified into the third preset category ceases the attention of the user for the first visual object, or it has the probability less than a preset threshold (850—No), the wearable device may maintain classifying the third visual object into the third preset category.

Referring to FIG. 8, in operation 870, according to an embodiment, the wearable device may classify the fourth visual object, which is distinguished from the second visual object and displayed adjacent to the first visual object, into the fifth preset category in the display. The fourth visual object may include an object recognized as a background by a user directly interacting with the first wearable device. The fifth preset category may include the fifth preset category of the Table 1. An operation in which the wearable device changes at least the portion of the frame based on the visual object classified into the fifth preset category based on the operation 870 will be described with reference to FIGS. 12A and 12B.

Referring to FIG. 8, in operation 880, according to an embodiment, the wearable device may be displayed in the display and may modify the plurality of visual objects, based on a preset category in which each of the plurality of visual objects is classified. For example, as in state 604 of FIG. 6D, the wearable device may occlude or remove another visual object while maintaining the display of the specific visual object, in the frame. The wearable device may provide a user experience based on AR, MR, and/or VST to the user by displaying frames individually adjusting the visibility of visual objects representing each of the external objects to the user.

Figure 9:
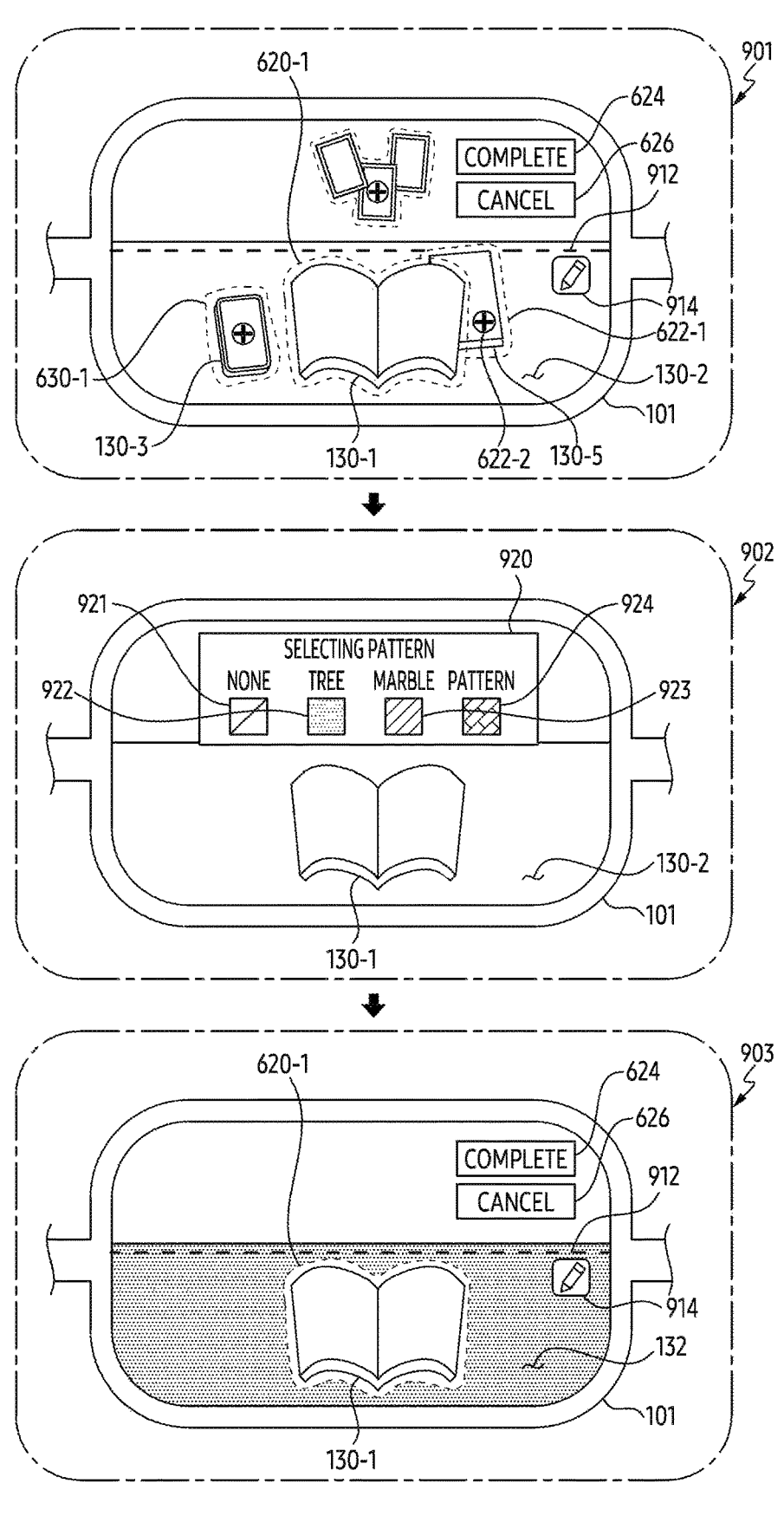
FIG. 9 illustrates an example of an operation in which a wearable device, according to an embodiment, modifies a second visual object linked to a first visual object focused by a user.

FIG. 9 illustrates an example of an operation in which a wearable device 101 according to an embodiment modifies a visual object representing a second external object linked to a first external object focused by the user. The wearable device 101 of FIGS. 1 to 2 may include the wearable device 101 utilized for FIG. 9. The operation of the wearable device 101 described with reference to FIG. 9 may be performed by the wearable device 101 and/or a processor 210 of FIG. 2.

Referring to FIG. 9, according to an embodiment, a state 901 in which the wearable device 101 receives an input indicating the focus of a first external object (e.g., a first external object 120-1 of FIG. 1) matched to a first visual object 130-1 is illustrated. The state 901 of FIG. 9 may correspond to a state 603 of FIG. 6B. In the state 901 of FIG. 9, the wearable device 101 may identify a second visual object (e.g., a second external object 120-2 of FIG. 1) linked to the first visual object selected by the input. The wearable device 101 at least partially displays a closed curve 912 surrounding the second visual object 130-2 in a display area, where the closed curve 912 is superimposed on the second visual object 130-2 representing the second external object. The wearable device 101 may display a visual object 914 for adjusting an image to be combined with the second visual object 130-2. The image to be combined with the second visual object 130-2 may be referred to as a texture image in terms of modifying the texture of the second external object corresponding to the second visual object 130-2. An example in which the wearable device 101 displays the visual object 914 having a form of an icon including a pencil, superimposed on the second visual object 130-2 is illustrated, but the embodiment is not limited thereto.

According to an embodiment, the wearable device 101 may identify an input indicating the modification of the image to be combined with the second visual object 130-2, based on a gesture of selecting the visual object 914. Based on the input, the wearable device 101 may switch from the state 901 to a state 902. In state 902 of FIG. 9, the wearable device 101 may display a screen 920 for adjusting an image and/or texture to be linked to the second visual object 130-2 representing the second external object in the display area. Although the screen 920 in a form of a pop-up window is illustrated as an example, the embodiment is not limited thereto. According to an embodiment, the wearable device 101 may display icons 921, 922, 923, and 924 corresponding to different options for adjusting the image to be superimposed on the second visual object 130-2, in the screen 920. For example, the icon 921 may be matched to an option that does not combine any images with the second visual object 130-2. The icon 922 may be matched to an option that combines an image representing a tree with the second visual object 130-2. The icon 923 may be matched to an option that combines an image representing a rock (e.g., marble) with the second visual object 130-2. The icon 924 may be matched to an option that combines an image representing a preset pattern with the second visual object 130-2.

Referring to FIG. 9, based on a gesture of selecting the icon 922, the wearable device 101 may identify an input for displaying an image 132 representing the tree superimposed on the second visual object 130-2. Based on the input, the wearable device 101 may switch from the state 902 to a state 903 of FIG. 9. In the state 903, the wearable device 101 may display the image 132 having a form of the second visual object 130-2, superimposed on the second visual object 130-2. Since the wearable device 101 displays the image 132 representing the tree superimposed on the second visual object 130-2, the wearable device 101 may display the image 132 having a form of the second external object viewed through the FoV of the user.

As described above, according to an embodiment, the wearable device 101 may identify the second visual object linked to the first visual object based on an input indicating the focus of the first visual object. Since the second visual object is linked to the first visual object, in the FoV of the user wearing the wearable device 101, the second visual object 130-2 representing the second external object may be adjacent to the first visual object 130-1 representing the first external object. The wearable device 101 may display the image 132 representing the tree on a portion of the frame adjacent to the first visual object 130-1 representing the first external object, by being superimposed on the image 132 on the second visual object 130-2 representing the second external object. For example, the image 132 may have a form, pattern, and/or texture to improve the visibility of the first visual object 130-1. In the state 903 in which the second visual object 130-2 adjacent to the first visual object 130-1 focused by the user is modified, the wearable device 101 may modify the visibility of other external objects that may cease or interfere with the motion of the user with respect to the first external object. Hereinafter, according to an embodiment, an example of an operation in which the wearable device 101 modifies the visibility of the other external object will be described with reference to FIGS. 10A to 10B.

Figure 10A:
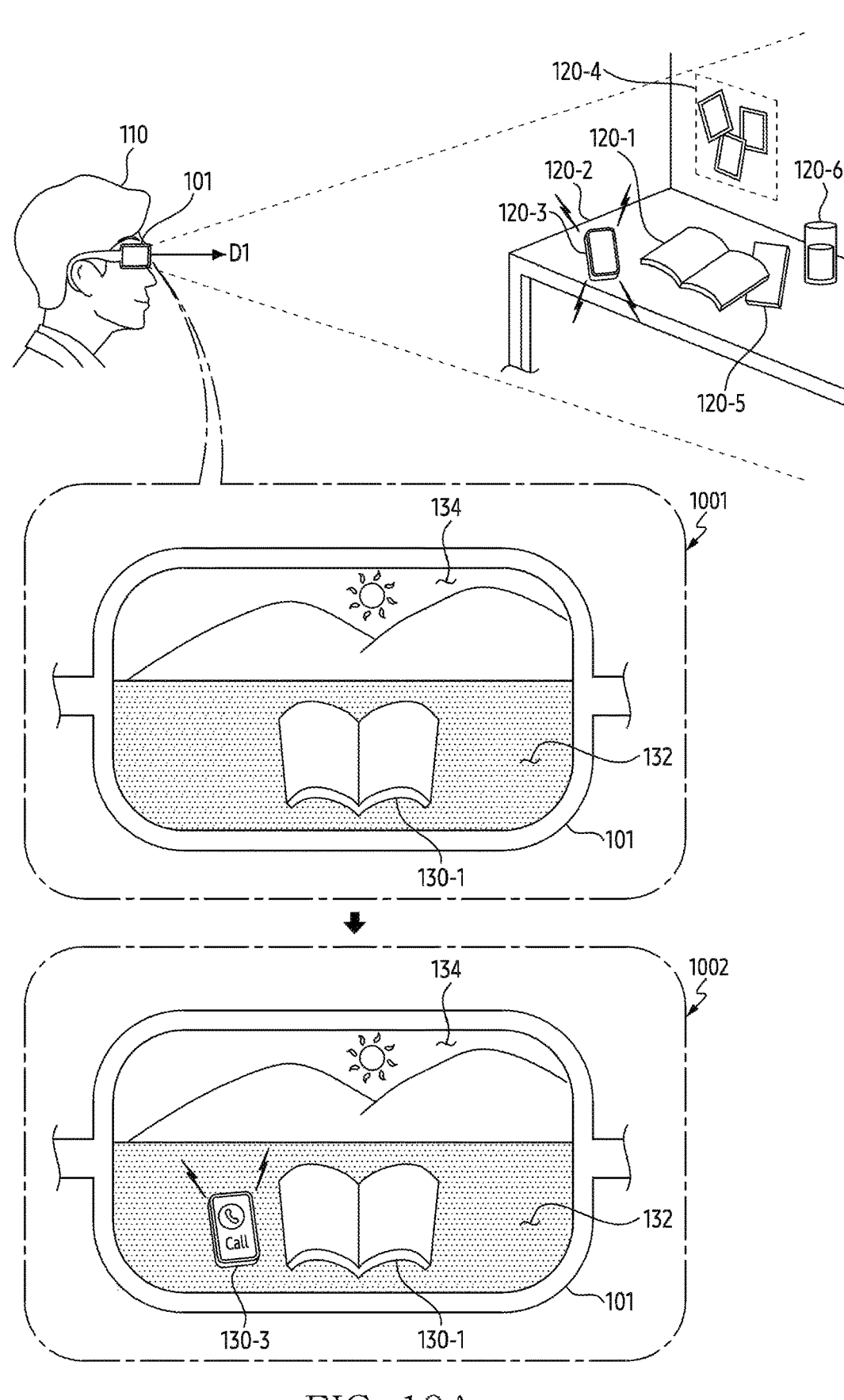
FIGS. 10A to 10B illustrate an example of an operation in which a wearable device modifies a display of a visual object according to an embodiment.
Figure 10B:
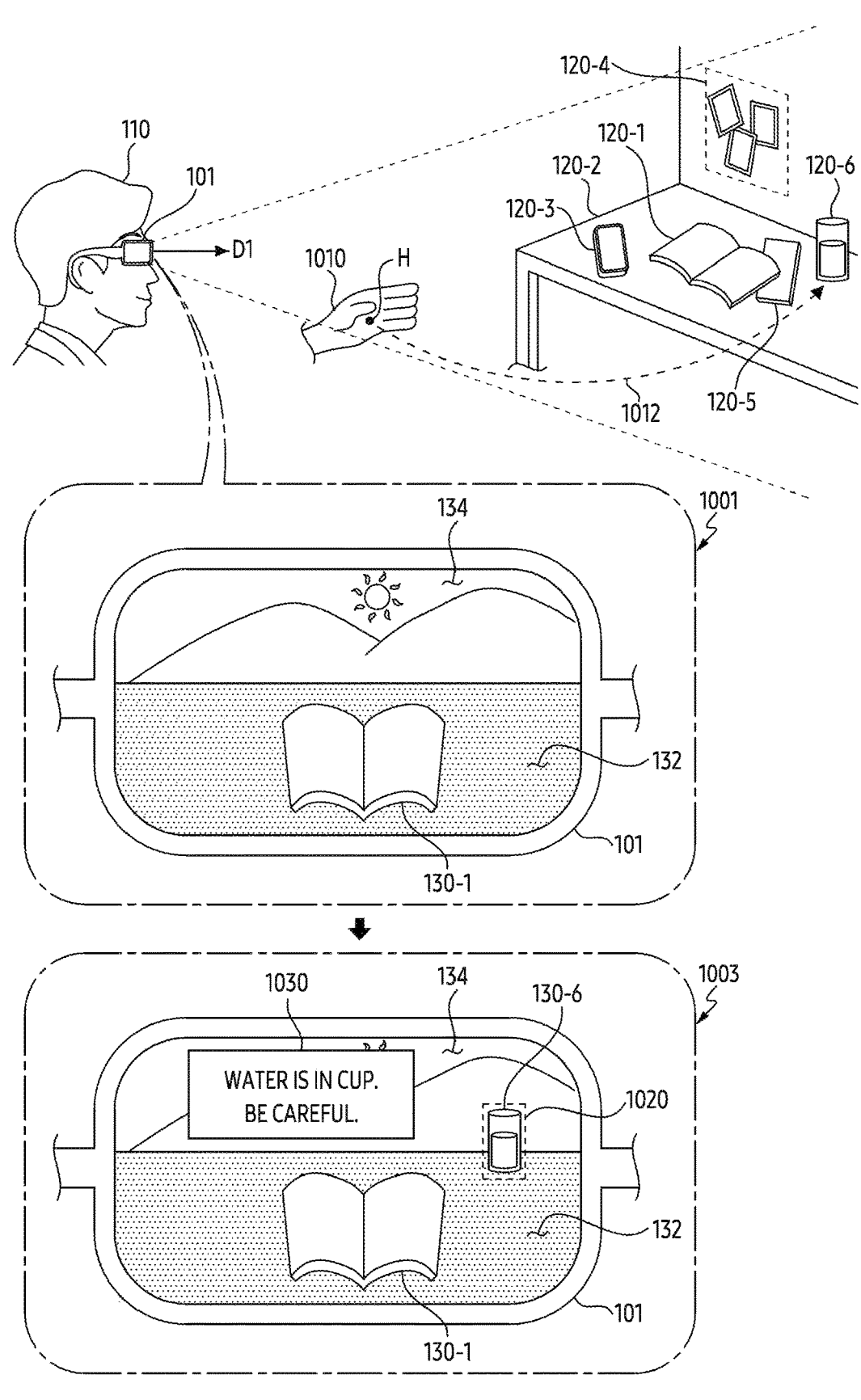

FIGS. 10A to 10B illustrate an example of an operation in which the wearable device 101 modifies a display of a visual object representing an external object according to an embodiment. The wearable device 101 of FIGS. 1 to 2 may include the wearable device 101 of FIGS. 10A to 10B. The operation of the wearable device 101 described with reference to FIGS. 10A to 10B may be performed by the wearable device 101 and/or a processor 210 of FIG. 2.

Referring to FIGS. 10A to 10B, while a user 110 wearing the wearable device 101 faces a direction D1 toward a plurality of external objects (e.g., a first external object 120-1 to a sixth external object 120-6), states 1001, 1002, and 1003 in which the wearable device 101 enters based on at least one state among the plurality of external objects are exemplarily illustrated. Referring to the states 1001 of FIGS. 10A to 10B, according to an embodiment, the wearable device 101 may identify an input indicating the focus of a first visual object 130-1. Based on the input, the wearable device 101 may maintain the display of the first visual object 130-1 representing the first external object 120-1 in the FoV. Based on the input, the wearable device 101 may synthesize (e.g., combine) an image 132 with a portion of a frame in which the second external object 120-2 in contact with the first external object 120-1 is captured. An operation of synthesizing the image 132 with the portion by the wearable device 101 may be performed similarly to the operation of the wearable device 101 described above with reference to FIG. 9.

Referring to FIG. 10A, the wearable device 101 may identify a third external object 120-3 including a speaker, in the state 1001 in which an external object different from the first external object 120-1 is occluded or removed in the FoV of the user 110. Although the mobile phone is illustrated as the third external object 120-3 including the speaker, the embodiment is not limited thereto. The wearable device 101, which identifies the third external object 120-3 including the speaker, may classify the third visual object 130-3 corresponding to the third external object 120-3 into the fourth preset category of Table 1. The embodiment is not limited thereto, and the wearable device 101 may classify the third visual object 130-3 into the fourth preset category based on the type of the first external object 120-1 focused by the user 110. In the exemplary case of FIG. 10A in which the third external object 120-3 is a mobile phone, based on the occurrence of an alarm, a sound may be generated from the third external object 120-3 based on the occurrence of an alarm, a signal for establishing a call connection, and/or reception of a push message.

According to an embodiment, the wearable device 101 may identify a sound generated from the third external object 120-3, by using a microphone (e.g., a microphone 235 of FIG. 2), in the state 1001 in which the third visual object 130-3 representing the third external object 120-3 is occluded by using the image 132. The wearable device 101 may switch from the state 1001 to the state 1002 based on identifying the sound greater than a preset threshold intensity. The preset threshold intensity may be determined based on the type of the first external object 120-1 focused by the user 110. For example, in the state 1001 of FIG. 10A in which the first external object 120-1 is a book, the wearable device 101 may compare the threshold intensity indicated by the book with the intensity of the sound. In the case that the first external object 120-1 indicated as being focused is another object (e.g., a personal computer (PC)) other than a book, the threshold intensity indicated by the other object may be different from the threshold intensity indicated by the book. The wearable device 101, which identifies sound greater than the threshold intensity, may resume the display of the third visual object 130-3 representing the third external object 120-3, by switching from the state 1001 to the state 1002 of FIG. 10A.

Referring to FIG. 10A, in the state 1002, the wearable device 101 according to an embodiment may display the third visual object 130-3 representing the third external object 120-3 that outputs the sound greater than the preset threshold intensity, together with the first visual object 130-1 focused by the user 110. The user 110 of the wearable device 101 may recognize the third external object 120-3 based on the wearable device 101 switched from the state 1001 to the state 1002. The wearable device 101 may support the user 110 to interact with the third external object 120-3 based on the sound outputted from the third external object 120-3, by displaying the third visual object 130-3 representing the third external object 120-3. For example, the user 110 wearing the wearable device 101 may perform a motion on the third external object 120-3 based on a frame including the third visual object 130-3.

In the state 1002 of FIG. 10A, in the case that the sound generated from the third external object 120-3 classified into the fourth preset category is reduced, the wearable device 101 may ceasing displaying the third visual object 130-3 representing the third external object 120-3. For example, in the case that the output of sound from the third external object 120-3 is ceased, the wearable device 101 may switch from the state 1002 to the state 1001. Based on switching from the state 1002 to the state 1001, the wearable device 101 may cease displaying the third visual object 130-3 in the FoV.

Referring to FIG. 10B, in the state 1001, the wearable device 101 may identify the sixth external object 120-6 that is a water cup. The sixth external object 120-6 may be destroyed or broken, based on colliding with a preset body part such as hand 1010. In order to prevent the sixth external object 120-6 from attracting the attention of the user 110 immersed in the first external object 120-1 by the collision, the wearable device 101 may classify the sixth visual object 130-6 corresponding to the sixth external object 120-6 into the fourth preset category. The fourth preset category may be set to classify the external object that may cease interaction between the user 110 and the first external object 120-1, as in the fourth preset category of the Table 1. Based on the classification of the sixth visual object 130-6 into the fourth preset category, the wearable device 101 may monitor a motion associated with the sixth external object 120-6. Independently of occluding or removing the sixth visual object 130-6 representing the sixth external object 120-6 in the frame, the wearable device 101 may monitor the motion associated with the sixth external object 120-6, for example, in order to prevent a collision by the user with the sixth visual object 130-6 representing the sixth external object 120-6 while the user 110 is immersed with the first external object 120-1.

Referring to FIG. 10B, the wearable device 101 may switch from the state 1001 to the state 1003 based on identifying the hand 1010 approaching the sixth external object 120-6. For example, the wearable device 101 may identify a motion approaching the sixth external object 120-6 along a path 1012, by tracking a position H of the hand 1010, in the frames obtained from a camera (e.g., a camera 225 of FIG. 2). Based on the motion, the wearable device 101 may switch from the state 1001 to the state 1003. For example, in the case that the distance between the sixth external object 120-6 and the hand 1010 is reduced to less than the preset distance, the wearable device 101 may switch from the state 1001 to the state 1003. The preset distance can be stored in advance in the wearable device 101 and/or a device coupled to the wearable device 101.

In the state 1003 of FIG. 10B, the wearable device 101 may resume displaying the sixth visual object 130-6. The wearable device 101 may display the sixth visual object 130-6, by modifying at least a portion of the image 134 superimposed on the sixth visual object 130-6. In the state 1003, the wearable device 101 may display a closed curve 1020 surrounding the sixth visual object 130-6 in a display area. The closed curve 1020 may guide the position of the sixth external object 120-6 corresponding to the sixth visual object 130-6 based on a preset color (e.g., blue) and/or a preset pattern (e.g., dashed line). The wearable device 101 may display a notification message 1030 for guiding a modification of the state of the sixth external object 120-6 in the state 1003. Referring to FIG. 10B, an example of the notification message 1030 including text (e.g., "Water is in the cup. Be careful") for guiding the modification of the state is illustrated, but an embodiment is not limited thereto.

As described above, according to one embodiment, the wearable device 101 may identify an external object (e.g., the third external object 120-3 and/or the sixth external object 120-6) in the fourth preset category capable of ceasing the interaction between the user 110 and the first external object 120-1 based on the modification of the state, among other external objects distinguished from the second external object 120-2 and the first external object 120-1 in contact with the first external object 120-1 corresponding to the first visual object 130-1, based on the input indicating the focus of the first visual object 130-1. The wearable device 101 may monitor the motion (e.g., generation of sound and/or approach of the hand 1010) associated with the external object. Based on the motion, the wearable device 101 may resume the display of the visual object (e.g., the third visual object 130-3 of FIG. 10A) representing the external object or may display a notification message (e.g., the notification message 1030 of FIG. 10B) to prevent the interaction from being ceased.

Hereinafter, the operation of the wearable device 101 described above with reference to FIGS. 10A to 10B will be described with reference to FIGS. 11A to 11B.

Figure 11A:
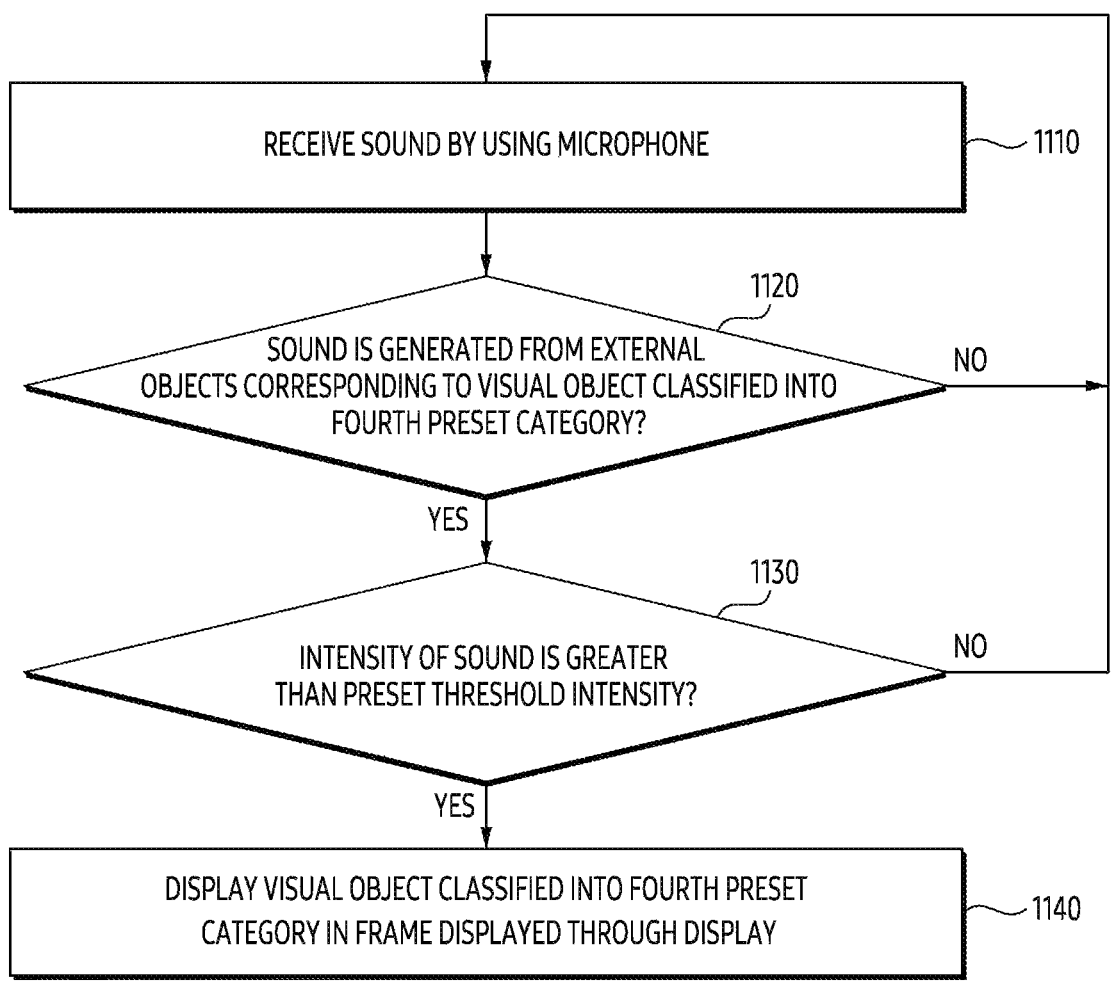
FIGS. 11A to 11B illustrate an example of flowcharts for a wearable device according to an embodiment.
Figure 11B:
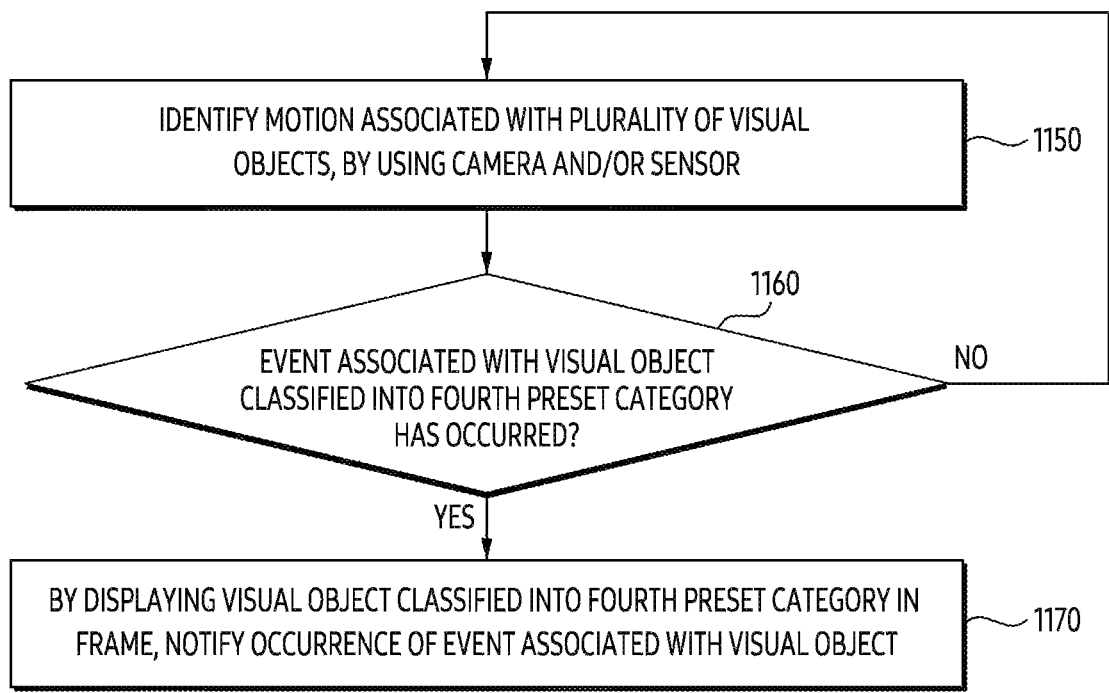

FIGS. 11A to 11B illustrate an example of flowcharts for a wearable device according to an embodiment. A wearable device 101 of FIGS. 1 to 2 may include the wearable device utilized for FIGS. 11A to 11B. An operation of the wearable device described with reference to FIGS. 11A and 11B may be performed by the wearable device 101 and/or a processor 210 of FIG. 2.

Referring to FIG. 11A, in operation 1110, according to an embodiment, the wearable device may receive sound by using a microphone (e.g., a microphone 235 of FIG. 2). The wearable device may identify a direction and/or position in which the sound is generated by using a plurality of microphones (e.g., a microphone array).

Referring to FIG. 11A, in operation 1120, according to an embodiment, the wearable device may determine whether sound is generated from a visual object classified into a fourth preset category. The fourth preset category may include the fourth preset category of Table 1, which is a category for conditionally displaying a visual object representing an external object. The external object of the operation 1120 may include a third external object 120-3 and/or a sixth external object 120-6 of FIGS. 10A to 10B. In the case that the sound is not generated from the fourth preset category (1120—No), the wearable device may maintain receiving the sound based on the operation 1110.

Referring to FIG. 11A, in the case that the sound is generated from the fourth preset category (1120—Yes), the wearable device may determine whether an intensity of the sound is greater than a preset threshold intensity based on operation 1130. The preset threshold intensity may be adjusted by a type of a first visual object indicated as being focused. In the case that the intensity of the sound is less than or equal to the preset threshold intensity (1130—No), the wearable device may maintain receiving the sound based on the operation 1110.

Referring to FIG. 11A, in the case that the intensity of the sound is greater than the preset threshold intensity (1130—Yes), the wearable device may display the visual object classified into the fourth preset category in the display based on operation 1140. For example, the wearable device may display a visual object (e.g., a third visual object 130-3 of FIG. 10A) representing a specific external object (e.g., the third external object 120-3 of FIG. 10A) in which a sound is generated, as in a state 1002 of FIG. 10A.

Referring to FIG. 11B, in operation 1150, according to an embodiment, the wearable device may identify a motion associated with a plurality of visual objects, by using a camera (e.g., a camera 225 of FIG. 2) and/or a sensor (e.g., a sensor 230 of FIG. 2). Based on a position of the hand 1010 of FIG. 10B, the wearable device may identify a motion that contacts any one of a plurality of visual objects or approaches any one of a plurality of visual objects.

Referring to FIG. 11B, in operation 1160, according to an embodiment, the wearable device may determine whether an event associated with the visual object classified into the fourth preset category has occurred. The event may be associated with a motion corresponding to the visual object. For example, the motion may include a motion (e.g., a collision between the hand 1010 and the external object of FIG. 10B) colliding with an external object corresponding to the visual object. Before the event of the operation 1160 occurs (1160—No), the wearable device may maintain identifying the motion based on the operation 1150.

Referring to FIG. 11B, based on the occurrence of the event of the operation 1160 (1160—Yes), based on operation 1170, the wearable device may display a visual object for guiding a modification of a state of the external object in the display. For example, the wearable device may display the visual object for guiding the collision of the external object and/or the modification of the state of the external object, such as a closed curve 1020 and/or a notification message 1030 of FIG. 10B.

As described above, according to an embodiment, the wearable device may monitor modification of a state of another external object different from the first visual object 130-1 while providing a user experience for being immersed in the first visual object 130-1. In the case that the state of the other external object is modified or a possibility of modification is identified, the wearable device 101 may resume display of the visual object representing the other external object.

Hereinafter, with reference to FIGS. 12A to 12B, an example of an operation performed by the wearable device 101 according to an embodiment based on a visual object classified into a fifth preset category of the Table 1 will be described.

Figure 12B:
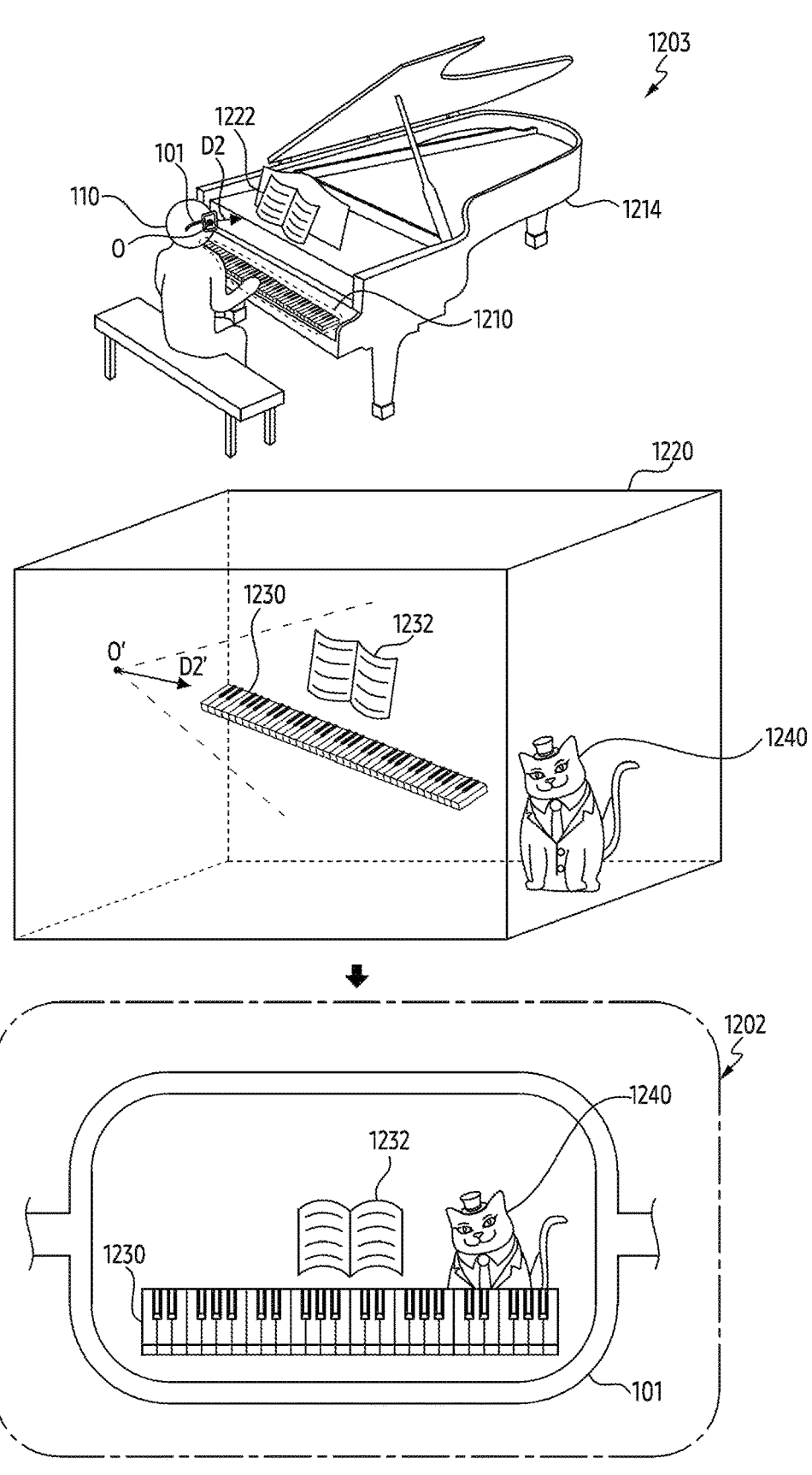

FIGS. 12A to 12B illustrate an example of an operation in which a wearable device 101 displays another visual object in a portion distinguished from a visual object focused by a user 110 according to an embodiment. The wearable device 101 of FIG. 2 may include the wearable device 101 of FIGS. 12A to 12B. Referring to FIGS. 12A to 12B, according to one embodiment, while the wearable device 101 displays a first visual object 120-1 representing a first external object, based on the input indicating the focus of a first visual object 130-1, exemplary states 1201, 1202, and 1203 that have ceased displaying of other visual objects distinguished from the first visual object 130-1 are illustrated.

Referring to FIG. 12A, according to an embodiment, an exemplary state 1201 in which the wearable device 101 identifies the input indicating the focus of the first visual object 130-1 representing the first external object (e.g., a first external object 120-1 of FIG. 1) is illustrated. In the state 1201, the wearable device 101 may display a closed curve 620-1 representing an outline of the first visual object 130-1. In the state 1201, the wearable device 101 may classify each of a plurality of external objects into one of a plurality of preset categories (e.g., preset categories listed in Table 1) based on the first visual object 130-1 selected by the input. For example, the wearable device 101 may classify a second external object in contact with the first external object corresponding to the first visual object 130-1 into a second preset category. The wearable device 101 may display an icon 1212 for combining an image on a portion 1210 where another external object (e.g., an external object classified into a fifth preset category) distinguished from the first external object and the second external object is visible in the FoV. The wearable device 101 may display the icon 1212 including a plus sign in the portion 1210 that includes the external object classified into the fifth preset category and is wider than the external object. A visual object that the wearable device 101 displays to receive the input for combining the images is not limited to the icon 1212 of FIG. 12A.

According to an embodiment, the wearable device 101 may display a screen 1220 for selecting an image to be combined with the portion 1210 in the FoV based on a gesture of selecting the icon 1212. In the state 1201, the wearable device 101 may display the screen 1220 on at least a portion of the FoV of the wearable device 101. An embodiment in which the wearable device 101 displays the screen 1220 having a form of a pop-up window is illustrated, but the embodiment is not limited thereto.

According to an embodiment, the wearable device 101 may recommend at least one image to be displayed in the portion 1210 in the screen 1220. For example, the wearable device 101 may display preview images for one or more images to be displayed in the portion 1210, such as thumbnails 1221 and 1222 included in the screen 1220. Images matching the thumbnails 1221 and 1222 may be stored in a memory (e.g., a memory 215 of FIG. 2) of the wearable device 101 or may be provided from an external electronic device (e.g., a server) connected to the wearable device 101. The images may include a scene such as a window and/or a wall surface or may include a photograph of a landscape. The embodiment is not limited thereto, and the wearable device 101 may display an option for displaying an image including information that is repeatedly (or periodically) updated based on the environment including the wearable device 101, such as weather and/or a clock, in the screen 1220. The wearable device 101 may display an icon 1223 for executing a preset application (e.g., a gallery application) for browsing images and/or videos in the screen 1220. Based on a gesture of selecting the icon 1223, the wearable device 101 may display another screen provided from the preset application in the FoV.

Referring to FIG. 12A, in response to an input indicating the selection of an image in the screen 1220, the wearable device 101 may switch from the state 1201 in which the screen 1220 is displayed in an overlapping manner, to the state 1202. In the state 1202, the wearable device 101 may display the image 134 selected by the input, in the FoV distinguished from the first visual object 130-1 representing the first external object focused by a user. For example, the wearable device 101 may combine the image 134 with the portion 1210, in a frame obtained from a camera (e.g., a camera 225 of FIG. 2). The wearable device 101 may display the frame in which the image 134 is combined, in the FoV of the user through a display (e.g., a display 220 of FIG. 2). Based on the frame displayed in the FoV, the user wearing wearable device 101 may view the image 134 combined to or with the portion 1210.

As described above, according to an embodiment, the wearable device 101 may replace a background area (e.g., the portion 1210) distinguished from the first visual object 130-1 representing the first external object with the image 134, in the FoV. The image 134 displayed on the background area may be set based on an option selected by the user of the wearable device 101. The wearable device 101 may modify background music and/or illumination, together with the image 134.

As described above, according to an embodiment, the wearable device 101 may identify a motion and/or intention (e.g., study, work, and/or play instrument performance) of the user with respect to the first external object, based on an input indicating the focus of the first external object. The wearable device 101 may provide a user experience that does not interfere with the motion of the user concentrating on the first external object, based on the intention. The user experience may be associated with AR, MR, and/or VST.

Referring to FIG. 12B, according to an embodiment, the exemplary state 1203 of the wearable device 101 included in an external environment different from the external environment of FIG. 12A is illustrated. In the state 1203, according to an embodiment, the wearable device 101 may be worn by the user 110 looking in a direction D2. The wearable device 101 may recognize an external space including the wearable device 101 based on one or more frames outputted from the camera (e.g., the camera 225 of FIG. 2) disposed toward the direction D2. Based on the recognition of the external space, the wearable device 101 may generate a virtual space 1220 mapped to the external space. The virtual space 1220 may be formed based on a three (3) dimensional coordinate system mapped to the external space. That wearable device 101 generating the virtual space 1220 may include an operation of generating information for rendering at least a portion of the virtual space 1220. According to an embodiment, the wearable device 101 may generate the virtual space 1220 in order to provide a service (e.g., metaverse service) for enhancing the interconnectivity of the user 110 of the wearable device 101 and another user connected to the wearable device 101 through the network. In order to provide the service, one or more electronic devices connected to the wearable device 101 through a network are described with reference to FIG. 16.

In the state 1203 of FIG. 12B, based on the mapping between the external space and the virtual space 1220, the wearable device 101 may identify a position O' and a direction D2' in the virtual space 1220 mapped to a position O and the direction D2 of the wearable device 101. The wearable device 101 may dispose a virtual object corresponding to at least a portion of the external object selected by the input, based on an input indicating the focus of the external object, in the virtual space 1220. In the state 1203, the wearable device 101 may classify the portion 1210 in which the keyboard (or keys) is disposed in the plano 1214 into a first preset category, based on identifying the motion of the user 110 with respect to the keyboard of the plano 1214. The wearable device 101, together with the portion 1210, may classify the sheet music 1222 into the first preset category, based on identifying a motion of the user 110 staring at the sheet music 1222 that the user 110 is browsing. As described above, the wearable device 101 may classify a plurality of external objects (e.g., the portion 1210 and/or the sheet music 1222) disposed in the external space into the first preset category. Referring to FIG. 12B, the wearable device 101 may dispose a first visual object 1230 representing the portion 1210 of the plano 1214 classified into the first preset category in the virtual space 1220. The wearable device 101 may dispose a second visual object 1232 representing a sheet music 1222 classified into the first preset category in the virtual space 1220.

According to an embodiment, the wearable device 101 may add an avatar 1240 matched to another user different from the user 110 of the wearable device 101, in virtual space 1220, by exchanging information on the virtual space 1220 with an external electronic device (e.g., a server) connected to the wearable device 101 through a network. Information for visualizing the avatar 1240 may be transmitted from the external electronic device to the wearable device 101. The wearable device 101 may modify the avatar 1240 included in the virtual space 1220 based on receiving information for adjusting the motion of the avatar 1240 from the external electronic device. Similarly, the wearable device 101 may add an avatar matched to the user 110 of the wearable device 101 in the virtual space 1220. The wearable device 101 may transmit information for visualizing the avatar matched to the user 110 to the external electronic device. The wearable device 101 may transmit information for changing the avatar to the external electronic device, based on the motion of the user 110 recognized by the wearable device 101.

Referring to FIG. 12B, an example of a screen displayed in the FoV of the user 110 by the wearable device 101 in a state 1203 according to an embodiment is illustrated. The wearable device 101 may perform rendering of at least a portion of the virtual space 1220 in the FoV, based on the view angle formed in the virtual space 1220 by the position O' and the direction D2'. Based on the rendering, the wearable device 101 may display the first visual object 1230 representing the portion 1210 of the plano 1214 and the second visual object 1232 representing the sheet music 1222, in the FoV. Together with the first visual object 1230 and the second visual object 1232, the wearable device 101 may display the avatar 1240 as an example of the virtual object added in the virtual space 1220. Referring to FIG. 12B, since the avatar 1240 is disposed farther than the first visual object 1230 from the position O' in the virtual space 1220 corresponding to the position O in the external space of the wearable device 101, the wearable device 101 may display the avatar 1240 across the first visual object 1230 in the FoV. For example, the wearable device 101 may provide the user 110 with a sense of distance between the avatar 1240 and the first visual object 1230 by displaying the avatar 1240 based on a binocular parallax less than the binocular parallax of the first visual object 1230. The wearable device 101 may provide the user 110 with a VR-based user experience, by replacing another portion other than the first visual object 1230 and the second visual object 1232 with the virtual space 1220, in the frame included in the external space.

As described above, according to an embodiment, the wearable device 101 may display the image 134 or may display at least a portion of the virtual space 1220, in another portion that is distinguished from a portion of the FoV in which the first visual object focused by the user 110 is shown. The wearable device 101 may provide the user 110 with a user experience based on MR and/or VR without disturbing the attention of the user 110 focused on the first visual object based on the image 134 and/or the at least a portion of the virtual space 1220. According to an embodiment, the wearable device 101 may adaptively select at least one visual object to be preferentially displayed to the user 110 from among the plurality of visual objects, by classifying a plurality of external objects, based on the relevance (e.g., contact status) between the first visual object focused by the user 110 and the other visual object.

In an embodiment, after the first timing at which the wearable device 101 classifies the plurality of visual objects, another visual object different from the plurality of visual objects may be added to the frame. Hereinafter, an example of an operation performed by the wearable device 101 based on identifying the other external object according to an embodiment will be described with reference to FIG. 13.

Figure 13:
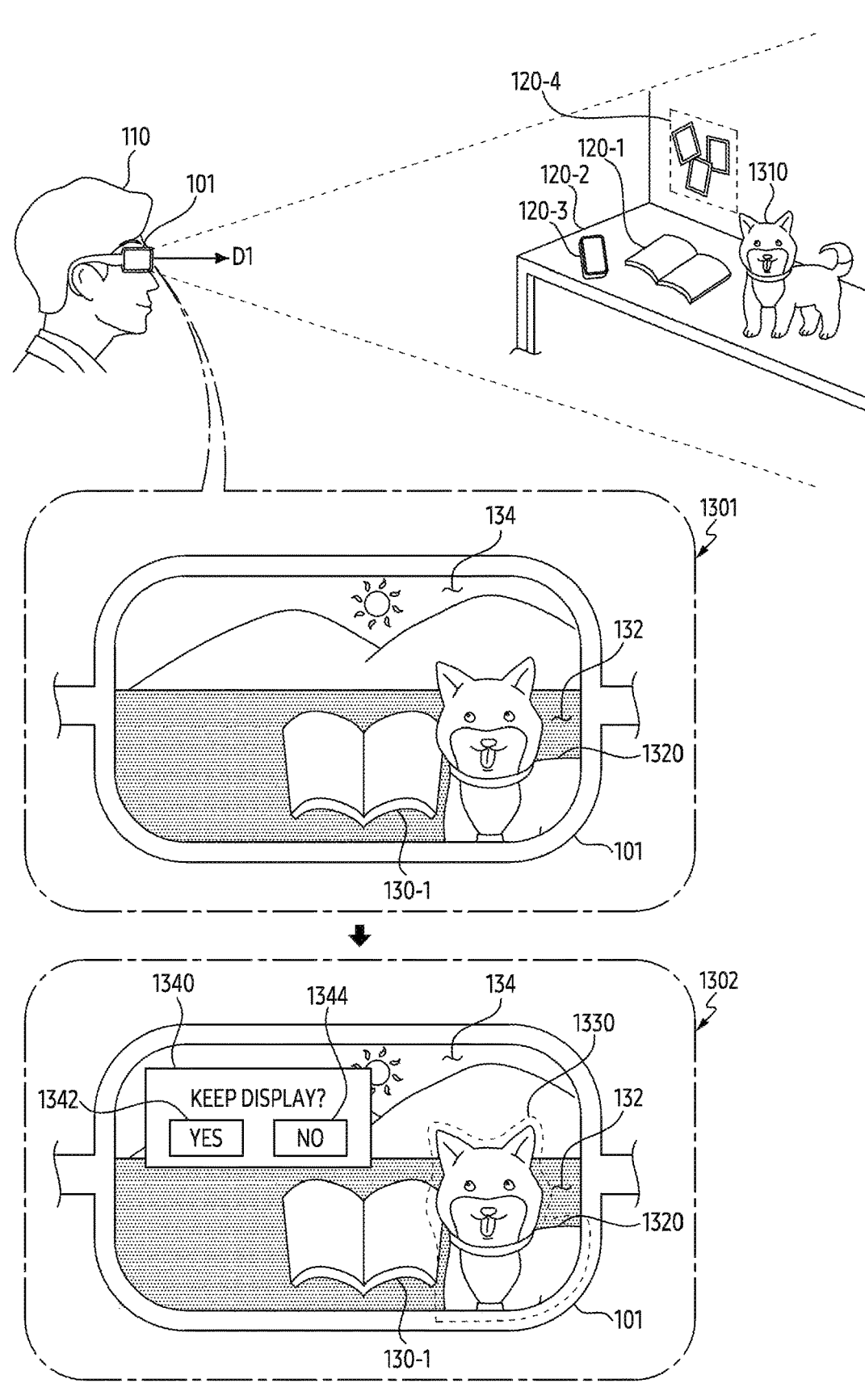
FIG. 13 illustrates an example of an operation in which a wearable device, according to an embodiment, identifies a visual object different from a specific visual object focused by a user.

FIG. 13 illustrates an example of an operation in which the wearable device 101 according to an embodiment identifies an external object different from a specific external object focused by a user 110. The wearable device 101 of FIGS. 1 to 2 may include the wearable device 101 of FIG. 13. An operation of the wearable device 101 described with reference to FIG. 13 may be performed by the wearable device 101 of FIG. 2 and/or a processor 210.

Referring to FIG. 13, according to an embodiment, the wearable device 101 may classify a plurality of visual objects (e.g., visual objects corresponding to each of a first external object 120-1 to a fourth external object 120-4) included in the frame into one of a plurality of preset categories, in response to an input indicating the focus of the first visual object 130-1. The wearable device 101 may display at least one image (e.g., images 132 and 134) superimposed on another visual object that is distinguished from the first visual object 130-1, while displaying the first visual object 130-1 classified into a first preset category based on the input to the user 110. For example, the image 132 may be displayed superimposed on a visual object (e.g., a visual object corresponding to the second external object 120-2) classified into the second preset category. For example, the image 134 may be displayed superimposed on a visual object (e.g., a portion where the fourth external object 120-4 is shown) classified into a fifth preset category.

Referring to FIG. 13, after visual objects corresponding to each of the first external object 120-1 to the fourth external object 120-4 are classified, an exemplary case in which the wearable device 101 identifies a visual object 1320 that is not classified into any one of a plurality of preset categories is illustrated. For example, in the case that an external object 1310 such as an animal (e.g., a dog) approaches the wearable device 101, the wearable device 101 may obtain a frame including the visual object 1320 in which the external object 1310 is captured, by using a camera (e.g., a camera 225 of FIG. 2), a microphone (e.g., a microphone 235 of FIG. 2), and/or a sensor (e.g., a sensor 230 of FIG. 2). Based on the motion of the external object 1310 and/or the visual object 1320 identified by the frame, the wearable device 101 may determine whether to display the visual object 1320 in the FoV of the user 110. For example, the wearable device 101 may determine whether to display the visual object 1320 in the FoV of the user 110, based on the number of times and/or duration in which motion for visual object 1320 has been detected. For example, the wearable device 101 may display the visual object 1320 in the FoV, based on whether the intensity of sound generated from the external object 1310 is greater than a preset threshold intensity. For example, the wearable device 101 may display the visual object 1320 in the FoV, based on the depth map and/or based on whether a distance between the wearable device 101 and the external object 1310 is less than a preset distance.

Referring to FIG. 13, an exemplary state 1301 in which the wearable device 101 displays the visual object 1320 representing the external object 1310 in the FoV of the user 110 according to an embodiment is illustrated. Before the state 1301, the wearable device 101 may remove or occlude the visual object 1320 by modifying another portion except for a portion where the first visual object 130-1 representing the first external object 120-1 is disposed, in the frame obtained from the camera. The wearable device 101 may switch to state 1301, based on identifying that the number of times the motion identified from the visual object 1320 is greater than preset number of times, receiving a sound greater than or equal to a preset intensity from the external object 1310 corresponding to the visual object 1320, and/or identifying the external object 1310 approaching to be in a distance less than the preset distance.

The wearable device 101 that has switched to the state 1301 of FIG. 13 may display the visual object 1320 corresponding to the external object 1310 in the FoV in the frame. Referring to FIG. 13, since the visual object 1320 is displayed in the FoV, the user 110 wearing the wearable device 101 may recognize the external object 1310 through the visual object 1320. In the state 1301 of FIG. 13, the wearable device 101 may classify the visual object 1320 into a sixth preset category among preset categories of Table 1. The wearable device 101 may classify the category in which the visual object 1310 is classified into another category different from the sixth preset category, based on duration in which the visual object 1320 is classified into the sixth preset category.

Referring to FIG. 13, the wearable device 101 may switch from the state 1301 to the state 1302, based on displaying the visual object 1320 classified into the sixth preset category for more than a preset duration (e.g., 5 to 10 seconds). The embodiment is not limited to this, and the wearable device 101 may modify the category of the visual object 1320 independently of the preset duration, based on an input indicating the focus of the visual object 1320. In the state 1302, the wearable device 101 may display a screen 1340 for selecting whether to modify the category of the visual object 1320. In the screen 1340 having a form of a pop-up window, the wearable device 101 may display visual objects 1342 and 1344 for adjusting and/or selecting whether to maintain the display of the visual object 1320 based on the modification of the category. The wearable device 101 may display the visual object 1342 having the form of a button and including text guiding maintaining the display of the visual object 1320. The wearable device 101 may display the visual object 1344 having the form of the button and including text guiding ceasing the display of the visual object 1320.

In the state 1302 of FIG. 13, according to an embodiment, the wearable device 101 may modify the category of the visual object 1320 based on a gesture of selecting one of the visual objects 1342 and 1344 in the screen 1340. For example, based on a gesture of selecting the visual object 1344, the wearable device 101 may modify the category of the visual object 1320 from the sixth preset category to a third preset category. Based on modifying the category of the visual object 1320 to the third preset category, the wearable device 101 may cease displaying the visual object 1320 in the FoV. For example, the wearable devices 101 may remove the visual object 1320 or may synthesize another visual object (e.g., the images 132 and 134) on the visual object 1320, in the frame outputted from the camera.

For example, based on a gesture of selecting the visual object 1342, the wearable device 101 may modify the category of the visual object 1320 from the sixth preset category to a first preset category or a fourth preset category. For example, the wearable device 101 may maintain displaying the visual object 1320 in the FoV, based on modifying the category of visual object 1320 to the first preset category. For example, the wearable device 101 may conditionally display the visual object 1320, based on a motion associated with the external object 1310 matched to the visual object 1320, based on changing the category of the visual object 1320 to the fourth preset category. In the above example, in the case that a sound of intensity greater than the preset threshold intensity is generated from the external object 1310 or in case that the external object 1310 interferes with the concentration of the user 110 on the first external object 120-1 associated with the first visual object 130-1, the wearable device 101 may resume displaying the visual object 1320.

As described above, according to an embodiment, the wearable device 101 may classify the visual object 1320 into the sixth preset category, based on identifying the visual object 1320 added to the FoV of the user 110. The wearable device 101 may display the screen 1340 for changing the category of the visual object 1320, based on the duration in which the visual object 1320 was displayed in the FoV. Based on the input associated with the screen 1340, the wearable device 101 may modify the category of the visual object 1320. Based on the modified category, the wearable device 101 may modify whether to display the visual object 1320 in the FoV.

Hereinafter, with reference to FIG. 14, the operation of the wearable device 101 described with reference to FIG. 13 will be described based on a flowchart.

FIG. 14 illustrates an example of a flowchart for a wearable device according to an embodiment. A wearable device 101 of FIGS. 1 and 2 may include the wearable device utilized in FIG. 14. An operation of the wearable device described with reference to FIG. 14 may be performed by the wearable device 101 and/or a processor 210 of FIG. 2.

Referring to FIG. 14, in operation 1410, according to an embodiment, the wearable device may modify at least a portion of the frame, based on the categories of a plurality of first visual objects classified among the first to fifth preset categories. The first to fifth preset categories may match each of the first to fifth preset categories listed in Table 1. The wearable device may classify each of the plurality of first visual objects in the frame, based on the operation described above with reference to FIGS. 6A to 6B and/or FIGS. 7 to 8. The wearable device 101 may individually modify the visibility of the plurality of first visual objects in the frame based on each category of the plurality of first visual objects. For example, the wearable device may occlude or remove another visual object different from the first visual object, based on whether the other visual object is in contact with the first visual object and/or based on the type of the first visual object, while maintaining the first visual object focused by the user in the frame.

Referring to FIG. 14, in operation 1420, according to an embodiment, the wearable device may determine whether a second visual object distinguished from a plurality of first visual objects is identified. The wearable device may identify the appearance (e.g., access of the other external object) of another external object distinguished from external objects corresponding to the first visual objects based on the above-described operation with reference to FIG. 13. Before identifying the second visual object (1420—No), the wearable device may maintain modifying the frame based on categories of the first visual objects based on the operation 1410.

In the state of identifying the second visual object of the operation 1420 (1420—Yes), the wearable device may classify the second visual object into a sixth preset category based on the motion associated with the second visual object, by performing operation 1430. The wearable device may identify information on the external object corresponding to the second visual object by using a camera 225, a sensor 230, and/or a microphone 235 of FIG. 2. For example, in the case that the external object corresponding to the second visual object approaches a distance less than a preset distance from the wearable device, the wearable device may classify the second visual object into the sixth preset category. For example, in the case that a sound greater than a preset intensity is identified from the external object corresponding to the second visual object, the wearable device may classify the second visual object into the sixth preset category. Based on classifying the second visual object into the sixth preset category, the wearable device may display the second visual object in the frame.

Referring to FIG. 14, in operation 1440, according to an embodiment, the wearable device may modify the category of the second visual object, based on a duration during which the second visual object is displayed and/or an input indicating the focus of the second visual object. For example, the wearable device may perform the operation 1440 in the case that the second visual object is displayed for greater than a preset duration, or in the case that the direction of the body part (e.g., head, eyes, and/or hand) of the user wearing the wearable device faces the second visual object. The wearable device may display a visual object for confirming a modification of the category of the second visual object. For example, the wearable device may obtain information on the category of the second visual object from the user (e.g., a user 110 of FIG. 1) of the wearable device by using the screen 1340 of FIG. 13. Based on the information, the wearable device may reclassify the category of the wearable device from the sixth preset category of the operation 1430 to one of the first to fifth preset categories of the operation 1410.

Referring to FIG. 14, in operation 1450, according to an embodiment, the wearable device may modify the second visual object included in the frame based on the category modified based on the operation 1440. The wearable device may maintain displaying the second visual object in the frame, based on the classification of the second visual object into a first preset category. The wearable device may maintain displaying the second visual object in the frame, or may modify a portion of the second visual object displayed in the frame, based on the classification of the second visual object into a second preset category. The wearable device modifying the portion may include an operation of replacing the portion in the frame with an image (e.g., an image 132 of FIG. 1) for emphasizing a specific visual object focused on by the user. Based on classification of the second visual object into a third preset category, the wearable device may occlude or remove a portion of the second visual object displayed in the frame with another image. The wearable device may identify an event for displaying the second visual object in the frame, based on the classification of the second visual object into a fourth preset category.

As described above, according to an embodiment, the wearable device may modify and display a frame obtained from a camera at least partially, in a state of providing a user experience based on VST. The wearable device may occlude or remove other visual objects different from the specific visual object, in order to emphasize a specific visual object focused by the user in the frame. The wearable device may individually modify the visibility of each visual object in the frame, based on the type and/or category of each visual object. The wearable device may classify the newly added visual object in the frame into any one of the first to fifth preset categories of the Table 1.

Hereinafter, an embodiment in which a wearable device according to an embodiment provides a user experience based on AR, MR, and/or VST in exemplary environments will be described with reference to FIGS. 15A to 15C.

Figure 15A:
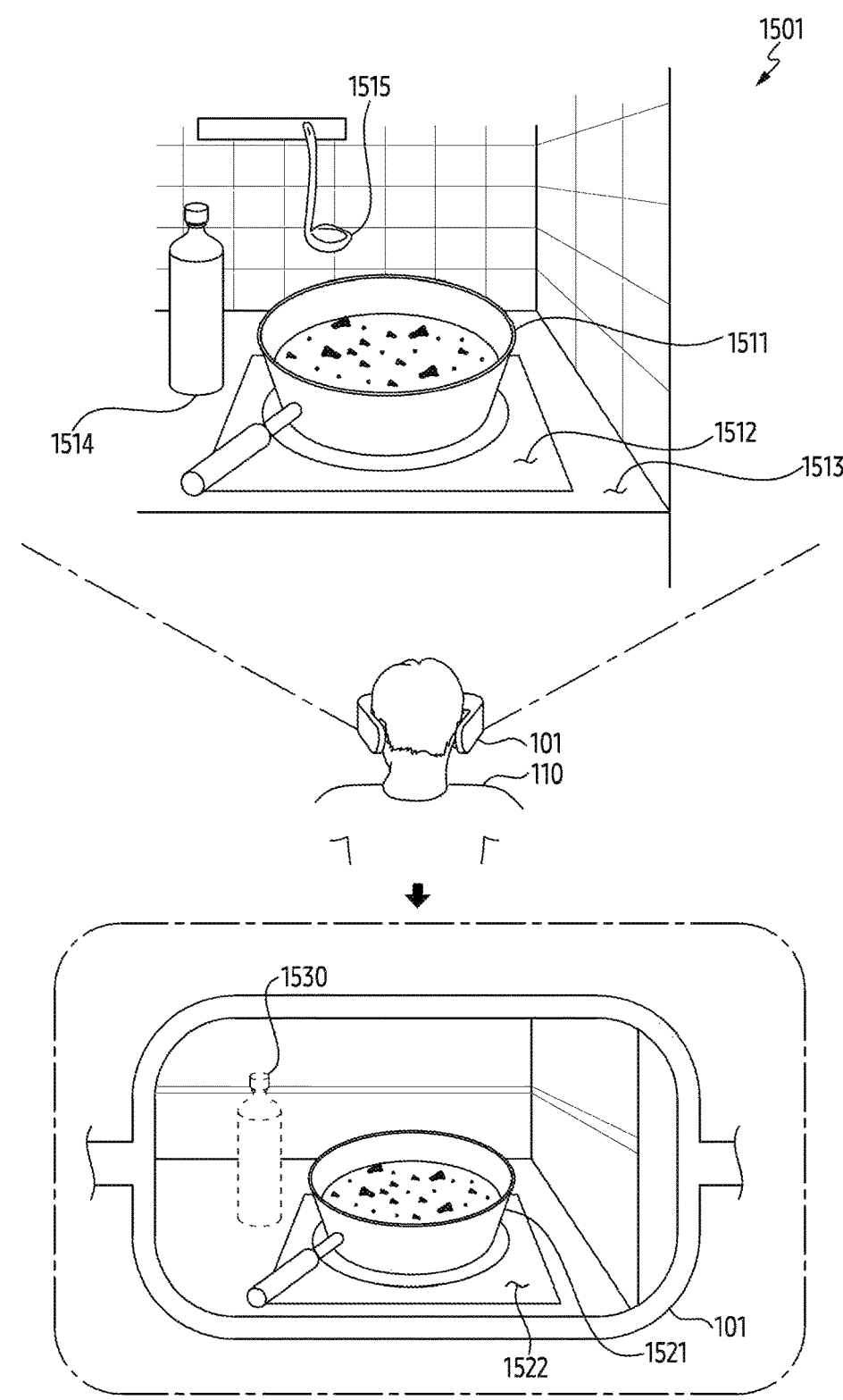
FIGS. 15A to 15C illustrate an example of an operation performed by a wearable device based on a visual object focused by a user according to an embodiment.
Figure 15B:
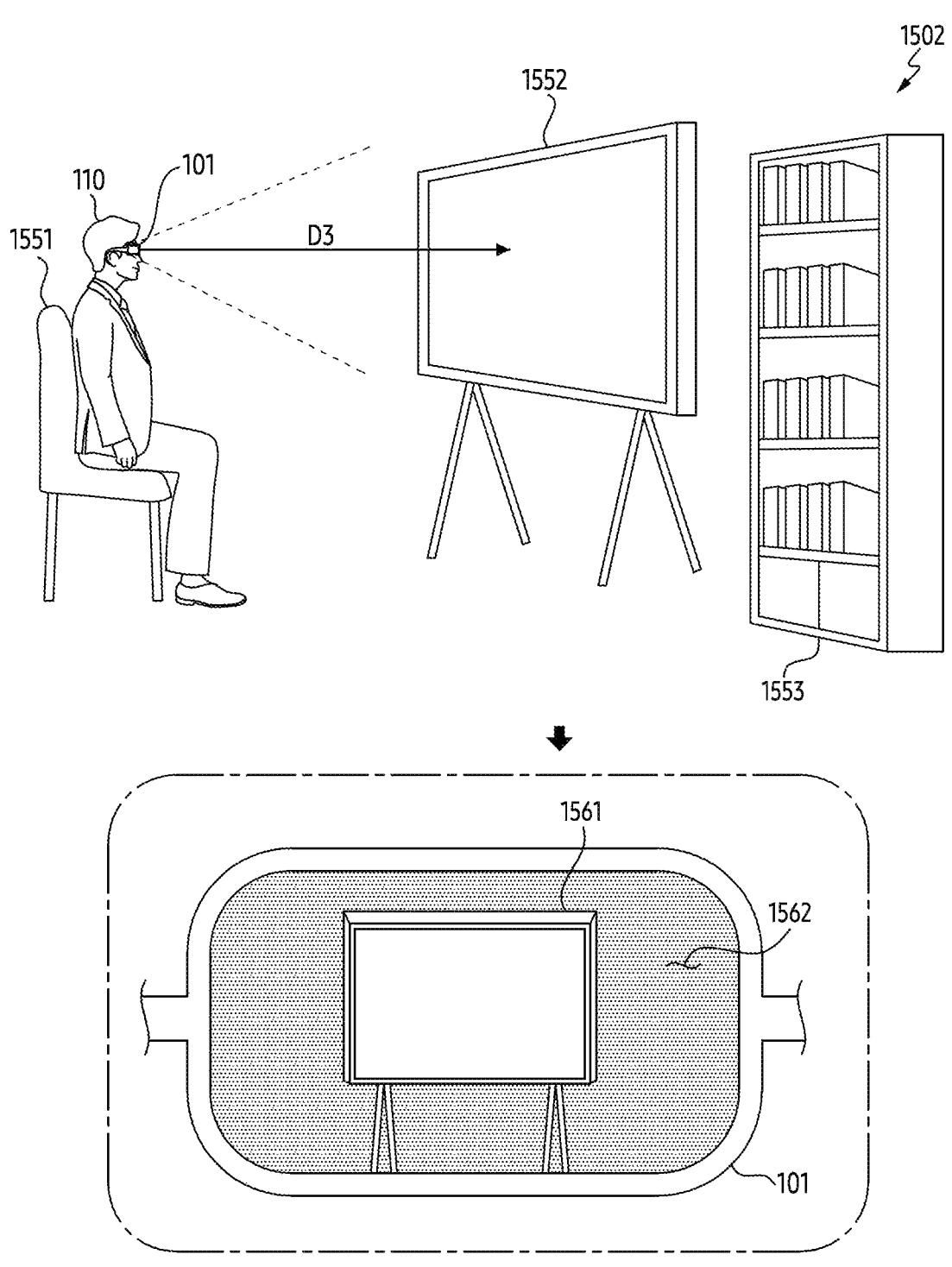
Figure 15C:
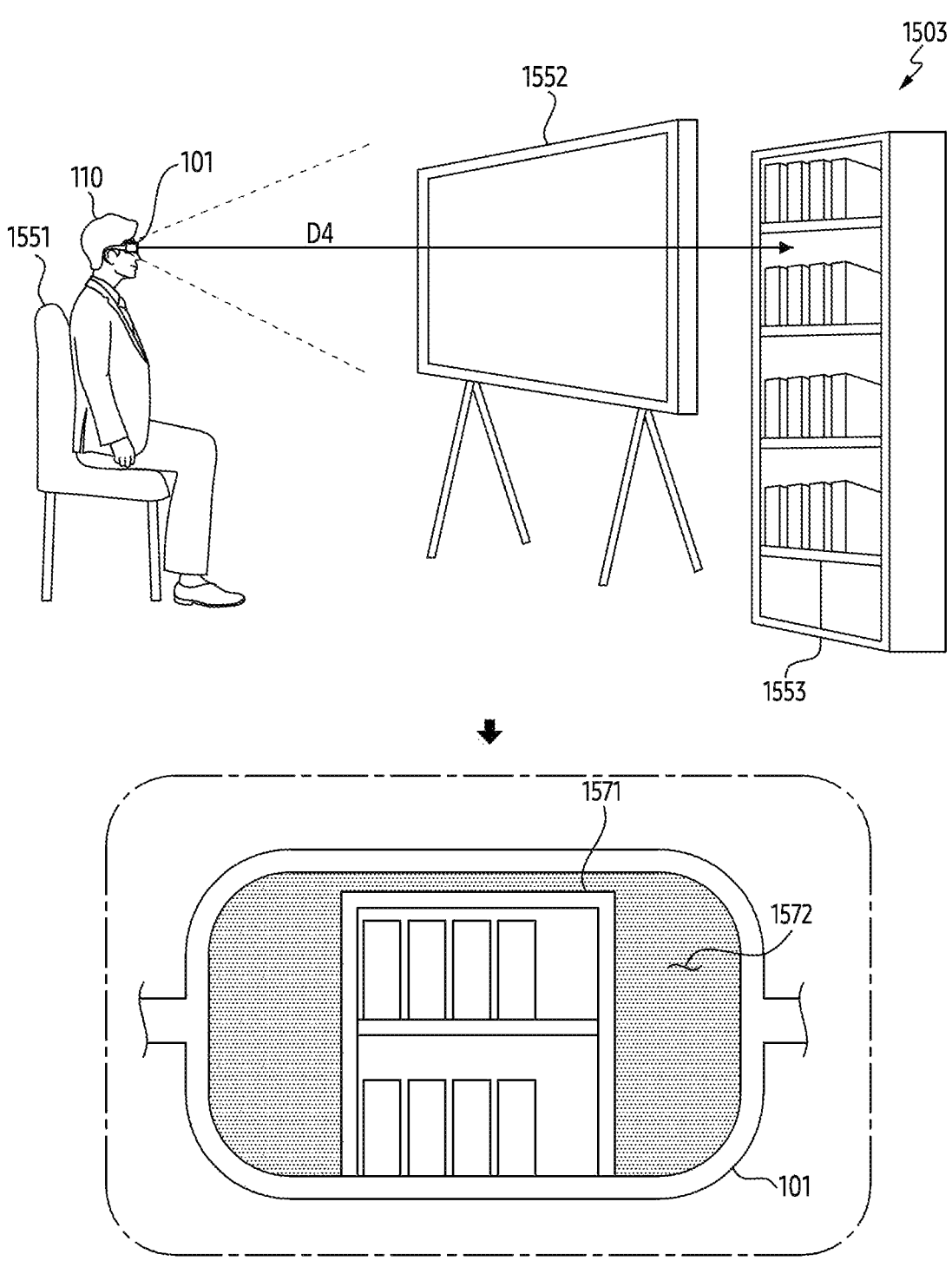

FIGS. 15A to 15C illustrate an example of an operation performed by a wearable device 101 based on a visual object focused by a user 110 according to an embodiment. The wearable device 101 of FIGS. 1 to 2 may include the wearable device 101 of FIGS. 15A to 15C. An operation of the wearable device 101 described with reference to FIGS. 15A to 15C may be performed by the wearable device 101 of FIG. 2 and/or a processor 210.

Referring to FIGS. 15A to 15C, exemplary states 1501, 1502, and 1503 in which the wearable device 101 worn by the user 110 displays frames for one or more external spaces to the user 110 are illustrated. In the state 1501, it is assumed that the wearable device 101 displays a frame in which at least a portion of the kitchen is captured to the user 110, in an external space including the kitchen. In the states 1502 and 1503, it is assumed that the wearable device 101 displays a frame in which at least a portion of the external space is captured to the user 110, in an external space including the TV 1552 and the bookshelf 1553. In an embodiment of FIGS. 15A to 15C, the wearable device 101 may modify at least a portion of the frame in which the external space is captured and may display the frame in which the at least portion is modified, to the user 110, based on the operation described above with reference to FIGS. 1 to 14.

In the state 1501 of FIG. 15A, according to an embodiment, the wearable device 101 may obtain a frame for an external space including a plurality of external objects 1511, 1512, 1513, 1514, and 1515 by using a camera (e.g., a camera 225 of FIG. 2). In the frame, the wearable device 101 may identify visual objects corresponding to each of a plurality of external objects 1511, 1512, 1513, 1514, and 1515. For example, the wearable device 101 may identify the external object 1511, which is a frying pan, based on a first visual object 1521 in the frame. Similarly, the wearable device 101 may identify the external object 1512 that is a gas stove, the external object 1513 that is a kitchen table, the external object 1514 that is a water bottle, and/or the external object 1515 that is a ladle, based on different visual objects in the frame.

According to an embodiment, the wearable device 101 may identify an input indicating the focus of or onto the first visual object 1521. The input may be associated with a motion (e.g., the posture of the hand holding the first visual object 1521) of the user 110 wearing the wearable device 101 and/or a direction of a preset body part (e.g., the eye and/or head of the user 110) of the user 110. In response to an input indicating the focus on a first visual object 1521, the wearable device 101 may classify a first visual object 1521 into a first preset category. The wearable device 101 may classify another visual object distinguished from the first visual object 1521 in the frame based on a type of the first visual object 1521 and/or a position relationship with respect to the first visual object 1521.

In the state 1501 of FIG. 15A, according to an embodiment, the wearable device 101 may display a frame modified by each category (e.g., any one of preset categories of Table 1) of a plurality of visual objects in a display area formed in front of the eyes of the user 110. In a state in which the wearable device 101 sequentially obtains a plurality of frames from the camera, the wearable device 101 may modify each of the plurality of frames based on a category of the plurality of visual objects included in the frame. The wearable device 101 may make the user 110 recognize MR and/or VST user experience represented by the modified frames, by sequentially displaying the modified frames in the display area.

In the state 1501 of FIG. 15A, the wearable device 101 may maintain displaying the first visual object 1521 classified into the first preset category in the frame. The wearable device 101 may modify another portion different from a portion in which the first visual object 1521 is displayed in the frame. For example, since the wearable device 101 is linked to the first visual object 1521, a second visual object 1522 classified into the second preset category may be modified based on the operation described with reference to FIG. 9. For example, the wearable device 101 may conditionally display a third visual object 1530 corresponding to the external object 1514 that may modify the attention of the user 110 for the first visual object 1521 by modification (e.g., toppling) of the state, based on the possibility that the state will change. Based on the type (e.g., frying pan) of the first visual object 1521 focused by the user 110, the wearable device 101 may display another visual object (e.g., a visual object representing the external object 1515) having a type linked to the type in the display area.

In an embodiment, the wearable device 101 may classify the plurality of visual objects included in the frame into different categories based on the modification of the visual object focused by the user 110. Referring to the states 1502 and 1503 of FIGS. 15B to 15C, exemplary cases in which the user 110 wearing the wearable device 101 gazes at each of the external object 1552 that is a TV or the external object 1553 that is a bookshelf are illustrated. In the state 1502 of FIG. 15B, the wearable device 101 may identify a direction D3 of the gaze of the user 110 toward the external object 1552, which is the TV. The wearable device 101 may identify the direction D3 of the gaze superimposed on the first visual object 1561 corresponding to the external object 1552 in the frame. According to an embodiment, the wearable device 101 may classify the first visual object 1561 into the first preset category based on the direction D3. In the exemplary state 1502 of FIG. 15B, the wearable device 101 may classify another visual object linked to the type (e.g., TV) of the first visual object 1561. For example, in the case that a visual object representing an external object 1551 that is a chair is included in the display area, the wearable device 101 may classify the visual object into the second preset category.

The wearable device 101 may cease displaying another visual object (e.g., a visual object representing the external object 1553 that is a bookshelf) different from the first visual object 1561, while maintaining displaying the first visual object 1561 to the user 110. For example, the wearable device 101 may occlude another visual object distinguished from the first visual object 1561, by using an image 1562 displayed in another portion different from a portion in which the first visual object 1561 is displayed, in the frame displayed to the user 110, or may remove the other visual object from the frame.

Referring to FIG. 15C, in the state 1503, the wearable device 101 may identify a direction D4 of the gaze superimposed on the second visual object 1571 representing the external object 1553 among the external object 1552 that is the TV or the external object 1553 that is the bookshelf. The wearable device 101 may classify the second visual object 1571 into the first preset category based on the direction D4. The wearable device 101 may modify a visual object (e.g., the first visual object 1561 of FIG. 15B) different from the second visual object 1571 classified into the first preset category in the frame included in the display area based on the classification of the visual object. For example, the wearable device 101 may display the image 1572 having a position and/or form superimposed on another visual object different from the second visual object 1571.

As described above, according to an embodiment, the wearable device 101 may classify the plurality of visual objects (e.g., a portion of the frame in which each of the plurality of external objects is captured) displayed in the frame, based on the focus of the user 110. The wearable device 101 may modify at least a portion of the frame based on a result of classifying the plurality of visual objects based on the focus of the user 110. For example, the wearable device 101 may occlude or remove another visual object that is distinguished from a specific visual object focused by the user 110. The wearable device 101 may conditionally display another visual object that is distinguished from the specific visual object and have a possibility of ceasing focusing the user 110 for the specific visual object, based on an event associated with the other visual object.

The operation of the wearable device 101 described above with reference to FIGS. 1 to 14 and 15A to 15C may be associated with a metaverse service provided through a network. Hereinafter, an example of the metaverse service provided to the user based on the wearable device 101 according to an embodiment will be described with reference to FIG. 16.

Metaverse is a combination of the English words Meta, which means "virtual" and "transcendence," and "Universe," which means the universe, and refers to a three-dimensional virtual world where social, economic, and cultural activities like the real world take place. Metaverse is a concept that has evolved one step further than virtual reality, and it is characterized by using avatars to not only enjoy games or virtual reality (VR, cutting-edge technology that enables people to experience real-life experiences in a computerized virtual world), but also social and cultural activities like real reality. Metaverse service may provide media content to enhance immersion in the virtual world, based on augmented reality (AR), virtual reality environment (VR), mixed environment (MR), and/or extended reality (XR).

For example, the media content provided by metaverse service may include social interaction content including a game, a concert, a party, and/or a conference based on an avatar. For example, the media content may include information for economic activities such as advertising, user-created content, and/or sales of products and/or shopping. Ownership of the user-created content may be proved by a blockchain-based non-fungible token (NFT). The metaverse service may support economic activities based on real money and/or cryptocurrency. Virtual content linked to the real world, such as digital twin or life logging, may be provided by the metaverse service.

FIG. 16 is an exemplary diagram of a network environment 1601 that receives a metaverse service through a server 1610.

Referring to FIG. 16, the network environment 1601 may include a server 1610, a user terminal 1620 (e.g., a first terminal 1620-1 and a second terminal 1620-2), and a network connecting the server 1610 and the user terminal 1620. In the network environment 1601, the server 1610 may provide a metaverse service to the user terminal 1620. The network may be formed by at least one intermediate node 1630 including an access point (AP) and/or a base station. The user terminal 1620 may access the server 1620 through a network and output a user interface (UI) associated with the metaverse service to the user of the user terminal 1620. Based on the UI, the user terminal 1620 may obtain information to be inputted into the metaverse service from the user or output information associated with the metaverse service (e.g., multimedia content) to the user.

In this case, the server 1610 provides a virtual space so that the user terminal 1620 may perform activities in the virtual space. In addition, the user terminal 1620 may represent information provided by the server 1610 to the user or transmit information in which the user wants to represent in the virtual space to the server, by installing S/W agent to access a virtual space provided by the server 1610. The S/W agent may be provided directly through the server 1610, downloaded from a public server, or embedded and provided when purchasing a terminal.

In an embodiment, the metaverse service may be provided to the user terminal 1620 and/or the user by using the server 1610. The embodiment is not limited thereto, and the metaverse service may be provided through individual contact between users. For example, within the network environment 1601, the metaverse service may be provided by a direct connection between the first terminal 1620-1 and the second terminal 1620-2, independently of the server 1610. Referring to FIG. 16, in the network environment 1601, the first terminal 1620-1 and the second terminal 1620-2 may be connected to each other through a network formed by at least one intermediate node 1630. In an embodiment where the first terminal 1620-1 and the second terminal 1620-2 are directly connected, any one user terminal of the first terminal 1620-1 and the second terminal 1620-2 may serve as the server 1610. For example, a metaverse environment may be configured only with a device-to-device connection (e.g., a peer-to-peer (P2P) connection).

In an embodiment, the user terminal 1620 (or the user terminal 1620 including the first terminal 1620-1 and the second terminal 1620-2) may be made into various form factors, and may be characterized by including an input device for inputting information to the metaverse service and an output device that provides video and/or sound to the user. Examples of various form factors of the user terminal 1620 include a smartphone (e.g., the second terminal 1620-2), an AR device (e.g., the first terminal 1620-1), a VR device, an MR device, a video see through (VST) device, an optical see through (OST) device, a smart lens, a smart mirror, a TV or a projector capable of input/output.

Networks (e.g., a network formed by at least one intermediate node 1630) include various broadband networks including 3G, 4G, and 5G, and short-range networks including Wi-fi and BT (e.g., a wired network or a wireless network that directly connect the first terminal 1620-1 and the second terminal 1620-2).

In an embodiment, the user terminal 1620 of FIG. 16 may include the wearable device 101 of FIGS. 1 to 14, 15A to 15C.

In an embodiment, a method of adaptively displaying each of a plurality of visual objects displayed to the user based on the focus of the user wearing the wearable device may be required. As described above, according to an embodiment, the wearable device may comprise a camera, a display, a processor and memory storing instructions. The instructions may, when executed by the processor, cause the wearable device to display, via the display, a first image frame obtained by the camera. The instructions may, when executed by the processor, cause the wearable device to identify a first visual object among a plurality of visual objects in the first image frame. The instructions may, when executed by the processor, cause the wearable device to, based on identifying the first visual object among the plurality of visual objects in a first image frame obtained by the camera, identify a second visual object associated with the first visual object. The instructions may, when executed by the processor, cause the wearable device to, after the second visual object is identified, obtain a second image frame via the camera. The instructions may, when executed by the processor, cause the wearable device to modify at least a portion of the second image frame in which at least one of other visual objects of the plurality of visual objects different from the first visual object and the second visual object is removed. The instructions may, when executed by the processor, cause the wearable device to display, via the display, the second image frame including the modified portion.

For example, the display may comprise a first display having a position corresponding to a left eye of a user while worn by the user, a second display having a position corresponding to right eye of the user while worn by the user.

For example, the instructions may, when executed by the processor, cause the wearable device to identify the first visual object positioned on a portion of the first display or the second display, wherein the portion is determined as focused by the user based on eye tracking.

For example, the instructions may, when executed by the processor, cause the wearable device to identify the second visual object based on whether each of the plurality of visual objects is overlapped to the first visual object in the first image frame.

For example, the instructions may, when executed by the processor, cause the wearable device to identify the second visual object based on categories to which each of the plurality of visual objects is classified.

As described above, according to an embodiment, a method of a wearable device may comprise displaying, via a display of the wearable device, a first image frame obtained by a camera of the wearable device. The method may comprise identifying a first visual object among a plurality of visual objects in the first image frame. The method may comprise, based on identifying the first visual object among the plurality of visual objects in a first image frame obtained by the camera, identifying a second visual object associated with the first visual object. The method may comprise, after the second visual object is identified, obtaining a second image frame via the camera. The method may comprise modifying at least a portion of the second image frame in which at least one of other visual objects of the plurality of visual objects different from the first visual object and the second visual object is removed. The method may comprise displaying, via the display, the second image frame including the modified portion.

For example, the display may comprise a first display having a position corresponding to a left eye of a user while worn by the user, a second display having a position corresponding to right eye of the user while worn by the user.

For example, the identifying the first visual object may comprise identifying the first visual object positioned on a portion of the first display or the second display, wherein the portion is determined as focused by the user based on eye tracking.

For example, the identifying the second visual object may comprise identifying the second visual object based on whether each of the plurality of visual objects is overlapped to the first visual object in the first image frame.

For example, the identifying the second visual object may comprise identifying the second visual object based on categories to which each of the plurality of visual objects is classified.

As described above, according to an embodiment, the wearable device (e.g., the wearable device 101 of FIG. 2) may comprise a camera (e.g., a camera 225 of FIG. 2), a display (e.g., a display 220 of FIG. 2), and a processor (e.g., a processor 210 of FIG. 2). The processor may be configured to identify, based on an input indicating to focus on a first visual object (e.g., a first visual object 130-1 of FIG. 1) among a plurality of visual objects in a frame obtained by the camera, a second visual object linked to the first visual object. The processor may be configured to modify at least portion of the frame in which other visual objects different from the first visual object and the second visual object is included. The processor may be configured to display the frame including the modified portion in the display. According to an embodiment, the wearable device may maintain the focus on the first visual object by changing the frame based on the focus of the user on the first visual object in the frame.

For example, the processor may be configured to, based on at least one of types of the plurality of visual objects or the input, classify the plurality of visual objects into one of preset categories distinguished by displaying condition.

For example, the processor may further comprise a microphone. The processor may be configured to, in a state displaying the frame in which the modified portion is included, identify, by using the microphone, an external object generating sound of which an intensity is greater than a preset threshold intensity, among the plurality of external objects. The processor may be configured to, based on identifying the third external object, display a third visual object corresponding to the third external object in the display.

For example, the processor may be configured to identify the preset threshold intensity based on a type of the first visual object.

For example, the processor may be configured to identify, among other visual objects different from the first visual object corresponding to a first external object and the second visual object, a third visual object having a type corresponding to an external object ceasing interaction between a user wearing the wearable device and the first external object based on modification of a state. For example, the processor may be configured to, based on an event associated with the third visual object, display a fourth visual object linked to the third visual object in the frame.

For example, the processor may be configured to identify, by using the frame, whether a distance between an external object corresponding to the third visual object and a body part is decreased lower than a preset distance. The processor may be configured to, based on identifying the distance decreased lower than the preset distance, display a message for guiding a modification of the state of the third visual object in the display.

For example, the processor may be configured to, in a state displaying the frame in which the modified portion is included, display, based on identifying the third visual object distinguished from the plurality of visual objects, the third visual object in the display.

For example, the processor may be configured to, based on a duration while the third visual object is displayed, display a fourth visual object for selecting whether to maintain displaying the third visual object in the display.

For example, the processor may be configured to display a texture image having a shape of the second visual object superimposed on the second visual object in the display.

For example, the processor may be configured to modify the portion of the frame by combining an image larger than the portion to the frame.

For example, the processor may be configured to maintain the first visual object representing a first external object in the display by modifying the portion matched to the other visual objects.

As described above, according to an embodiment, a method of a wearable device may comprise identifying, by using a camera of the wearable device, a plurality of visual objects included in a field-of-view (FoV) of a user wearing the wearable device. The method may comprise classifying, based on a position relationship between the plurality of visual objects and a first visual object that is focused by the user, the plurality of visual objects into a plurality of preset categories distinguished by displaying condition. The method may comprise displaying, in the FoV, a third visual object occluding a second visual object classified to a second preset category different from a first preset category to which the first visual object is classified, by using the display of the wearable device. The method may comprise adjusting, displaying of the third visual object based on displaying condition corresponding to the second preset category to which the second visual object is classified.

For example, the displaying may comprise displaying, with respect to the second visual object indicated as being contacted to the first visual object based on the position relationship, the third visual object having a shape of the second visual object viewed through the FoV.

For example, the classifying may comprise, based on a type of the second visual object, determining, whether to classify the second visual object to the second preset category corresponding to a visual object able to cease interaction between the first visual object and the user based on modification of a state.

For example, the adjusting may comprise ceasing, at least temporary, displaying the third visual object occluding the second visual object classified to the second preset category based on identifying a motion of the user toward the second visual object.

For example, the classifying may comprise classifying the second visual object, which is corresponding to an external object able to generate notification based on sound, to the second preset category having the displaying condition associated with an intensity of sound.

For example, the adjusting may comprise, based on identifying that sound greater than a preset threshold intensity is generated from the external object by using a microphone of the wearable device, ceasing, at least temporary, displaying of the third visual object.

As described above, according to an embodiment, a method of a wearable device, may comprise identifying, based on an input indicating to focus on a first visual object among a plurality of visual objects in a frame obtained by a camera of the wearable device, a second visual object linked to the first visual object. The method may comprise modifying at least portion of the frame in which other visual objects different from the first visual object and the second visual object is included. The method may comprise displaying the frame including the modified portion in a display of the wearable device.

For example, the method may comprise, based on at least one of types of each of the plurality of visual objects or the input, classifying the plurality of visual objects into one of preset categories distinguished by displaying condition.

For example, the displaying comprises, in a state displaying the frame in which the modified portion is included, identifying, by using a microphone of the wearable device, an external object generating sound of which an intensity is greater than a preset threshold intensity. The method may comprise, based on identifying the external object, displaying a third visual object corresponding to the external object in the display.

For example, the identifying the third external object may comprise identifying the preset threshold intensity based on a type of the first visual object.

For example, the modifying may comprise identifying, among other visual objects different from the first visual object corresponding to a first external object and the second visual object, a third visual object having a type corresponding to an external object ceasing interaction between a user wearing the wearable device and the first external object based on modification of a state. The method may comprise, based on an event associated with the third visual object, displaying a fourth visual object linked to the third visual object in the frame.

For example, the method may comprise identifying, by using the frame, whether a distance between an external object corresponding to the third visual object and a body part is decreased lower than a preset distance. The method may comprise, based on identifying the distance decreased lower than the preset distance, displaying a message for guiding a modification of the state of the third visual object in the display.

For example, the displaying may comprise, in a state displaying the frame in which the modified portion is included, displaying, based on identifying the third visual object distinguished from the plurality of visual objects, the third visual object in the display.

For example, the displaying may comprise, based on a duration while the third visual object is displayed, display a fourth visual object for selecting whether to maintain displaying the third visual object in the display.

As described above, according to an embodiment, a wearable device may comprise a camera, a display, and a processor. The processor may be configured to identify, by using the camera of the wearable device, a plurality of visual objects included in a field-of-view (FoV) of a user wearing the wearable device. The processor may be configured to classify, based on a position relationship between the plurality of visual objects and a first visual object that is focused by the user, the plurality of visual objects into a plurality of preset categories distinguished by displaying condition. The processor may be configured to display, in the FoV, a third visual object occluding a second visual object classified to a second preset category different from a first preset category to which the first visual object is classified, by using the display of the wearable device. The processor may be configured to adjust, displaying of the third visual object based on displaying condition corresponding to the second preset category to which the second visual object is classified.

For example, the processor may be configured to display, with respect to the second visual object indicated as being contacted to the first visual object based on the position relationship, the third visual object having a shape of the second visual object viewed through the FoV.

For example, the processor may be configured to, based on a type of the second visual object, determine, whether to classify the second visual object to the second preset category corresponding to a visual object able to cease interaction between the first visual object and the user based on modification of a state.

For example, the processor may be configured to cease, at least temporary, displaying the third visual object occluding the second visual object classified to the second preset category based on identifying a motion of the user toward the second visual object.

For example, the processor may be configured to classify the second visual object, which is corresponding to an external object able to generate notification based on sound, to the second preset category having the displaying condition associated with an intensity of sound.

The apparatus described above may be implemented as a combination of hardware components, software components, and/or hardware components and software components. For example, the devices and components described in the embodiments may be implemented using one or more general purpose computers or special purpose computers such as processors, controllers, arithmetical logic unit (ALU), digital signal processor, microcomputers, field programmable gate array (FPGA), PLU (programmable logic unit), microprocessor, any other device capable of executing and responding to instructions. The processing device may perform an operating system OS and one or more software applications performed on the operating system. In addition, the processing device may access, store, manipulate, process, and generate data in response to execution of the software. For convenience of understanding, although one processing device may be described as being used, a person skilled in the art may see that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, code, instruction, or a combination of one or more of them and configure the processing device to operate as desired or command the processing device independently or in combination. Software and/or data may be embodied in any type of machine, component, physical device, computer storage medium, or device to be interpreted by a processing device or to provide instructions or data to the processing device. The software may be distributed on a networked computer system and stored or executed in a distributed manner. Software and data may be stored in one or more computer-readable recording media.

The method according to the embodiment may be implemented in the form of program instructions that may be performed through various computer means and recorded in a computer-readable medium. In this case, the medium may continuously store a computer-executable program or temporarily store the program for execution or download. In addition, the medium may be a variety of recording means or storage means in which a single or several hardware are combined and is not limited to media directly connected to any computer system and may be distributed on the network. Examples of media may include magnetic media such as hard disks, floppy disks and magnetic tapes, optical recording media such as CD-ROMs and DVDs, magneto-optical media such as floppy disks, ROMs, RAMs, flash memories, and the like to store program instructions. Examples of other media include app stores that distribute applications, sites that supply or distribute various software, and recording media or storage media managed by servers.

Although embodiments have been described according to limited embodiments and drawings as above, various modifications and modifications are possible from the above description to those of ordinary skill in the art. For example, even if the described techniques are performed in a different order from the described method, and/or components such as the described system, structure, device, circuit, etc. are combined or combined in a different form from the described method or are substituted or substituted by other components or equivalents, appropriate results may be achieved.

Therefore, other implementations, other embodiments, and equivalents to the claims fall within the scope of the claims to be described later.

What is claimed is:

1. A wearable device, comprising:
at least one first camera;
at least one second camera;
at least one display;
memory including one or more storage media storing instructions;

at least one processor including processing circuitry, wherein the instructions, when executed by the at least one processor individually or collectively, cause the wearable device to:
obtain, via the at least one display, a first image frame by using the at least one first camera;
identify a gaze information by using the at least one second camera;
identify, in the first image frame, a first visual object among a plurality of visual objects to which a gaze position indicated by the gaze information is directed;
based on identifying the first visual object, display, via the at least one display, a virtual image and a portion of the first image frame in which the first visual object is maintained and other visual objects are hidden;
while displaying the virtual image and the portion of the first image frame, obtain a second image frame by using the at least one first camera;
identify at least one motion of the plurality of visual objects between the first image frame and the second image frame; and
based on identifying a motion of a second visual object among the plurality of visual objects, display the virtual image and portions of the second image frame, wherein each of the portions of the second image frame correspond to the first visual object and the second visual object.

2. The wearable device of claim 1, wherein the at least one display comprises:
a first display having a position corresponding to a left eye of a user while worn by the user;
a second display having a position corresponding to right eye of the user while worn by the user.

3. The wearable device of claim 2, wherein the instructions, when executed by the at least one processor individually or collectively, cause the wearable device to:
identify the first visual object positioned on a portion of the first display or the second display, wherein the portion is determined as focused by the user based on the gaze position indicated by the gaze information.

4. The wearable device of claim 1, wherein the instructions, when executed by the at least one processor individually or collectively, cause the wearable device to:
identify the second visual object based on whether each of the plurality of visual objects is overlapped to the first visual object in the first image frame.

5. The wearable device of claim 1, wherein the instructions, when executed by the at least one processor individually or collectively, cause the wearable device to:
identify the second visual object based on categories to which each of the plurality of visual objects is classified.

6. The wearable device of claim 1, wherein the instructions, when executed by the at least one processor individually or collectively, cause the wearable device to:
based on at least one of types of the plurality of visual objects or a user input, classify the plurality of visual objects into one of preset categories according to displaying conditions.

7. The wearable device of claim 1, further comprises a microphone,
wherein the instructions, when executed by the at least one processor individually or collectively, cause the wearable device to:
in a state displaying the virtual image and the portion of the image frame in which the first visual object is maintained and other visual objects are hidden, identify, by using the microphone, an external object generating sound of which an intensity is greater than a preset threshold intensity;

based on identifying the external object, display a third visual object corresponding to the external object in the display while maintaining to display the portion of the image frame in which the first visual object is maintained.

8. The wearable device of claim 7, wherein the instructions, when executed by the at least one processor individually or collectively, cause the wearable device to:

identify the preset threshold intensity based on a type of the first visual object.

9. The wearable device of claim 1, wherein the instructions, when executed by the at least one processor individually or collectively, cause the wearable device to:

identify, among the other visual objects different from the first visual object corresponding to a first external object and the second visual object, a third visual object having a type corresponding to an external object ceasing interaction between a user wearing the wearable device and the first external object based on modification of a state;

based on an event associated with the third visual object, display a fourth visual object linked to the third visual object in the frame.

10. The wearable device of claim 9, wherein the instructions, when executed by the at least one processor individually or collectively, cause the wearable device to:

identify, by using the frame, whether a distance is decreased lower than a preset distance between the external object corresponding to the third visual object and a body part;

based on identifying the distance decreased lower than the preset distance, display a message for guiding another modification of the state of the third visual object in the display.

11. The wearable device of elain claim 9, wherein the instructions, when executed by the at least one processor individually or collectively, cause the wearable device to:

in a state displaying the portion of the image frame in which the first visual object is maintained, display, based on identifying the third visual object distinguished from the plurality of visual objects, the third visual object in the display.

12. The wearable device of claim 11, wherein the instructions, when executed by the at least one processor individually or collectively, cause the wearable device to:

based on a duration while the third visual object is displayed, display a fourth visual object for selecting whether to maintain displaying the third visual object in the display.

13. The wearable device of claim 1, wherein the instructions, when executed by the at least one processor individually or collectively, cause the wearable device to:

display a texture image having a shape of the second visual object superimposed on the second visual object in the display.

14. The wearable device of claim 1, wherein the instructions, when executed by the at least one processor individually or collectively, cause the wearable device to:

modify the at least the portion of the frame into the modified portion by combining an image larger than the at least the portion to the frame.

15. A method of a wearable device including at least one first camera, at least one second camera, and at least one display, comprising:

obtaining, via the at least one display, a first image frame by using the at least one first camera;

identifying a gaze information by using the at least one second camera;

identifying, in the first image frame, a first visual object among a plurality of visual objects to which a gaze position indicated by the gaze information is directed;

based on identifying the first visual object, displaying, via the at least one display, a virtual image and a portion of the first image frame in which the first visual object is maintained and other visual objects are hidden;

displaying, while displaying the virtual image and the portion of the first image frame, obtaining a second image frame by using the at least one first camera;

identifying at least one motion of the plurality of visual objects between the first image frame and the second image frame; and based on identifying a motion of a second visual object among the plurality of visual objects, displaying the virtual image and portions of the second image frame, wherein each of the portions of the second image frame correspond to the first visual object and the second visual object.

16. The method of claim 15, wherein the display comprises:

a first display having a position corresponding to a left eye of a user while worn by the user;

a second display having a position corresponding to right eye of the user while worn by the user.

17. The method of claim 16, wherein the identifying the first visual object comprises:

identifying the first visual object positioned on a portion of the first display or the second display, wherein the portion is determined as focused by the user based on the gaze position indicated by the gaze information.

18. The method of claim 15, wherein the identifying the second visual object comprises:

identifying the second visual object based on whether each of the plurality of visual objects is overlapped to the first visual object in the first image frame.

19. The method of claim 15, wherein the identifying the second visual object comprises:

identifying the second visual object based on categories to which each of the plurality of visual objects is classified.

20. The method of claim 15, wherein the displaying comprises:

displaying, with respect to the second visual object indicated as being contacted to the first visual object based on the positional relationship, a third visual object having a shape of the second visual object viewed through a field-of-view (FoV).

* * * * *